US008775222B2

(12) United States Patent
Smith et al.

(10) Patent No.: US 8,775,222 B2
(45) Date of Patent: Jul. 8, 2014

(54) SYSTEM AND METHOD FOR IMPROVED RENTAL VEHICLE RESERVATION MANAGEMENT

(75) Inventors: David G. Smith, Wildwood, MO (US); Kimberly A. DeVallance, St. Louis, MO (US); Owen R. Miller, Wildwood, MO (US); Regina M. Miller, Wildwood, MO (US); Jon B. Jouris, Olivette, MO (US); Maribeth Concannon, St. Louis, MO (US); Shawn R. Cormier, Brentwood, MO (US)

(73) Assignee: The Crawford Group, Inc., St. Louis, MO (US)

( * ) Notice: Subject to any disclaimer, the term of this patent is extended or adjusted under 35 U.S.C. 154(b) by 0 days.

(21) Appl. No.: 13/447,713

(22) Filed: Apr. 16, 2012

(65) Prior Publication Data
US 2012/0203581 A1 Aug. 9, 2012

Related U.S. Application Data

(60) Division of application No. 11/747,645, filed on May 11, 2007, now Pat. No. 8,160,906, which is a continuation-in-part of application No. 11/609,844, filed on Jan. 4, 2007, now abandoned.

(51) Int. Cl.
*G06Q 10/00* (2012.01)
*G06Q 30/00* (2012.01)
*G06Q 10/02* (2012.01)

(52) U.S. Cl.
CPC .............. *G06Q 10/02* (2013.01); *G06Q 30/00* (2013.01); *G06Q 10/00* (2013.01)
USPC .............................................................. 705/5

(58) Field of Classification Search
USPC .............................................................. 705/5
See application file for complete search history.

(56) References Cited

U.S. PATENT DOCUMENTS

| 3,665,397 | A | 5/1972 | Di Napoli et al. |
| 4,788,643 | A | 11/1988 | Trippe et al. |
| 4,831,526 | A | 5/1989 | Luchs et al. |
| 4,858,121 | A | 8/1989 | Barber et al. |

(Continued)

FOREIGN PATENT DOCUMENTS

| JP | 2001344490 | 12/2001 |
| JP | 2002074126 | 3/2002 |

(Continued)

OTHER PUBLICATIONS

Pyron, Tim, "Special Edition Using Microsoft Office Project 2003", Feb. 3, 2004.*

(Continued)

*Primary Examiner* — Shannon Campbell
(74) *Attorney, Agent, or Firm* — Thompson Coburn LLP

(57) ABSTRACT

A method and system are disclosed for managing a rental vehicle reservation based at least in part on automated processing of vehicle repair data corresponding to a disabled vehicle that is related to the rental vehicle reservation. For example, a preferred method and system can automatically compute from the vehicle repair data an amount of time that is likely to be needed by a repair facility to complete repairs to the disabled vehicle, which in turn can drive more accurate management of an authorization period for the rental vehicle reservation.

43 Claims, 37 Drawing Sheets

(56) References Cited

U.S. PATENT DOCUMENTS

| | | |
|---|---|---|
| 4,899,292 A | 2/1990 | Montagna et al. |
| 4,916,611 A | 4/1990 | Doyle, Jr. et al. |
| 4,931,932 A | 6/1990 | Dalnekoff et al. |
| 5,058,044 A | 10/1991 | Stewart et al. |
| 5,182,705 A | 1/1993 | Barr et al. |
| 5,210,687 A | 5/1993 | Wolfberg et al. |
| 5,216,592 A | 6/1993 | Mann et al. |
| 5,224,034 A | 6/1993 | Katz et al. |
| 5,237,499 A | 8/1993 | Garback |
| 5,253,165 A | 10/1993 | Leiseca et al. |
| 5,289,369 A | 2/1994 | Hirshberg |
| 5,309,355 A | 5/1994 | Lockwood |
| 5,311,425 A | 5/1994 | Inada et al. |
| 5,369,570 A | 11/1994 | Parad |
| 5,422,809 A | 6/1995 | Griffin et al. |
| 5,432,904 A | 7/1995 | Wong |
| 5,465,206 A | 11/1995 | Hilt et al. |
| 5,504,674 A * | 4/1996 | Chen et al. .................. 705/4 |
| 5,544,040 A | 8/1996 | Gerbaulet et al. |
| 5,550,734 A | 8/1996 | Tarter et al. |
| 5,557,515 A | 9/1996 | Abbruzzese et al. |
| 5,570,283 A | 10/1996 | Shoolery et al. |
| 5,581,461 A | 12/1996 | Coll et al. |
| 5,586,312 A | 12/1996 | Johnson et al. |
| 5,644,721 A | 7/1997 | Chung et al. |
| 5,664,207 A | 9/1997 | Crumpler et al. |
| 5,666,493 A | 9/1997 | Wojcik et al. |
| 5,712,989 A | 1/1998 | Johnson et al. |
| 5,721,913 A | 2/1998 | Ackroff et al. |
| 5,724,520 A | 3/1998 | Goheen |
| 5,726,885 A | 3/1998 | Klein et al. |
| 5,732,398 A | 3/1998 | Tagawa |
| 5,734,823 A | 3/1998 | Saigh et al. |
| 5,758,329 A | 5/1998 | Wojcik et al. |
| 5,758,341 A | 5/1998 | Voss |
| 5,764,981 A | 6/1998 | Brice et al. |
| 5,781,892 A | 7/1998 | Hunt et al. |
| 5,794,207 A | 8/1998 | Walker et al. |
| 5,799,289 A | 8/1998 | Fukushima et al. |
| 5,808,894 A | 9/1998 | Wiens et al. |
| 5,809,478 A | 9/1998 | Greco et al. |
| 5,812,067 A | 9/1998 | Bergholz et al. |
| 5,818,715 A | 10/1998 | Marshall et al. |
| 5,832,451 A | 11/1998 | Flake et al. |
| 5,832,454 A | 11/1998 | Jafri et al. |
| 5,839,112 A | 11/1998 | Schreitmueller et al. |
| 5,839,114 A | 11/1998 | Lynch et al. |
| 5,842,176 A | 11/1998 | Hunt et al. |
| 5,845,077 A | 12/1998 | Fawcett |
| 5,847,957 A | 12/1998 | Cohen et al. |
| 5,862,346 A | 1/1999 | Kley et al. |
| 5,864,818 A | 1/1999 | Feldman |
| 5,890,129 A | 3/1999 | Spurgeon |
| 5,893,904 A | 4/1999 | Harris et al. |
| 5,897,620 A | 4/1999 | Walker et al. |
| 5,903,873 A | 5/1999 | Peterson et al. |
| 5,909,581 A | 6/1999 | Park |
| 5,915,241 A | 6/1999 | Giannini |
| 5,918,215 A | 6/1999 | Yoshioka et al. |
| 5,923,552 A | 7/1999 | Brown et al. |
| 5,926,798 A | 7/1999 | Carter et al. |
| 5,931,878 A | 8/1999 | Chapin, Jr. |
| 5,933,810 A | 8/1999 | Okawa et al. |
| 5,948,040 A | 9/1999 | DeLorme et al. |
| 5,950,169 A | 9/1999 | Borghesi et al. |
| 5,953,706 A | 9/1999 | Patel |
| 5,956,706 A | 9/1999 | Carey et al. |
| 5,983,200 A | 11/1999 | Slotznick |
| 6,006,148 A | 12/1999 | Strong |
| 6,006,201 A | 12/1999 | Berent et al. |
| 6,018,627 A | 1/2000 | Iyengar et al. |
| 6,023,679 A | 2/2000 | Acebo et al. |
| 6,029,175 A | 2/2000 | Chow et al. |
| 6,049,671 A | 4/2000 | Slivka et al. |
| 6,049,774 A | 4/2000 | Roy |
| 6,061,691 A | 5/2000 | Fox |
| 6,073,214 A | 6/2000 | Fawcett |
| 6,076,066 A | 6/2000 | DiRienzo et al. |
| 6,076,067 A | 6/2000 | Jacobs et al. |
| 6,085,169 A | 7/2000 | Walker et al. |
| 6,085,170 A | 7/2000 | Tsukuda et al. |
| 6,088,677 A | 7/2000 | Spurgeon |
| 6,094,640 A | 7/2000 | Goheen |
| 6,094,679 A | 7/2000 | Teng et al. |
| 6,112,185 A | 8/2000 | Walker et al. |
| 6,119,149 A | 9/2000 | Notani |
| 6,122,642 A | 9/2000 | Mehovic |
| 6,125,384 A | 9/2000 | Brandt et al. |
| 6,144,990 A | 11/2000 | Brandt et al. |
| 6,148,290 A | 11/2000 | Dan et al. |
| 6,167,567 A | 12/2000 | Chiles et al. |
| 6,175,832 B1 | 1/2001 | Luzzi et al. |
| 6,185,540 B1 | 2/2001 | Schreitmueller et al. |
| 6,240,365 B1 | 5/2001 | Bunn |
| 6,263,322 B1 | 7/2001 | Kirkevold et al. |
| 6,282,517 B1 | 8/2001 | Wolfe et al. |
| 6,308,120 B1 | 10/2001 | Good |
| 6,327,617 B1 | 12/2001 | Fawcett |
| 6,332,163 B1 | 12/2001 | Bowman-Amuah |
| 6,334,146 B1 | 12/2001 | Parasnis et al. |
| 6,347,398 B1 | 2/2002 | Parthasarathy et al. |
| 6,360,205 B1 | 3/2002 | Iyengar et al. |
| 6,381,617 B1 | 4/2002 | Frolund et al. |
| 6,389,431 B1 | 5/2002 | Frolund et al. |
| 6,397,191 B1 | 5/2002 | Notani et al. |
| 6,418,554 B1 | 7/2002 | Delo et al. |
| 6,477,452 B2 | 11/2002 | Good |
| 6,567,783 B1 | 5/2003 | Notani et al. |
| 6,594,633 B1 | 7/2003 | Broerman |
| 6,609,050 B2 | 8/2003 | Li |
| 6,654,770 B2 | 11/2003 | Kaufman |
| 6,694,234 B2 | 2/2004 | Lockwood et al. |
| 6,732,358 B1 | 5/2004 | Siefert |
| 6,757,698 B2 | 6/2004 | McBride et al. |
| 6,802,061 B1 | 10/2004 | Parthasarathy et al. |
| 6,910,040 B2 | 6/2005 | Emmick et al. |
| 6,965,886 B2 | 11/2005 | Govrin et al. |
| 6,968,388 B1 | 11/2005 | Fuldseth et al. |
| 6,976,251 B2 | 12/2005 | Meyerson |
| 7,020,620 B1 | 3/2006 | Bargnes et al. |
| 7,050,986 B1 | 5/2006 | Vance et al. |
| 7,062,765 B1 | 6/2006 | Pitzel et al. |
| 7,089,588 B2 | 8/2006 | Schaefer et al. |
| 7,136,821 B1 | 11/2006 | Kohavi et al. |
| 7,145,998 B1 | 12/2006 | Holder et al. |
| 7,275,038 B1 | 9/2007 | Weinstock et al. |
| 7,324,951 B2 * | 1/2008 | Renwick et al. ............... 705/4 |
| 7,328,166 B1 | 2/2008 | Geoghegan et al. |
| 7,899,690 B1 | 3/2011 | Weinstock et al. |
| 8,160,906 B2 | 4/2012 | Smith et al. |
| 8,160,907 B2 | 4/2012 | Smith et al. |
| 8,340,989 B2 | 12/2012 | Weinstock et al. |
| 8,374,894 B2 | 2/2013 | Weinstock et al. |
| 8,401,881 B2 | 3/2013 | Weinstock et al. |
| 8,412,546 B2 | 4/2013 | Smith et al. |
| 2001/0008998 A1 | 7/2001 | Tamaki et al. |
| 2001/0010058 A1 | 7/2001 | Mittal |
| 2001/0018661 A1 | 8/2001 | Sato et al. |
| 2001/0027420 A1 | 10/2001 | Boublik et al. |
| 2001/0027439 A1 | 10/2001 | Holtzman et al. |
| 2001/0027483 A1 | 10/2001 | Gupta et al. |
| 2001/0037224 A1 | 11/2001 | Eldridge et al. |
| 2001/0037255 A1 | 11/2001 | Tambay et al. |
| 2001/0037298 A1 | 11/2001 | Ehrman et al. |
| 2001/0044811 A1 | 11/2001 | Ballantyne et al. |
| 2001/0056361 A1 | 12/2001 | Sendouda |
| 2002/0002478 A1 | 1/2002 | Swart et al. |
| 2002/0007289 A1 | 1/2002 | Malin et al. |
| 2002/0010781 A1 | 1/2002 | Tuatini |
| 2002/0013767 A1 | 1/2002 | Katz |
| 2002/0016655 A1 | 2/2002 | Joao |
| 2002/0019821 A1 | 2/2002 | Rosenbluth |
| 2002/0022979 A1 | 2/2002 | Whipp et al. |
| 2002/0026336 A1 | 2/2002 | Eizenburg et al. |

(56) References Cited

U.S. PATENT DOCUMENTS

| | | |
|---|---|---|
| 2002/0026337 A1 | 2/2002 | Sasaki |
| 2002/0032626 A1 | 3/2002 | DeWolf et al. |
| 2002/0032706 A1 | 3/2002 | Perla et al. |
| 2002/0032790 A1 | 3/2002 | Linderman |
| 2002/0035488 A1 | 3/2002 | Aquila et al. |
| 2002/0042849 A1 | 4/2002 | Ho et al. |
| 2002/0046301 A1 | 4/2002 | Shannon et al. |
| 2002/0059345 A1 | 5/2002 | Wang et al. |
| 2002/0072938 A1 | 6/2002 | Black et al. |
| 2002/0073012 A1 | 6/2002 | Lowell et al. |
| 2002/0077871 A1 | 6/2002 | Udelhoven et al. |
| 2002/0082912 A1 | 6/2002 | Batachia et al. |
| 2002/0087374 A1 | 7/2002 | Boubez et al. |
| 2002/0091533 A1 | 7/2002 | Ims et al. |
| 2002/0095319 A1 | 7/2002 | Swart et al. |
| 2002/0099575 A1 | 7/2002 | Hubbard et al. |
| 2002/0099613 A1 | 7/2002 | Swart et al. |
| 2002/0111846 A1 | 8/2002 | Singer |
| 2002/0120459 A1 | 8/2002 | Dick et al. |
| 2002/0120776 A1 | 8/2002 | Eggebraaten et al. |
| 2002/0129021 A1 | 9/2002 | Brown |
| 2002/0143644 A1 | 10/2002 | Tosun et al. |
| 2002/0143819 A1 | 10/2002 | Han et al. |
| 2002/0152100 A1 | 10/2002 | Chen et al. |
| 2002/0156693 A1 | 10/2002 | Stewart et al. |
| 2002/0177926 A1 | 11/2002 | Lockwood et al. |
| 2002/0184219 A1 | 12/2002 | Preisig et al. |
| 2002/0186144 A1 | 12/2002 | Meunier |
| 2002/0194219 A1 | 12/2002 | Bradley et al. |
| 2002/0198743 A1 | 12/2002 | Ariathurai et al. |
| 2003/0004746 A1 | 1/2003 | Kheirolomoom et al. |
| 2003/0005181 A1 | 1/2003 | Bau et al. |
| 2003/0014295 A1 | 1/2003 | Brookes et al. |
| 2003/0014442 A1 | 1/2003 | Shiigi et al. |
| 2003/0014733 A1 | 1/2003 | Ringseth et al. |
| 2003/0023463 A1 | 1/2003 | Dombroski et al. |
| 2003/0023957 A1 | 1/2003 | Bau et al. |
| 2003/0028404 A1 | 2/2003 | Herron et al. |
| 2003/0028533 A1 | 2/2003 | Bata et al. |
| 2003/0033369 A1 | 2/2003 | Bernhard |
| 2003/0036930 A1 | 2/2003 | Matos et al. |
| 2003/0036966 A1 | 2/2003 | Amra et al. |
| 2003/0050942 A1 | 3/2003 | Ruellan et al. |
| 2003/0055868 A1 | 3/2003 | Fletcher et al. |
| 2003/0074423 A1 | 4/2003 | Mayberry et al. |
| 2003/0093402 A1 | 5/2003 | Upton |
| 2003/0093403 A1 | 5/2003 | Upton |
| 2003/0093470 A1 | 5/2003 | Upton |
| 2003/0093575 A1 | 5/2003 | Upton |
| 2003/0097286 A1 | 5/2003 | Skeen |
| 2003/0101190 A1 | 5/2003 | Horvitz et al. |
| 2003/0110315 A1 | 6/2003 | Upton |
| 2003/0114967 A1 | 6/2003 | Good |
| 2003/0115548 A1 | 6/2003 | Melgar |
| 2003/0115572 A1 | 6/2003 | Zondervan et al. |
| 2003/0120464 A1 | 6/2003 | Taft et al. |
| 2003/0120502 A1 | 6/2003 | Robb et al. |
| 2003/0120665 A1 | 6/2003 | Fox et al. |
| 2003/0125992 A1 | 7/2003 | Rogers et al. |
| 2003/0126063 A1 | 7/2003 | Reuter et al. |
| 2003/0131073 A1 | 7/2003 | Lucovsky et al. |
| 2003/0135584 A1 | 7/2003 | Roberts et al. |
| 2003/0145047 A1 | 7/2003 | Upton |
| 2003/0145067 A1 | 7/2003 | Cover et al. |
| 2003/0149600 A1 | 8/2003 | Williams |
| 2003/0154111 A1 | 8/2003 | Dutra et al. |
| 2004/0001575 A1 | 1/2004 | Tang |
| 2004/0039612 A1 | 2/2004 | Fitzgerald et al. |
| 2004/0054600 A1 | 3/2004 | Shike et al. |
| 2004/0075581 A1 | 4/2004 | Staniszewski |
| 2004/0093134 A1 | 5/2004 | Barber et al. |
| 2004/0172260 A1 | 9/2004 | Junger et al. |
| 2004/0243423 A1 | 12/2004 | Rix et al. |
| 2004/0243619 A1* | 12/2004 | Kelly et al. ............ 707/102 |
| 2005/0021378 A1 | 1/2005 | Weinstock et al. |
| 2005/0091087 A1 | 4/2005 | Smith et al. |
| 2005/0119921 A1 | 6/2005 | Fitzgerald et al. |
| 2005/0125261 A1 | 6/2005 | Adegan |
| 2005/0144048 A1 | 6/2005 | Belanger et al. |
| 2005/0187833 A1 | 8/2005 | Royer et al. |
| 2005/0197866 A1 | 9/2005 | Salcedo et al. |
| 2005/0246206 A1 | 11/2005 | Obora et al. |
| 2006/0031041 A1 | 2/2006 | Afshar et al. |
| 2006/0035692 A1 | 2/2006 | Kirby et al. |
| 2006/0190273 A1 | 8/2006 | Wilbrink et al. |
| 2007/0174081 A1 | 7/2007 | Smith et al. |
| 2007/0198311 A1 | 8/2007 | Menendez et al. |
| 2007/0203777 A1* | 8/2007 | Berkey et al. ............ 705/8 |
| 2007/0239494 A1 | 10/2007 | Stephens et al. |
| 2007/0260496 A1 | 11/2007 | Weinstock et al. |
| 2007/0271124 A1 | 11/2007 | Weinstock et al. |
| 2007/0271125 A1 | 11/2007 | Weinstock et al. |
| 2007/0271128 A1 | 11/2007 | Bolling |
| 2007/0294116 A1 | 12/2007 | Stephens et al. |
| 2008/0010105 A1 | 1/2008 | Rose et al. |
| 2008/0046261 A1 | 2/2008 | Cunningham |
| 2008/0097798 A1 | 4/2008 | DeVallance et al. |
| 2008/0133281 A1 | 6/2008 | Bolt et al. |
| 2008/0140460 A1 | 6/2008 | Smith et al. |
| 2008/0162199 A1 | 7/2008 | Smith et al. |
| 2008/0243562 A1 | 10/2008 | Weinstock et al. |
| 2008/0243563 A1 | 10/2008 | Weinstock et al. |
| 2008/0249814 A1 | 10/2008 | Weinstock et al. |
| 2009/0018859 A1 | 1/2009 | Purifoy et al. |
| 2010/0023352 A1 | 1/2010 | Smith et al. |
| 2012/0197672 A1 | 8/2012 | Smith et al. |
| 2012/0203582 A1 | 8/2012 | Smith et al. |
| 2013/0159033 A1 | 6/2013 | Weinstock et al. |
| 2013/0218614 A1 | 8/2013 | Weinstock et al. |
| 2013/0238373 A1 | 9/2013 | Smith et al. |

FOREIGN PATENT DOCUMENTS

| | | |
|---|---|---|
| WO | 0052601 A1 | 9/2000 |
| WO | 02057873 | 7/2002 |
| WO | 02067079 | 8/2002 |
| WO | 02067175 A2 | 8/2002 |
| WO | 02080646 | 10/2002 |
| WO | 02097700 A2 | 12/2002 |

OTHER PUBLICATIONS

Pyron, Tim, "Special Edition Using Microsoft Office Project 2003", Feb. 3, 2004, Chapter 3 :Setting Up a Project Document.*
Project Management Central , Aug. 5, 2004.*
Kennemer, Brian, "Microsoft Project Tutorial: Duration and task Types", Jul. 13, 2001.*
Interactions, vol. 7, Issue 12, Dec. 1998.
Interactions, vol. 7, Issue 5, May 1998.
Interactions, vol. 7, Issue 7, Jul. 1998.
Interactions, vol. 7, Issue 8, Aug. 1998.
Interactions, vol. 8, Issue 7, Jul. 1999.
Interactions, vol. 8, Issue 8, Aug. 1999.
Interactions, vol. 8, Issue 9, Sep. 1999.
Interactions, vol. 9, Issue 2, Feb. 2000.
Interactions, vol. 9, Issue 3, Mar. 2000.
Interactions, vol. 9, Issue 5, May 2000.
International Preliminary Report on Patentability (Chapter I) for PCT/US2007/025327 issued Jun. 25, 2009.
International Search Report for PCT/US2007/025327 dated May 21, 2008.
Internet Networking Architecture, 1999.
Introducing ARMS Claims, Jun. 2000, pp. 1-6.
IS General Use Programs—Section 19, AACB34 Callback Fax Customization, Mar. 5, 1998.
Lone Star Rental Systems, EZ Traker™, Your Complete Auto Rental Management Solution.
Lorentz, Jeff, Functional Specification, Internet Application Development, ARMS Automotive, pp. 1-3.
Milligan, Michael, "OTA targets mid-January to release e-commerce protocol", Travel Weekly, Jan. 10, 2000.

(56) References Cited

OTHER PUBLICATIONS

Net rentacar.com User Guide, pp. 1-19.
Notice of Allowance for U.S. Appl. No. 12/179,071 dated Dec. 30, 2011.
Office Action for U.S. Appl. No. 10/343,576 dated Aug. 3, 2009.
Office Action for U.S. Appl. No. 10/343,576 dated Nov. 19, 2008.
Office Action for CA Application No. 2416840 dated Jan. 7, 2005.
Office Action for CA Application No. 2416840 dated Mar. 5, 2010.
Office Action for EP Application No. 01273072.7 dated Apr. 11, 2004.
Office Action for U.S. Appl. No. 10/343,576 dated Feb. 4, 2010.
Office Action for U.S. Appl. No. 10/865,116 dated May 12, 2011.
Office Action for U.S. Appl. No. 10/865,116 dated Oct. 28, 2010.
Office Action for U.S. Appl. No. 11/823,782 dated Feb. 17, 2011.
Office Action for U.S. Appl. No. 11/929,277 dated Oct. 12, 2010.
Office Action for U.S. Appl. No. 11/929,350 dated Feb. 7, 2011.
Office Action for U.S. Appl. No. 11/929,473 dated Oct. 12, 2010.
Office Action for U.S. Appl. No. 12/178,037 dated Nov. 17, 2010.
Open Travel Alliance, "ebXML Uses Opentravel Alliance Specification for Early Tests", May 10, 2000.
Open Travel Alliance, "Open Travel Alliance Joins Forces with DISA", Sep. 9, 1999.
Open Travel Alliance, "Open Travel Alliance Names Board Officers", Sep. 2, 1999.
Open Travel Alliance, "OpenTravel Alliance's New XML Specification Creates a Common Customer Profile for Travelers", Feb. 29, 2000.
Open Travel Alliance, "White Paper", pp. 1-20, Feb. 2000.
Orion Systems, Ltd., System Overview and Handheld Terminals, downloaded from www.orsys.com on Dec. 1, 1997, pp. 1-5.
Orion Systems, Ltd., System Overview with Screens and Reports, May 1996.
PC/ARMS Demonstration, pp. 1-45, 1995.
Preview Travel, Inc., Car Reservations, 1999.
Prosecution History for U.S. Appl. No. 09/641,820, now USPN 7,275,038, filed Aug. 18, 2000 (as of Apr. 20, 2011).
Prosecution History for U.S. Appl. No. 09/694,050, now USPN 7,899,690, filed Oct. 20, 2000—Part 1-3 (as of Apr. 20, 2011).
Prosecution History for U.S. Appl. No. 10/343,576, filed Jan. 31, 2003—Part 1-3 (as of Apr. 20, 2011).
Prosecution History for U.S. Appl. No. 11/609,844, filed Dec. 12, 2006 (as of Apr. 20, 2011).
Prosecution History for U.S. Appl. No. 11/868,266, filed Oct. 5, 2007 (as of Apr. 20, 2011).
Prosecution History for U.S. Appl. No. 12/179,071, filed Jul. 24, 2008 (as of Apr. 20, 2011).
Rental Redesign, Rental Management, RMS (Rental Management Services), Sep. 30, 1998, pp. 1-2.
Enterprise Rent-A-Car, ARMS Online Reporting, Project Charter, Version 1.0, Aug. 20, 1999, pp. 1-7.
Everything You Need to Know About ARMS Automotive, 2000, pp. 1-8.
Fix Auto Collision, EMS Web Agent 1.0, White Paper, Version 1.0, Draft 01, Dec. 9, 2003, pp. 1-18.
Fix Auto, downloaded from https://www.fixauto.com/default.aspx, Sep. 14, 2006, 20 pages.
Graham et al., "Building Web Services with Java?: Making Sense of XML, SOAP, WSDL, and UDDI", Internet Citation, Dec. 12, 2001, Retrieved from the Internet: <URL:http://proquest.safaribooksonline.com/0672321815>.
http://www.eautoclaims.com, pp. 1-11, Apr. 8, 2000.
http://www.hertz.com/InteractionRes/htm/isexckge.htm, pp. 1-2, Mar. 20, 1997.
Interactions, "Electronic Connections", p. 3, Mar. 15, 1995.
Interactions, ARMS Update, vol. 6, Issue 2, Feb. 1997.
Interactions, ARMS, vol. 3, No. 6, Mar. 15, 1994.
Interactions, Published especially for our Farmers adjusters, 1994.
Interactions, Special Edition, Nov. 1992.
Interactions, Special Edition, vol. 1, No. 4, Aug. 1992.
Interactions, vol. 1, No. 3, Jul. 1992.
Interactions, vol. 1, No. 5, Sep. 1992.
Interactions, vol. 1, No. 8, Dec. 1992.
Interactions, vol. 2, No. 1, Jan. 1993.
Interactions, vol. 2, No. 11, Oct. 1, 1993.
Interactions, vol. 2, No. 13, Nov. 1, 1993.
Interactions, vol. 2, No. 14, Nov. 15, 1993.
Interactions, vol. 2, No. 5, May 1993.
Interactions, vol. 2, No. 7, Jul. 1993.
Interactions, vol. 2, No. 8, Aug. 1993.
Interactions, vol. 3, No. 1, Jan. 1, 1994.
Interactions, vol. 3, No. 1, Jan. 15, 1994.
Interactions, vol. 3, No. 10, May 15, 1994.
Interactions, vol. 3, No. 11, Jun. 1, 1994.
Interactions, vol. 3, No. 12, Jun. 15, 1994.
Interactions, vol. 3, No. 14, Jul. 15, 1994.
Interactions, vol. 3, No. 15, Aug. 1, 1994.
Interactions, vol. 3, No. 16, Aug. 15, 1994.
Interactions, vol. 3, No. 21, Nov. 1, 1994.
Interactions, vol. 3, No. 23, Dec. 1, 1994.
Interactions, vol. 3, No. 8, Apr. 15, 1994.
Interactions, vol. 4, Issue 14, Jul. 15, 1995.
Interactions, vol. 4, Issue 16, Aug. 15, 1995.
Interactions, vol. 4, Issue 19, Oct. 1, 1995.
Interactions, vol. 4, Issue 21, Nov. 1, 1995.
Interactions, vol. 4, Issue 24, Dec. 15, 1995.
Interactions, vol. 4, No. 3, Feb. 1, 1995.
Interactions, vol. 4, No. 6, Mar. 15, 1995.
Interactions, vol. 4, No. 9, May 1, 1995.
Interactions, vol. 5, Issue 1, Jan. 1, 1996.
Interactions, vol. 5, Issue 13, Oct. 1, 1996.
Interactions, vol. 5, Issue 14, Nov. 1, 1996.
Interactions, vol. 5, Issue 2, Jan. 15, 1996.
Interactions, vol. 5, Issue 4, Feb. 15, 1996.
Interactions, vol. 6, Issue 12, Dec. 1997.
Interactions, vol. 6, Issue 8, Aug. 1997.
Interactions, vol. 7, Issue 1, Jan. 1998.
"ARMS Automotive Web Service Process Overview", 8 pages, 2004.
"Cieca Estimate Management Standard", Version 2.01, Feb. 3, 1999 and Jun. 19, 2001, 54 pp.
"Communicating Status Updates Just Got Easier", 2 pages, Creation Date of Oct. 26, 2006.
"Enterprise ARMS Your Shop With the Competitive Edge", 2 pages, Creation Date of Oct. 2007.
"Fix Auto WEB—CMS Repair Delay Form", 3 pages, 2004.
"Information on Hertz Corporation"; Sep. 24, 2002; pp. 1-61.
"Rental Management for Vehicle Replacement Rentals", National Electronic Data Interchange Transaction Set Implementation Guide, 272/824, Jul. 2000.
"Rental Management Invoicing and Application Advice for Vehicle Replacement Rentals", National Electronic Data Interchange Transaction Set Implementation Guide, 811/824, Jul. 2000.
"Rental Management Remittance Advice for Vehicle Replacement Rentals", National Electronic Data Interchange Transaction Set Implementation Guide, 820, Jul. 2000.
"Welcome to the Hertz Interactive Reservation Process"; Mar. 3, 2000; pp. 62-27.
"What Is Windows Communication Foundation?", downloaded from http://msdn.microsoft.com/en-us/library/ms731082(printer).aspx on Aug. 27, 2008, 6 pages.
10K Report; Agency Rent-A-Car Inc.; Report No. 0127651; Section Heading: Part I, Item 1. Business; Jan. 31, 1994; p. 4 of 54.
Amendment and Response to Office Action submitted Apr. 20, 2009 for U.S. Appl. No. 10/343,576.
ARMS 400 Demonstration, p. 1-67.
ARMS Claims Internet Quick Reference Guide, Oct. 1999.
ARMS Electronic Callback System Demonstration, pp. 1-22, 1998.
ARMS Overview, pp. 1-10.
ARMS Technology, Jul. 2000.
ARMS/400—Automated Rental Management System, pp. 1-8, 1995.
ARMS/400 Automated Rental Management System, Copyright 1998.

(56) References Cited

OTHER PUBLICATIONS

ARMS/400 Automated Rental Management System, Copyright 1999.
ARMS/400 User Manual, 1999.
Automated Rentals, Unwrapped, pp. 1-7, Oct. 1995.
CarTemps Rent-A-Car; "CarTemps MPOWERENT Management System"; Instruction Manual; Copyright 2000; v1.1; publication date unknown.
Clip, "Servlets: CGI the Java Way", Byte, May 1, 1998, pp. 55-56, vol. 23, No. 5, McGraw-Hill, Inc., St. Peterborough, US.
Collision Industry Electronic Commerce Association Business Message Specification Schema, Jul. 30, 2003.
Copyright Chronicle Publishing Company, May 2, 1997, "Booking a room, vehicle for vacation via the 'Net", Pantagraph, C.1.
Curbera et al., "Unraveling the Web Services Web: An Introduction to SOAP, WSDL, and UDDI", IEEE Internet Computing, Mar. 1, 2002, pp. 86-93, vol. 6, No. 2, IEEE Service Center, New York, NY, US.
D.P. General Use Programs, AACB10 Consolidated Callback Maintenance, Apr. 1994, pp. 1-4.
Darrah, "Hi-Tech Streamlines Car Rental Process", Feb. 1999, p. 29, vol. 66, Issue 2.
Data Warehouse & Analyzer Quick Sheet, Jun. 2000, pp. 1-2.
Dollar Rent A Car Systems, Inc., pp. 1-5, 1998.
ECARS—Enterprise Computer Assisted Rental System, AACJO1 Callbacks, pp. 1-9, Jul. 1, 1997.
ECARS 2000 Customer Profile, Chapters 1-16.
Election with Partial Traversal in Response to Restriction Requirement submitted Sep. 2, 2009 for U.S. Appl. No. 10/343,576.
Enterprise Computer Assisted Rental System Workbook, Dec. 1996.
Enterprise Computer Assisted Rental System Workbook, Sep. 1997.
Enterprise Network and Physical Connections Overview, 1995, pp. 1-5.
Enterprise Rent-A-Car ARMS—Vehicle Messaging System, Project Charter, Oct. 15, 1998, pp. 1-7.
Enterprise Rent-A-Car Company ARMS—Vehicle Messaging System Overview, May 16, 2001, p. 1-35.
Enterprise Rent-A-Car Company ARMS—Vehicle Messaging System Phase II Project Charter, Aug. 20, 1999, p. 1-6.
Enterprise Rent-A-Car Company, ARMS Basics and Concepts, vol. 1, Chapter 1-4, Feb. 24, 1998.
Enterprise Rent-A-Car Company, ARMS Basics and Concepts, vol. 1, Chapters 1-4, Jun. 10, 1998.
Enterprise Rent-A-Car Company, Functional Specification, pp. 1-2, Nov. 1999.
Response to Office Action for CA Application 2416840 dated Sep. 3, 2010.
Response to Office Action for CA Application No. 2416840 dated Jul. 7, 2005.
Response to Office Action for EP Application No. 01273072.7 dated Aug. 30, 2005.
Response to Office Action for U.S. Appl. No. 11/929,277 dated Oct. 12, 2010.
Rosen, Cheryl, "OTA Debuts Data Protocol", Business Travel News, Jan. 10, 2000.
Rosen, Cheryl, "OTA Publishes XML Data Standard", Business Travel News, pp. 1-2, Mar. 20, 2000.
Spreadsheet Calculator Form for Allstate, 14 pages, File Creation Date of May 6, 2007.
Spreadsheet Calculator Form to Estimate Formula Days, 9 pages, File Creation Date of Jan. 16, 2006.
The ARMS Connection, Safeco/Enterprise Rent-A-Car, pp. 1-4.
The Connection, State Farm Insurance/Enterprise Rent-A-Car, Rental Process Automation and Procedures, pp. 1-3.
The Hertz Corporation, 1998.
Travel Agent, "Many Ways to Sell", Oct. 2, 1995, vol. 0, No. 0, p. 36.
TSD Brochure, "Are You Comparing Apples to Apples When Choosing Rental Software", p. 1-3.
TSD Brochure, Rent 2000 from TSD, Rental Management Software, Revolutionize the Way You Do Business with the Proven Solution, p. 1-2.
TSD Brochure, Rent 2000 from TSD, Rental Management Software, Revolutionize the Way You Do Business, p. 1-29.
U.S. Appl. No. 60/527,762, filed Dec. 9, 2003 (Adegan).
U.S. Appl. No. 60/692,886, filed Jun. 21, 2005 (Kelly et al.).
U.S. Appl. No. 60/828,540, filed Oct. 5, 2006 (Smith et al.).
U.S. Appl. No. 09/564,911, filed May 4, 2000 (Williams).
U.S. Appl. No. 09/698,491, filed Oct. 27, 2000 (Menendez et al.).
U.S. Appl. No. 09/698,502, filed Oct. 27, 2000 (Menendez et al.).
U.S. Appl. No. 09/698,552, filed Oct. 27, 2000 (Menendez et al.).
U.S. Appl. No. 11/472,168, filed Jun. 21, 2006 (Kelly et al.).
Wustner et al., "Converting Business Documents: A Classification of Problems and Solutions Using XML/XSLT", Advanced Issues of E-Commerce and Web-Based Information Systems, Jun. 26-28, 2002, Proceedings of the Fourth IEEE International Workshop, Piscataway, NJ, US, IEEE, 8 pages.
www.Hertz.com (archived Feb. 29, 2000).
Yenckel, "For This Cyberspace Visitor, Once Is More Than Enough", Feb. 11, 1996, p. E.01, The Washington Post (Pre-1997 Fulltext), ISSN 01908286.
Office Action for U.S. Appl. No. 13/447,769 dated Nov. 13, 2013.
Office Action for U.S. Appl. No. 13/447,821 dated Aug. 9, 2013.
Office Action for U.S. Appl. No. 13/447,821 dated Oct. 11, 2012.
Office Action for CA Application 2613930 dated Jan. 21, 2014.

\* cited by examiner

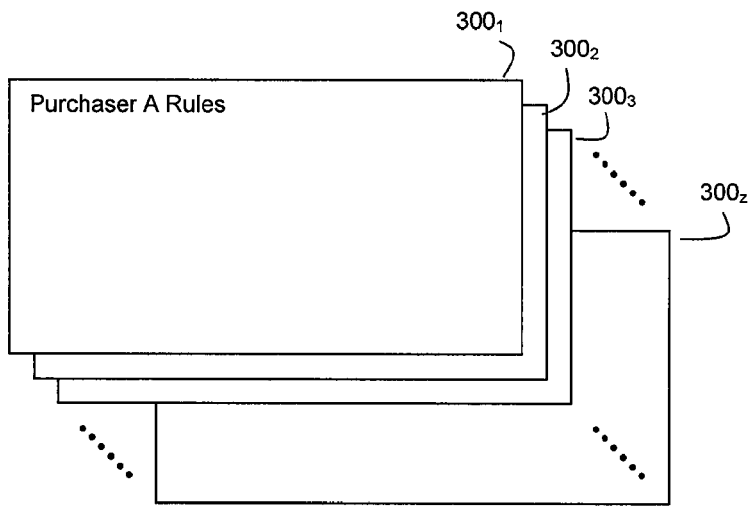

Figure 3(a)

Purchaser j Rules:
 Labor Hours Scalar: 6.67
 Nondriveable Adjustment: 3 days
 Weekends Adjustment: 2 days
 Holidays Adjustment: 1 day
 Automated Extensions: Yes
 Automated Callback Scheduling: Yes

| Explanation (304) | Category (306) | Amount (308) |
|---|---|---|
| Explanation 1 | Adjustment | 3 days |
| Explanation 2 | Extension | 1 day |
| Explanation 3 | Extension | 5 days |
| ... | ... | ... |
| Explanation i | Adjustment | 2 days |
| ... | ... | ... |
| Explanation n | Adjustment | 2 days |

Purchaser k Rules:
- Labor Hours Scalar: 6.0
- Nondriveable Adjustment: 3 days
- Weekends Adjustment: 2 days
- Holidays Adjustment: 1 day
- Automated Extensions: Yes
- Automated Callback Scheduling: Yes

302

310

| Explanation (304) | Category (306) | Amount (308) | Include for Auto Extension (312) |
|---|---|---|---|
| Explanation 1 | Extension | 2 days | No |
| Explanation 2 | Extension | 2 days | Yes |
| Explanation 3 | Extension | 3 days | No |
| ⋮ | ⋮ | ⋮ | ⋮ |
| Explanation i | Adjustment | 3 days | No |
| ⋮ | ⋮ | ⋮ | ⋮ |
| Explanation n | Extension | 2 days | Yes |

Figure 3(c)

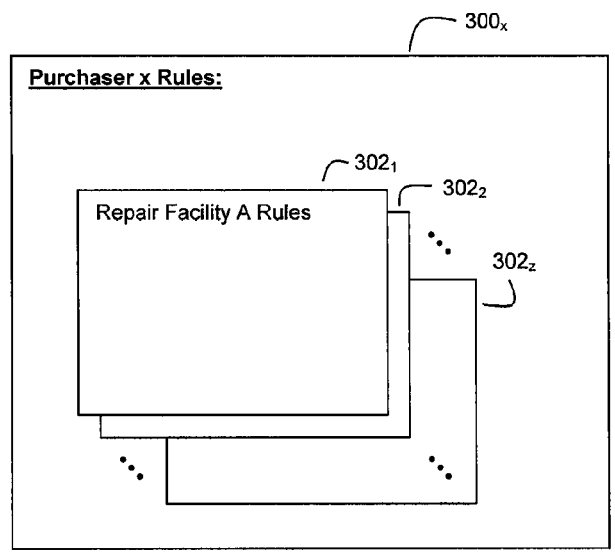

Figure 3(d)

Purchaser q Callback Scheduling Rules — 400q, 406

| Days Between LUD and LAD | Scheduled Callback Date |
|---|---|
| 0-2 Days | Same Day as LAD |
| 3-5 Days | 1 Day Before LAD |
| 6-8 Days | 2 Days Before LAD |
| 9-14 Days | 3 Days Before LAD |
| 15+ Days | 4 Days Before LAD |

Figure 4(c)

Repair Facility X Audit Report
mm/dd/yyy
Year-to-Date Statistics for Repairs Performed by Repair Facility X On Behalf of Insurance Company Y

| | Repair Facility X | Local Area Average | Industry Average | Local Area Rank | Industry Rank |
|---|---|---|---|---|---|
| Average Number of Rental Days for Reservations Corresponding to All Vehicles Repaired | ... | ... | ... | ... | ... |
| Average Number of Rental Days for Reservations Corresponding to Driveable Vehicles Repaired | ... | ... | ... | ... | ... |
| Average Number of Rental Days for Reservations Corresponding to Nondriveable Vehicles Repaired | ... | ... | ... | ... | ... |
| Percentage of All Repairs Completed within Initial Target Completion Date | ...% | ...% | ...% | ... | ... |
| Percentage of Repairs for Driveable Vehicles Completed within Initial Target Completion Date | ...% | ...% | ...% | ... | ... |
| Percentage of Repairs for Nondriveable Vehicles Completed within Initial Target Completion Date | ...% | ...% | ...% | ... | ... |
| Percentage of All Repairs Completed without Extensions | ...% | ...% | ...% | ... | ... |
| Percentage of Repairs for Driveable Vehicles Completed without Extensions | ...% | ...% | ...% | ... | ... |
| Percentage of Repairs for Nondriveable Vehicles Completed without Extensions | ...% | ...% | ...% | ... | ... |
| Average Number of Labor Hours to Repair Disabled Vehicle for All Repairs | ... | ... | ... | ... | ... |
| Average Number of Labor Hours to Repair Disabled Vehicle for Repairs to Driveable Vehicles | ... | ... | ... | ... | ... |
| Average Number of Labor Hours to Repair Disabled Vehicle for Repairs to Nondriveable Vehicles | ... | ... | ... | ... | ... |
| Average Length of Extension Period for All Repairs where Reservation Extensions Needed | ... | ... | ... | ... | ... |
| Average Length of Extension Period for All Repairs to Driveable Vehicles where Reservation Extensions Needed | ... | ... | ... | ... | ... |
| Average Length of Extension Period for All Repairs to Nondriveable Vehicles where Reservation Extensions Needed | ... | ... | ... | ... | ... |

Repair Facility X Audit Report
mm/dd/yyy
Year-to-Date Statistics for Repairs Performed by Repair Facility X On Behalf of Insurance Company Y

⋮

|  | Repair Facility X | Local Area Average | Industry Average | Local Area Rank | Industry Rank |
|---|---|---|---|---|---|
| Average Adjustment Amount for All Repairs due to Adjustment Explanation 1 | ... | ... | ... | ... | ... |
| Average Adjustment Amount for Repairs to Driveable Vehicles due to Adjustment Explanation 1 | ... | ... | ... | ... | ... |
| Average Adjustment Amount for Repairs to Nondriveable Vehicles due to Adjustment Explanation 1 | ... | ... | ... | ... | ... |
| Average Adjustment Amount to All Repairs due to Adjustment Explanation 2 | ... | ... | ... | ... | ... |
| Average Adjustment Amount for Repairs to Driveable Vehicles due to Adjustment Explanation 2 | ... | ... | ... | ... | ... |
| Average Adjustment Amount for Repairs to Nondriveable Vehicles due to Adjustment Explanation 2 | ... | ... | ... | ... | ... |

⋮

| Average Adjustment Amount to All Repairs due to Adjustment Explanation n | ... | ... | ... | ... | ... |
| Average Adjustment Amount for Repairs to Driveable Vehicles due to Adjustment Explanation n | ... | ... | ... | ... | ... |
| Average Adjustment Amount for Repairs to Nondriveable Vehicles due to Adjustment Explanation n | ... | ... | ... | ... | ... |

Repair Facility X Audit Report
mm/dd/yyy
Year-to-Date Statistics for Repairs Performed by Repair Facility X On Behalf of Insurance Company Y

⋮

|  | Repair Facility X | Local Area Average | Industry Average | Local Area Rank | Industry Rank |
|---|---|---|---|---|---|
| Percentage of All Adjustments for All Repairs due to Adjustment Explanation 1 | ... % | ... % | ... % | ... | ... |
| Percentage of All Adjustments for Repairs to Driveable Vehicles due to Adjustment Explanation 1 | ... % | ... % | ... % | ... | ... |
| Percentage of All Adjustments for Repairs to Nondriveable Vehicles due to Adjustment Explanation 1 | ... % | ... % | ... % | ... | ... |
| Percentage of All Adjustments for All Repairs due to Adjustment Explanation 2 | ... % | ... % | ... % | ... | ... |
| Percentage of All Adjustments for Repairs to Driveable Vehicles due to Adjustment Explanation 2 | ... % | ... % | ... % | ... | ... |
| Percentage of All Adjustments for Repairs to Nondriveable Vehicles due to Adjustment Explanation 2 | ... % | ... % | ... % | ... | ... |

⋮

| Percentage of All Adjustments for All Repairs due to Adjustment Explanation n | ... % | ... % | ... % | ... | ... |
| Percentage of All Adjustments for Repairs to Driveable Vehicles due to Adjustment Explanation n | ... % | ... % | ... % | ... | ... |
| Percentage of All Adjustments for Repairs to Nondriveable Vehicles due to Adjustment Explanation n | ... % | ... % | ... % | ... | ... |

Repair Facility X Audit Report
mm/dd/yyy
Year-to-Date Statistics for Repairs Performed by Repair Facility X On Behalf of Insurance Company Y

⋮

|  | Repair Facility X | Local Area Average | Industry Average | Local Area Rank | Industry Rank |
|---|---|---|---|---|---|
| Average Extension Amount for All Repairs due to Extension Explanation 1 | ... | ... | ... | ... | ... |
| Average Extension Amount for Repairs to Driveable Vehicles due to Extension Explanation 1 | ... | ... | ... | ... | ... |
| Average Extension Amount for Repairs to Nondriveable Vehicles due to Extension Explanation 1 | ... | ... | ... | ... | ... |
| Average Extension Amount to All Repairs due to Extension Explanation 2 | ... | ... | ... | ... | ... |
| Average Extension Amount for Repairs to Driveable Vehicles due to Extension Explanation 2 | ... | ... | ... | ... | ... |
| Average Extension Amount for Repairs to Nondriveable Vehicles due to Extension Explanation 2 | ... | ... | ... | ... | ... |

⋮

| Average Extension Amount to All Repairs due to Extension Explanation n | ... | ... | ... | ... | ... |
| Average Extension Amount for Repairs to Driveable Vehicles due to Extension Explanation n | ... | ... | ... | ... | ... |
| Average Extension Amount for Repairs to Nondriveable Vehicles due to Extension Explanation n | ... | ... | ... | ... | ... |

Repair Facility X Audit Report
mm/dd/yyy
Year-to-Date Statistics for Repairs Performed by Repair Facility X On Behalf of Insurance Company Y

⋮

|  | Repair Facility X | Local Area Average | Industry Average | Local Area Rank | Industry Rank |
|---|---|---|---|---|---|
| Percentage of All Extensions for All Repairs due to Extension Explanation 1 | ... % | ... % | ... % | ... | ... |
| Percentage of All Extensions for Repairs to Driveable Vehicles due to Extension Explanation 1 | ... % | ... % | ... % | ... | ... |
| Percentage of All Extensions for Repairs to Nondriveable Vehicles due to Extension Explanation 1 | ... % | ... % | ... % | ... | ... |
| Percentage of All Extensions for All Repairs due to Extension Explanation 2 | ... % | ... % | ... % | ... | ... |
| Percentage of All Extensions for Repairs to Driveable Vehicles due to Extension Explanation 2 | ... % | ... % | ... % | ... | ... |
| Percentage of All Extensions for Repairs to Nondriveable Vehicles due to Extension Explanation 2 | ... % | ... % | ... % | ... | ... |

⋮

|  |  |  |  |  |  |
|---|---|---|---|---|---|
| Percentage of All Extensions for All Repairs due to Extension Explanation n | ... % | ... % | ... % | ... | ... |
| Percentage of All Extensions for Repairs to Driveable Vehicles due to Extension Explanation n | ... % | ... % | ... % | ... | ... |
| Percentage of All Extensions for Repairs to Nondriveable Vehicles due to Extension Explanation n | ... % | ... % | ... % | ... | ... |

Rental Company 1 Audit Report
mm/dd/yyy
Year-to-Date Statistics for Replacement Reservations Placed with Rental Company 1 by Insurance Company Y

|  | Rental Company 1 | Industry Average | Industry Rank |
|---|---|---|---|
| Average Replacement Rental Length | ... | ... | ... |
| Average Cost Per Day for All Replacement Rentals | ... | ... | ... |
| Average Cost Per Day for Replacement Rentals within Car Class 1 | ... | ... | ... |
| Average Cost Per Day for Replacement Rentals within Car Class 2 | ... | ... | ... |
| ⋮ | | | |
| Average Cost Per Day for Replacement Rentals within Car Class n | ... | ... | ... |
| Percentage of Callbacks Performed as Scheduled | ... % | ... % | ... |
| Percentage of Rentals That Go Beyond Last Authorized Day | ... % | ... % | ... |
| ⋮ | | | |

Rental Company Audit Report
mm/dd/yyy
Year-to-Date Statistics for Replacement Reservations Placed with Rental Companies by Insurance Company Y

| | Rental Company 1 | Rental Company 2 | ...... | Rental Company m | Industry Average |
|---|---|---|---|---|---|
| Average Replacement Rental Length | ... | ... | | ... | ... |
| Average Cost Per Day for All Replacement Rentals | ... | ... | | ... | ... |
| Average Cost Per Day for Replacement Rentals within Car Class 1 | ... | ... | ...... | ... | ... |
| Average Cost Per Day for Replacement Rentals within Car Class 2 | ... | ... | | ... | ... |
| ⋮ | | | | | |
| Average Cost Per Day for Replacement Rentals within Car Class n | ... | ... | | ... | ... |
| Percentage of Callbacks Performed as Scheduled | ... % | ... % | ...... | ... % | ... % |
| Percentage of Rentals That Go Beyond Last Authorized Day | ... % | ... % | | ... % | ... % |
| ⋮ | | | | | |

Figure 9

Insurance Company Y Audit Report
mm/dd/yyy
Year-to-Date Statistics for Reservations Managed by Insurance Company Y

| | All Groups | Adjuster Group 1 | .... | Adjuster Group n | Industry Average | Industry Rank |
|---|---|---|---|---|---|---|
| Average Replacement Rental Length | ... | ... | | ... | ... | ... |
| Average Number of Reservations Managed Per Week | ... | ... | | ... | ... | ... |
| Average Replacement Rental Cost | ... | ... | | ... | ... | ... |
| Average Amount of Initial Authorized Number of Days Per Replacement Rental | ... | ... | | ... | ... | ... |
| Average Amount of Total Authorized Number of Days Per Replacement Rental | ... | ... | | ... | ... | ... |
| Average Extension Amount per Replacement Rental | ... | ... | | ... | ... | ... |
| Average Extension Amount per Extension | ... | ... | .... | ... | ... | ... |
| Percentage of Rentals that Go Beyond Last Authorized Day (for All Disabled Vehicles) | ... % | ... % | | ... % | ... % | ... |
| Percentage of Rentals that Go Beyond Last Authorized Day (for Driveable Vehicles) | ... % | ... % | | ... % | ... % | ... |
| Percentage of Rentals that Go Beyond Last Authorized Day (for Nondriveable Vehicles) | ... % | ... % | | ... % | ... % | ... |
| Percentage of Rentals that End 1 Day Prior to Last Authorized Day | ... % | ... % | | ... % | ... % | ... |
| Percentage of Rentals that End 2 Days Prior to Last Authorized Day | ... % | ... % | | ... % | ... % | ... |
| ⋮ | | | | | | |
| Percentage of Rentals that End 7 Days Prior to Last Authorized Day | ... % | ... % | .... | ... % | ... % | ... |

Insurance Company Y Audit Report
mm/dd/yyy
Year-to-Date Statistics for Reservations Managed by Insurance Company Y

⋮

| ADJUSTER GROUP 1: | Adjuster 1 | Adjuster 2 | .... | Adjuster n | Group Total | Group Rank |
|---|---|---|---|---|---|---|
| Average Replacement Rental Length | ... | ... | | ... | ... | ... |
| Average Number of Reservations Managed Per Week | ... | ... | | ... | ... | ... |
| Average Replacement Rental Cost | ... | ... | | ... | ... | ... |
| Average Amount of Initial Authorized Number of Days Per Replacement Rental | ... | ... | | ... | ... | ... |
| Average Amount of Total Authorized Number of Days Per Replacement Rental | ... | ... | .... | ... | ... | ... |
| Average Extension Amount per Replacement Rental | ... | ... | | ... | ... | ... |
| Average Extension Amount per Extension | ... | ... | | ... | ... | ... |
| Percentage of Rentals that Go Beyond Last Authorized Day (for All Disabled Vehicles) | ... % | ... % | | ... % | ... % | ... |
| Percentage of Rentals that Go Beyond Last Authorized Day (for Driveable Vehicles) | ... % | ... % | | ... % | ... % | ... |
| Percentage of Rentals that Go Beyond Last Authorized Day (for Nondriveable Vehicles) | ... % | ... % | | ... % | ... % | ... |
| Percentage of Rentals that End 1 Day Prior to Last Authorized Day | ... % | ... % | | ... % | ... % | ... |
| Percentage of Rentals that End 2 Days Prior to Last Authorized Day | ... % | ... % | | ... % | ... % | ... |
| ⋮ | | | | | | |
| Percentage of Rentals that End 7 Days Prior to Last Authorized Day | ... % | ... % | .... | ... % | ... % | ... |

Insurance Company Y Audit Report
mm/dd/yyy
Year-to-Date Statistics for Reservations Managed by Insurance Company Y

⋮

| ADJUSTER GROUP n: | Adjuster 1 | Adjuster 2 | .... | Adjuster n | Group Total | Group Rank |
|---|---|---|---|---|---|---|
| Average Replacement Rental Length | ... | ... | | ... | ... | ... |
| Average Number of Reservations Managed Per Week | ... | ... | | ... | ... | ... |
| Average Replacement Rental Cost | ... | ... | | ... | ... | ... |
| Average Amount of Initial Authorized Number of Days Per Replacement Rental | ... | ... | | ... | ... | ... |
| Average Amount of Total Authorized Number of Days Per Replacement Rental | ... | ... | .... | ... | ... | ... |
| Average Extension Amount per Replacement Rental | ... | ... | | ... | ... | ... |
| Average Extension Amount per Extension | ... | ... | | ... | ... | ... |
| Percentage of Rentals that Go Beyond Last Authorized Day (for All Disabled Vehicles) | ... % | ... % | | ... % | ... % | ... |
| Percentage of Rentals that Go Beyond Last Authorized Day (for Driveable Vehicles) | ... % | ... % | | ... % | ... % | ... |
| Percentage of Rentals that Go Beyond Last Authorized Day (for Nondriveable Vehicles) | ... % | ... % | | ... % | ... % | ... |
| Percentage of Rentals that End 1 Day Prior to Last Authorized Day | ... % | ... % | | ... % | ... % | ... |
| Percentage of Rentals that End 2 Days Prior to Last Authorized Day | ... % | ... % | | ... % | ... % | ... |
| ⋮ | | | | | | |
| Percentage of Rentals that End 7 Days Prior to Last Authorized Day | ... % | ... % | .... | ... % | ... % | ... |

Change Repair Estimate Timing Information for Reservation X:     Reservation X Information Here (1502)

Select Explanation for Adjustment to Estimate: (1504)

Hours: (1508) [ ... ]  Days: (1510) [ ... ]  Comments: (1512) [ ... ]

[ Update (1514) ]

[ Add (1516) ]  [ Remove (1518) ]

Estimated Completion Date Explanation Details: (1520)

| Adjustment (1522) | Hours (1524) | Days (1526) |
|---|---|---|
| Total Labor Hours | 22.2 | 3 |
| Nondriveable Status Adjustment | ... | 3 |
| Weekend(s)/Holiday(s) | ... | 2 |
| Waiting on Parts | ... | 2 |
| Disassembly | ... | 2 |
| On Frame Machine | ... | 2 |
| Waiting on Paint Booth | ... | 2 |
| Waiting on Keys | ... | 2 |
| Waiting on Door | ... | 2 |
| Waiting on Tire | ... | 2 |

Summary: (1528)

| | |
|---|---|
| Formula Days (including nondriveable adjustment, if applicable) | 9 |
| Weekend(s)/Holiday(s) Adjustment | 5 |
| Other Adjustment Days | 6 |
| Target Days | 20 |
| Days Needed | 6 |
| Authorized Days | 14 |
| Target Completion Date | 1/20/07 |
| Last Authorized Date | 1/14/07 |

Click for History: (1530)

| Adjustment (1534) | Hours (1536) | Days (1538) | Comments (1540) | Add Date/Time (1542) | User (1544) |
|---|---|---|---|---|---|
| Explanation X | x.x | y | Comments text here | Mm/dd/yy; hh:mm | User ID |
| Explanation Q | x.x | y | Comments text here | Mm/dd/yy; hh:mm | User ID |
| Explanation Y | x.x | y | Comments text here | Mm/dd/yy; hh:mm | User ID |
| Explanation Z | x.x | y | Comments text here | Mm/dd/yy; hh:mm | User ID |

Figure 15(a)

Change Repair Estimate Timing Information for Reservation X: Reservation X Information Here (1502)

Hours: [1508] Days: [1510] Comments: [1512] Select Explanation for Change in Estimate: [1506]

[Update (1514)] [Add (1516)] [Remove (1518)]

Estimated Completion Date Explanation Details:

| Adjustment/Explanation (1522) | Hours | Days | Summary: | |
|---|---|---|---|---|
| Total Labor Hours | 22.2 | 3 | Formula Days (including nondriveable adjustment, if applicable) | 9 |
| Nondriveable Status Adjustment | ... | 3 | Weekend(s)/Holiday(s) Adjustment | 5 |
| Weekend(s)/Holiday(s) | ... | 2 | Other Adjustment Days | 3 |
| Waiting on Parts | ... | 2 | "Extension"-Categorized Days | 3 |
| Disassembly | ... | 2 | Total Days Needed for Repairs | 20 |
| On Frame Machine | ... | 2 | Days Needed | 6 |
| Waiting on Paint Booth | ... | 2 | Authorized Days | 14 |
| Waiting on Keys | ... | 2 | Target Completion Date | 1/17/08 |
| Waiting on Door | ... | 2 | Completion Date Estimation | 1/20/08 |
| Waiting on Tire | ... | 2 | Last Authorized Date | 1/14/08 |

Click for History:

| Adjustment/Explanation (1534) | Hours | Days | Comments (1540) | Add Date/Time | User |
|---|---|---|---|---|---|
| Explanation X | x.x | y | Comments text here | Mm/dd/yy; hh:mm | User ID |
| Explanation Q | x.x | y | Comments text here | Mm/dd/yy; hh:mm | User ID |
| Explanation Y | x.x | y | Comments text here | Mm/dd/yy; hh:mm | User ID |
| Explanation Z | x.x | y | Comments text here | Mm/dd/yy; hh:mm | User ID |

| Create Reservation | Find a Customer | | Action Items | Completed Actions | Reports | Admin | Help |

Choose Company

Claims Office: Office XYZ ▽    Assigned to: All Users ▽

Reporting: for All Users

Callbacks   For: January ▽   2008 ▽   ⊞   Process

| A | B | C | D | E | ... | W | X | Y | Z | 0-9 | Total |
| 3 | 0 | 0 | 0 | 0 |     | 0 | 5 | 0 | 0 | 0   | 25 |

Showing 1-6 of 6

To view your callback details, please select a repair facility's name:

2302

| Repair Facility: | Telephone Number: | Number of Callbacks: |
|---|---|---|
| ABC Repair Shop | (555) 555-1234 | 3 |
| Joe's Body Shop | (555) 555-2345 | 2 |
| Repair Facility M | (555) 555-3456 | 10 |
| Repair Facility N | (555) 555-4567 | 1 |
| Repair Facility O | (555) 555-5678 | 4 |
| XYZ Auto Repairs | (555) 555-6789 | 5 |

Figure 23

| Create Reservation | Find a Customer | Action Items | Completed Actions | Reports | Admin | Help |

Choose Company

RESERVATION INFORMATION HERE
(e.g., Driver Information, Rental Vehicle Information, Reservation Number, Branch Information, Rate Information, etc.)

· · · · · — 2404

— 2402

Notebook:

1/9/2008  10:03 am  Vehicle Complete; Ready for Customer Pickup

1/8/2008  11:30 am  Repair Facility says vehicle will be ready on 1/9

1/5/2008  2:33 pm   Res extended 6 days by Adjuster J. Smith at $25.00/day

| | | | Reports | Admin | Help |
|---|---|---|---|---|---|
| Create Reservation | Find a Customer | Action Items | Completed Actions | | |

Choose Company

ACTION ITEMS:

| Status | Action | Driver | Reservation Number | Purchaser/Reservation Manager |
|---|---|---|---|---|
| ! | Extension | J. Smith | 123456789-4321 | Insurance Company Y: J. Doe |
| ! | Reservation Auth | P. Jones | 234567890-9876 | Auto Dealer X: J. Roe |
| | ......... | | | |
| ! | Extension | J.Q. Public | 987654321-1234 | Insurance Company Z: Adj Grp 5 |

Figure 25

SYSTEM AND METHOD FOR IMPROVED RENTAL VEHICLE RESERVATION MANAGEMENT

CROSS-REFERENCE AND PRIORITY CLAIM TO RELATED PATENT APPLICATIONS

This application is a divisional of U.S. patent application Ser. No. 11/747,645, now U.S. Pat. No. 8,160,906, entitled "System and Method for Improved Rental Vehicle Reservation Management", filed May 11, 2007, which is a continuation-in-part of pending U.S. patent application Ser. No. 11/609,844, entitled "Computer System for Processing Rental Car Reservations with Automated Callback Reminders", filed Dec. 12, 2006, the entire disclosures of each of which are incorporated herein by reference.

FIELD OF THE INVENTION

The present invention is generally directed toward the field of rental vehicle reservation management, particularly the management of replacement rental vehicle reservations.

BACKGROUND AND SUMMARY OF THE INVENTION

Drivers whose regular vehicles are disabled as a result of accidents or otherwise will often need to engage a rental vehicle while their regular vehicles are disabled. As the term is used herein, a vehicle may become disabled by either the driver having had an accident, thereby causing damage for a repair facility (e.g., body shop, mechanic, etc.) to fix, or by simply through mechanical failure, maintenance, or other similar desires or needs for changes requiring the custody of the vehicle to be relinquished to a repair facility. In many instances, an insurance company, automobile dealer, or fleet company will provide a rental vehicle to such drivers as part of the services provided through automobile insurance policies, dealer service policies, or fleet service policies. Such rental vehicles are referred to herein as "replacement rental vehicles" or "replacement vehicles". Replacement rental vehicles represent an important source of business for rental vehicle service providers given the large volumes of drivers whose regular vehicles become disabled (i.e., not fully operative) as a result of accidents, mechanical breakdowns, and other causes.

In this business chain, there are four primary parties—the first is the driver whose vehicle becomes disabled (thereby creating a need for a rental vehicle), the second is the purchaser of rental vehicle services who books a rental vehicle reservation on behalf of the driver (typically an insurance company, automobile dealer, etc.), the third is the rental vehicle service provider with which the purchaser books the rental vehicle reservation, and the fourth is the repair facility/body shop where the driver's disabled vehicle is repaired.

Given that the purchaser in this business chain often bears all or a portion of the costs for the rental vehicle reservation, the purchaser is highly desirous of business partners (namely, rental vehicle service providers and repair facilities) that can provide their services in a cost-efficient manner. Thus, it is desirable for rental vehicle service providers to coordinate their services with repair facilities such that drivers and purchasers can be promptly notified when repairs to the disabled vehicles have been completed and the need for the rental vehicle services have ended. By doing so, purchasers can reduce the number of instances where they unnecessarily pay for additional days of rental vehicle services, which given the high volume nature of the replacement rental vehicle business can have a significant effect on purchasers' bottomlines.

In an effort to serve the needs of purchasers, the assignee of the present invention has pioneered the development of business systems that can be used by purchasers to create and efficiently manage replacement rental vehicle reservations, as described in pending U.S. patent application serial numbers (1) Ser. No. 09/641,820, filed Aug. 18, 2000, (2) Ser. No. 09/694,050, filed Oct. 20, 2000, (3) Ser. No. 10/028,073, filed Dec. 26, 2001, and published as 2003/0125992, (4) Ser. No. 10/865,116, filed Jun. 10, 2004, and published as 2005/0091087, (5) 60/828,540, filed Oct. 6, 2006, (6) Ser. No. 11/550,614, filed Oct. 18, 2006, and published as 2008/0097798, and (7) Ser. No. 11/609,844, filed Dec. 12, 2006, and published as 2007/0174081, and in PCT patent application PCT/US01/51437, filed Oct. 19, 2001, published as WO 02/067175, and for which U.S. national phase application Ser. No. 10/343,576 is currently pending. The entire disclosures of each of these patent applications are incorporated herein by reference.

With the preferred embodiment of the present invention, the inventors herein have further extended these pioneering efforts by increasing the automation with which term-related parameters of rental vehicle reservations can be managed by a computer system. As used herein, the phrase "term-related parameters" can be defined as those data elements of a rental vehicle reservation that are temporal in nature. Examples of term-related parameters for reservations whose values can be automatically computed in accordance with a preferred embodiment of the present invention include any or all of the following: (1) a target number of days (TD), which represents an estimate of the time needed by a repair facility to complete repairs to a disabled vehicle corresponding to a rental vehicle reservation, (2) a target completion date (TCD), which represents an estimation of the date on which a repair facility will complete repairs to a disabled vehicle corresponding to a rental vehicle reservation, (3) an authorization period for a rental vehicle reservation, which represents how long a purchaser has authorized a driver to rent a rental vehicle in accordance therewith, (4) a last authorized day or date (collectively, LAD) for a rental vehicle reservation, which represents the final day/date of the authorization period, and (5) a callback reminder date, which represents a scheduled date for a callback to be performed in connection with a rental vehicle reservation.

A "callback" refers to a communication to a party involved with a rental vehicle reservation to obtain information as to the status of some aspect of a rental vehicle reservation. Callbacks are typically performed at various times throughout the authorized term of a rental vehicle reservation. Callback communications can take the form of electronic data communications (emails, automated data transfers, faxes, etc.) or telephone calls. Callbacks are also preferably categorized into a plurality of different types, such as types that are defined by the recipient of the callback (e.g., repair facility callbacks, driver callbacks, purchaser callbacks, etc.). Callbacks can be performed by any of the parties involved in a rental vehicle reservation, but it is typically the case that a callback will be performed by an employee of the rental vehicle service provider (or by a computer system of the rental vehicle service provider) or by an employee of the purchaser (or by a computer system of the purchaser).

Purchasers such as insurance companies employ large numbers of personnel such as insurance adjusters to perform the day-to-day tasks of creating and managing replacement rental vehicle reservations. Among the burdens on adjusters as part of the reservation management process is deciding upon an appropriate authorization period for each rental vehicle reservation and then taking action to extend the authorization period for rental vehicle reservations as appropriate in the event of delays in repairs to the drivers' damaged vehicles. In addition to these reservation-related burdens, insurance adjusters must also perform a variety of other tasks as part of the insurance claims handling process, such as providing accurate descriptions as to the nature of loss and negotiating with insureds, claimants, and repair facilities regarding issues such as the value of loss and the repair costs. As explained hereinafter, the preferred embodiment of the present invention can greatly alleviate adjusters' rental vehicle reservation-related burdens, thereby allowing them more time to focus on other aspects of the claims process.

It is often the case that adjusters first create a rental vehicle reservation with a rental vehicle service provider before a repair facility has been able to inspect the disabled vehicle corresponding to the reservation. Thus, adjusters, when booking the reservation, will often either set an authorization period for the reservation that is only a rough estimation as to how long the driver will actually need to rent the replacement rental vehicle or set a short authorization period to account for the amount of time expected until repair estimate information becomes available. Given that the adjuster has not yet been informed by the repair facility as to how long repairs may take for the driver's disabled vehicle, such estimations will often need to be revised after the repair facility provides the adjuster with a repair estimate for the disabled vehicle. For example, it will often be the case that the repair estimate, when received, will indicate that a longer or shorter authorization period is needed. Furthermore, it may be the case that unexpected delays will occur during the repair process (e.g., parts being on backorder, etc.), in which case another need may arise to increase the authorization period for the reservation. In all of these instances, the adjuster typically needs to stay aware of how repairs are progressing for each damaged vehicle and then make a decision as to what the appropriate authorization period for the reservation should be. As explained hereinafter, the preferred embodiment of the present invention is directed toward improving and, preferably, automating this process from the adjuster's perspective.

To achieve such automation, disclosed herein as a preferred embodiment is a technique, preferably embodied by a software program, for processing vehicle repair data received from repair facilities and corresponding to rental vehicle reservations. Based on the received vehicle repair data, the software program automatically computes the TD and/or TCD for each reservation. Moreover, the software program is preferably configured to automatically update the computed TD and/or TCD values each time new vehicle repair data is received from the repair facility. The software program also preferably computes the TD and/or TCD values on the basis of a formula, wherein the terms of the formula can be defined via a set of purchaser-specific rules.

Furthermore, a software program can also be employed to automatically compute a new authorization period and/or LAD for a reservation based at least in part upon the computed TD and/or TCD values. In doing so, reservations can be automatically extended so that the authorization period and/or LAD therefor corresponds with the TD and/or TCD for repairs to the disabled vehicle. The software program can be configured to automatically update the authorization period and/or LAD each time there is a change in the TCD and/or TD. Moreover, purchaser-specific rules for automatic reservation extensions can be applied to each reservation by the software program to determine whether and for how long a reservation should be automatically extended.

In previous reservation management systems known to the inventors herein, reservation managers themselves have been required to mentally interpret any available vehicle repair data to mentally decide upon the appropriate values for the term-related reservation parameters. The reservation management computer system served merely to document the ultimate management decisions that were mentally reached by the reservation managers for the hundred of thousands of different reservation transactions. While various purchaser guidelines with respect to reservation management may have assisted their decision-making in this regard, reservation managers nevertheless, when using the predecessor systems, were required to fully understand such guidelines and accurately apply those guideline in vast numbers of different fact patterns.

By automating the computation of these term-related parameters for rental vehicle reservations, the preferred embodiment of the present invention can greatly alleviate the reservation management burdens placed on reservation management personnel such as insurance adjusters. Through automated computation of the TD and/or TCD terms, a reservation manager (such as an insurance adjuster) need not sift through various fields of vehicle repair data to estimate how long repairs to the disabled vehicle will take or place telephone calls to repair facilities to learn of how various repairs are progressing. Further still, by automatically computing an authorization period and/or LAD for a reservation based on the computed TD and/or TCD terms, a reservation manager is alleviated from the burden of translating how each TD and/or TCD value affects the reservations corresponding thereto. Moreover, by configuring a software program to automatically extend rental vehicle reservations when certain conditions are met, the preferred embodiment of the present invention relieves a reservation manager from much of the extension-related burdens of managing rental vehicle reservations.

In addition to easing the burdens on reservation managers, the preferred embodiment of the present invention also provides purchasers with consistency and accuracy with respect to how their reservation management policies are implemented because no longer must reservation managers independently evaluate each reservation transaction to mentally decide how the reservation's term-related parameters should be managed. Instead, with the preferred embodiment, purchasers can employ a flexible set of business rules that automatically govern how reservation's term-related parameters are set.

Further still, a software program can also be employed to automatically schedule one or more callback reminders for a reservation in response to changes to the reservation record initiated by an update to a reservation record, such as newly received vehicle repair data. With a scheduled callback reminder, prompted on the day for which the callback reminder is scheduled, a computer system such as a rental vehicle reservation management computer system can notify a user that a particular callback should be made for a reservation. A flexible set of business rules can be used by the software program to automatically schedule callback reminders for specific dates and/or times. Further still, the business rules for scheduling the callback reminders can be customized for any scenario and may be specifically customized for a particular purchaser. For instance, reservations being paid for by ABC insurance company may use different business rules for scheduling callback reminders than those being paid for by XYZ insurance company, depending upon the preferences of each company. In another example, the rules could be customized for different repair facilities.

Such systematic callback scheduling rules are believed to offer a significant improvement to previous business systems wherein the callback reminder scheduling was made at the discretion of the employee who entered the callback reminder. Such manual calendaring of callback reminders can lead to inconsistencies. For instance, some employees would schedule a certain type of callback for 8 days after the rental start for a reservation, while others might schedule the same callback for 10 days after the rental start for a reservation. Even the same employee may through mere inadvertence or inconsistency select different callback frequencies for identical scenarios. Thus, with the automated callback scheduling feature of the preferred embodiment, proper and consistent callbacks can be made for any particular scenario.

Similarly, the inventors herein believe that purchasers will greatly benefit from employing a systematic set of rules for automatically computing term-related reservation parameters such as TCD, TD, authorization period, LAD, and/or callback reminder dates because the use of such systematic rules allows for purchasers to meaningfully audit and evaluate their business practices with respect to setting authorization periods for reservations, choosing the repair facilities to which repair work is sent, and choosing the rental vehicle service providers with which rental vehicle reservations will be booked. Thus, in accordance with another aspect of the preferred embodiment, disclosed herein is a technique, preferably embodied by a software program, for generating various types of audit reports pertaining to various aspects of the replacement rental vehicle reservation business chain. Examples of such audit reports include repair facility audit reports, rental company audit reports, and purchaser audit reports, as described in greater detail hereinafter. Through the use of such audit reports, purchasers or other interested parties can make "apples to apples"-type comparisons between data for different reservations due to the systematic business rules disclosed herein.

Further still, according to another aspect of a preferred embodiment of the present invention, disclosed herein is a technique for providing parties such as purchasers and repair facilities with a plurality of graphical user interface (GUI) screens through which they can custom-define the business rules used to automate the computation of term-related parameters for the reservations with which they are involved.

While the principal advantages and features of several embodiments of the invention have been discussed above, a greater understanding of the invention including a fuller description of its other advantages and features may be attained by referring to the drawings and the detailed description of the preferred embodiment which follow.

BRIEF DESCRIPTION OF THE DRAWINGS

FIGS. 3(a)-(e) illustrate exemplary rules for computing term-related parameters for rental vehicle reservations on the basis of vehicle repair data;

FIGS. 4(a)-(c) illustrate exemplary rules for automatically scheduling callback reminders for rental vehicle reservations;

FIGS. 7(a)-(e) depict an exemplary repair facility audit report that can be generated according to an aspect of the preferred embodiment of the present invention;

FIG. 8 depicts an exemplary rental company audit report that can be generated according to an aspect of the preferred embodiment of the present invention;

FIG. 9 depicts an exemplary multi-rental company audit report that can be generated according to an aspect of the preferred embodiment of the present invention;

FIGS. 10(a)-(c) depict an exemplary insurance company audit report that can be generated according to an aspect of the preferred embodiment of the present invention;

FIGS. 15(a) and (b) depict exemplary embodiments for graphical user interface (GUI) screens through which users such as repair facility personnel can submit changes in repair estimate times to a rental calculator;

FIG. 23 depicts an exemplary GUI screen for listing scheduled callback reminders;

FIG. 24 depicts an exemplary GUI screen for a reservation wherein a message is included which informs a reservation manager that the driver's disabled vehicle has been repaired and it is ready for pickup;

FIG. 25 depicts an exemplary GUI screen that lists action items for a reservation manager, including an extension authorization request produced at step 216 of FIG. 2(a) or (b);

DETAILED DESCRIPTION OF THE PREFERRED EMBODIMENTS

Figure 1:
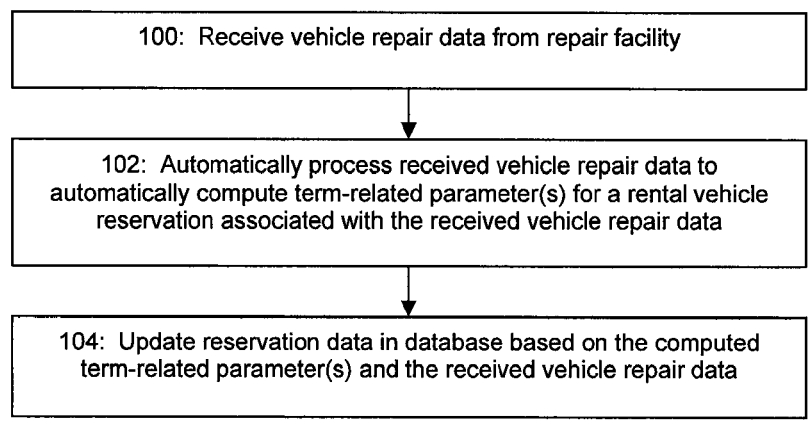
FIG. 1 depicts an exemplary process flow for automating the computation of term-related parameters for rental vehicle reservations on the basis of received vehicle repair data.

FIG. 1 depicts an exemplary process flow for automating the computation of term-related parameters for rental vehicle reservations on the basis of received vehicle repair data in accordance with an embodiment of the present invention. Preferably, the process of FIG. 1 is performed by a rental calculator, wherein the rental calculator preferably takes the form of a software program executed by a rental vehicle reservation management system, as explained in greater detail hereinafter.

At step 100, vehicle repair data is received from a repair facility. The received vehicle repair data, which corresponds to the disabled vehicle of a driver who has a replacement rental vehicle reservation, may be defined as that information regarding the various materials, processes, and/or services required to repair or otherwise restore the disabled vehicle to service. As examples, the vehicle repair data can take the form of repair estimates, repair orders, or other formats for vehicle repair status information. As should be understood in the art, many repair facilities utilize standardized formats for data contained within repair estimates and/or repair orders (e.g., the CIECA Estimate Management System (EMS) standard for data within repair estimates), and the vehicle repair data may optionally be received from repair facilities in these formats. The repair facility can communicate such vehicle repair data to the rental calculator in any of a number of ways, including but not limited to: (1) automated data transfers from the repair facility computer system to the rental calculator, (2) data entered by repair facility personnel through a GUI screen displayed on a repair facility computer system wherein the GUI screen interfaces the repair facility personnel with the rental calculator, and/or (3) emails, faxes, and/or telephone calls from repair facility personnel to personnel of a rental vehicle service provider or other entity who in turn keys the vehicle repair data included in the email/fax/telephone call into the rental calculator, etc. The above-referenced and incorporated provisional patent application 60/828,540 entitled "Method and System for Communicating Vehicle Repair Information to a Business-to-Business Rental Vehicle Reservation Management Computer System" describes how vehicle repair data can be automatically transferred from a repair facility computer system to a reservation management computer system.

At step 102, the rental calculator preferably operates to automatically process the received vehicle repair data to automatically compute at least one term-related parameter for the rental vehicle reservation corresponding to the disabled vehicle that is the subject of the received vehicle repair data. A preferred term-related parameter that is automatically computed at step 102 is the TCD for repairs to the disabled vehicle. Preferably, the length of authorization for the replacement rental vehicle reservation corresponding to the disabled vehicle will not exceed the TCD so as to minimize unnecessary rental vehicle costs for the purchaser of the replacement rental vehicle reservation. However, the rental calculator may employ purchaser-specific business rules to determine how closely the reservation's authorization length should correspond with the TCD. Thus, another preferred term-related parameter that can be automatically computed at step 102 is the authorization period and/or LAD for the replacement rental vehicle reservation. Once again, purchaser-specific rules can be employed by the rental calculator to determine a reservation's authorization period and/or LAD. Yet another term-related parameter that can be automatically computed at step 102 is a callback reminder date for a reservation. An automated callback scheduler, preferably embodied as a software program, such as that described in parent application Ser. No. 11/609,844, can be called by the rental calculator to automatically schedule callback reminders for a reservation in response to the received vehicle repair data.

It should be noted that in one embodiment, the flow of FIG. 1 from step 100 to step 102 can occur automatically. That is, following receipt of the vehicle repair data in step 100, the process proceeds to the automated computation of step 102 without human intervention. In another embodiment (e.g., as described hereinafter with respect to the GUI screen 1500 of FIGS. 15(a) and (b)), the process can proceed from step 100 to the automated computation of step 102 after intervention by a reservation manager or other party.

Following step 102, the rental calculator preferably updates a database in which the reservation data is stored to thereby reflect the newly computed term-related parameters for the reservation (step 104).

FIG. 2 depicts step 102 of FIG. 1 in greater detail. At step 200, the rental calculator attempts to match the received vehicle repair data to an existing reservation within the rental vehicle reservation management system. If no match is found, at step 202 the rental calculator preferably runs an unmatched vehicle repair data process. Preferably, this unmatched vehicle repair data process maintains a list of vehicle repair data for vehicles that do not find a match in an existing reservation. As subsequent rental vehicle reservations are created within the reservation management system in response to actions by purchasers or employees of the rental vehicle service provider, these new reservations are compared against the unmatched vehicle repair data on the list to check for matches. If a match is found at step 200, then at step 204 the rental calculator retrieves the reservation file corresponding to the received vehicle repair data and identifies the purchaser for that reservation. As should be understood, each reservation file preferably identifies the purchaser for the reservation (e.g., an insurance company, an automobile dealership, a vehicle fleet company, etc.).

The reservation management system preferably maintains a plurality of business rules that define how the term-related parameters should be computed for each purchaser. Thus, at step 206, the rental calculator preferably retrieves the business rule(s) for computing the term-related parameters that are applicable to the purchaser identified at step 204. Then, at step 208, the rental calculator processes the received vehicle repair data to compute the target number of days (TD) for the reservation in accordance with the retrieved business rules. A preferred computational formula for the term-related reservation parameter TD is:

$$TD = \lceil f(r) + WH(i, f(r), RSD) \rceil \quad (1)$$

wherein $f(r)$ represents a function of the received vehicle repair data r, and wherein $WH(i, f(r), RSD)$ represents a weekends and holidays adjustment as defined for the purchaser i and based on the function $f(r)$ and the reservation start date (RSD). It should be noted that the ceiling function $\lceil \ldots \rceil$ can optionally be applied to each component of the TD formula rather than to the aggregation of the components, if desired. A preferred formula for $f(r)$ is:

$$f(r) = \frac{LH}{LHS(i)} + ND(i) + A(i, r) \quad (2)$$

wherein LH represents the number of labor hours estimated by the repair facility to repair the disabled vehicle (as defined in the received vehicle repair data), wherein LHS(i) represents a labor hours scalar defined for the purchaser i, wherein ND(i) represents an adjustment for nondriveable disabled vehicles as defined for the purchaser i, and wherein A(i,r) represents other adjustments defined for the purchaser i on the basis of the received vehicle repair data r.

The value of the labor hours scalar is preferably selected to scale the number of labor hours to a number of days that will be needed to perform those labor hours on the disabled vehicle. As indicated, the value of LHS can be defined on a purchaser-by-purchaser basis. However, it should also be noted that the value of LHS can optionally be defined on a repair facility-by-repair facility basis or some combination of a purchaser and repair facility basis. Also, when first computing TD for a reservation, it should be noted that the value of A(i,r) is expected to be zero as A(i,r) is provided to serve as a term for updating the value of TD in response to events that occur throughout the repair process.

TD is preferably expressed as an integer, preferably in units of days. However, it should be noted that other units (e.g., hours) could be used. The value for TCD can be readily computed from TD by adding the computed TD value to the RSD.

Thus, if a repair facility initially estimates that 48 labor hours would be needed to complete repairs to a given disabled vehicle, and if the labor hours scalar for the applicable purchaser is 6, then the LH/LHS component of TD will result in a need for 8 days.

Further still, a purchaser may want to further adjust the TD value based on whether the disabled vehicle is driveable or nondriveable. Reservations corresponding to nondriveable disabled vehicles will typically be of a longer duration than reservations corresponding to driveable disabled vehicles. One reason for this circumstance is that a driver of a nondriveable disabled vehicle will need to pick up his/her replacement rental vehicle immediately because of the nondriveable nature of his/her disabled vehicle. Thus, the driver's replacement rental vehicle reservation will have started even though the repair facility may have not yet ordered and/or received the parts necessary to repair the nondriveable disabled vehicle. With a driveable disabled vehicle, however, the driver can often wait to take the disabled vehicle into the repair facility for repairs until after the repair facility has ordered and received the parts necessary to perform the necessary repairs. In such cases, the lag time for a repair facility to order and receive parts is often not included in the reservation duration for driveable vehicles, while such a lag time is often included in the reservation duration for nondriveable vehicles. Thus, continuing with the example, it will be assumed that the driver's disabled vehicle is nondriveable, and the purchaser's defined nondriveable adjustment is 3 days. Thus, the f(r) component of TD will initially compute to a value of 11 days (as explained, the value of the A(i,r) term during the initial TD computation is likely zero).

Furthermore, given that 11 days is longer than a week, this time span must include at least one weekend and possibly one or more holidays. Thus, depending on how the purchaser defines a weekends and holidays adjustment, then additional days may be added to TD. It should be noted that purchasers can define the weekends and holidays adjustment values on a repair facility-by-repair facility basis to match the repair facilities' business practices, if desired. Furthermore, it should be noted that the rental calculator preferably also computes the weekends and holidays adjustment based on the RSD to account for reservation time spans that encompass weekends and/or holidays. For example, if the RSD is Dec. 31, 2007, and it is assumed for purposes of this example that Dec. 31, 2007 falls on a Thursday, then a value of 11 days from f(r) will encompass three weekends (January 2-3, January 9-10, and January 16-17) and two holidays (New Years and MLK Day—January 1 and the third Monday in January, respectively). In such a circumstance, the weekends and holidays adjustment may need to account for the three weekends (rather than just a single weekend) and the two holidays. Therefore, continuing with the example wherein the RSD is Thursday, Dec. 31, 2007, if the purchaser adds two days to TD for each weekend spanned by the f(r) amount and one day for both the New Years and MLK day holidays, then WH(i,8,12/31/2007) would be 8. This, in turn, increases the value of TD to 19. Therefore, with a TD value of 19, the TCD would fall 19 days after the RSD, for a TCD of Jan. 19, 2008.

At step 210, the rental calculator then compares the TCD with the LAD for the reservation to determine whether the TCD falls on a date after the LAD. If the TCD falls before the LAD, then no extensions need to be made to the reservation, and the rental calculator proceeds to step 218, described hereinafter. However, if the TCD falls after the LAD, then it may be necessary to extend the reservation to accommodate the fact that the driver's disabled vehicle may not be ready for pick up at the repair facility until after the reservation has ended. Thus, at step 212, the rental calculator preferably checks the retrieved rules for the purchaser to identify whether the purchaser has authorized automated extensions in the event of shortfalls in the LAD relative to the TCD. If the purchaser has authorized automated extensions in such circumstances, then at step 214 the rental calculator automatically computes the LAD value for the reservation based on the automated extension rule for the purchaser. While the automated extension rules can be based on multiple variables, it is expected that in many situations a purchaser will want to automatically extend the reservation to the TCD, in which case the LAD value for the reservation is populated with the TCD value computed at step 210. If the purchaser has not authorized automated extensions, then at step 216 the rental calculator preferably instructs the reservation management system to send an authorization request for an extension to the reservation manager (e.g. an insurance adjuster for an insurance company purchaser or a rental company employee who has been tasked with some aspect of managing the subject reservation). This authorization request preferably informs the reservation manager of the difference between the TCD and the LAD and asks the reservation manager to extend the reservation as appropriate.

At step 218, the rental calculator checks whether the retrieved rules for the purchaser include any automated callback scheduling rules. If the purchaser does not have any automated callback scheduling rules, then the rental calculator preferably proceeds to step 104, where the updated TCD (and possibly LAD) data is stored in the database for the reservation. Otherwise, the rental calculator proceeds to step 220. At step 220, the rental calculator calls an automated callback scheduler such as the one described in parent application Ser. No. 11/609,844 to automatically schedule at least one callback reminder for the reservation by applying the applicable callback scheduling rules to the computed TCD value (and possibly the computed LAD value) and/or the received vehicle repair data. The scheduled callback reminder(s) can also be stored for the reservation in the database at step 104.

Now, assume that 4 days after the RSD, new vehicle repair data is received from the repair facility at step 100, wherein the new vehicle repair data indicates that an additional time should be added to the TCD because of some explanation for delay in repairs (e.g., a parts supplier has informed the repair facility that a part needed for the repairs is on backorder). In such a case, the rental calculator will process the newly received vehicle repair data r as shown in FIG. 2. At step 208, it should be noted that the value of the A(i,r) term in the formula for TD will no longer be zero. In this example, the value of A(i,r) would be derived from the newly received vehicle repair data r (e.g., a derived value of 2 days). Thus, the new TCD for the reservation would be Jan. 21, 2007. Presuming that the LAD was changed to Jan. 19, 2007 as a result of processing the initially received vehicle repair data, then steps 210-216 preferably operate to adjust the LAD by an additional two days, and steps 218-220 preferably operate to adjust the scheduled callback reminders as appropriate. This process is preferably automatically repeated each time that new vehicle repair data is received from a repair facility at step 100.

By automating the processes performed by the rental calculator in FIG. 2, the inventors herein believe that the burdens placed on personnel such as insurance adjusters to manage replacement rental vehicle reservations can be greatly alleviated, thereby providing significant improvement in efficiency to purchasers such as insurance companies.

FIG. 3(a) depicts how the rules used by the rental calculator of FIG. 2 can be defined on a purchaser-by-purchaser basis. As shown in FIG. 3(a), rule set $300_1$ can be applicable to purchaser A, while rule set $300_2$ is applicable to purchaser B, while rule set $300_3$ is applicable to purchaser C, and so on until rule set $300_z$ for purchaser Z. Thus, when the rental calculator reaches step 206 for purchaser i, it can retrieve rule set $300_i$ that is associated with that purchaser.

Each purchaser rule set preferably includes the rules that govern how the TCD is computed, whether/how automated extensions are to be applied, and whether/how callback reminders are to be automatically scheduled. For example, FIG. 3(b) depicts a rule set $300_1$ for purchaser j. Rule set $300_1$ preferably comprises rules 302 that (1) define the labor hours scalar (LHS) for the purchaser, (2) define the nondriveable adjustment (ND) for the purchaser, (3) define the weekend portion of the weekends/holidays adjustment (WH) for the purchaser, (4) define the holiday portion of the weekends/holidays adjustment (WH) for the purchaser, (5) define whether and how automated extensions are to be carried out for the purchaser, (6) whether and how callbacks are to be automatically scheduled for the purchaser, and (7) define how the other adjustments (A) are to be computed for the purchaser.

For the purpose of computing the other adjustments (A) values, rules 302 preferably include rules tables such as that shown in FIG. 3(b). This table preferably includes a column corresponding to an explanation/reason 304 for a change in the TD estimate (e.g., "waiting on parts", "disassembly", "waiting on tires", etc.). Optionally, these explanations/reasons can correspond to the standardized CIECA status update message codes as well as other pre-defined explanations for repair status updates. For each listed explanation/reason 310, the table preferably defines an amount of delay 308 for that explanation/reason. The value in amount column 308 preferably serves as the value for A in the f(r) function of equation (2) when the repair facility provides the corresponding explanation/reason 310.

Optionally, the table also includes a category column 306 that defines whether each listed explanation/reason 310 is to be treated as an adjustment or an extension. If treated as an adjustment, the amount 308 corresponding to the explanation/reason 310 is preferably included in the A term for f(r) to adjust the target number of days. If treated as an extension, the amount 308 corresponding to the explanation/reason 310 is preferably not included in the A term for f(r), and an extension will be needed for the reservation to account for a delay in repairs due to that explanation/reason. When processing an explanation/reason 310 that is categorized as an extension rather than an adjustment, processing flow can be added to the rental calculator that will send an authorization request for an extension to the purchaser in response to the received explanations/reasons categorized as extensions, as shown in the alternate embodiment of FIG. 2(b). For example, a new term "Completion Date" (CD), which corresponds to the date on which the repair facility expects to complete repairs, could be computed as follows:

$$CD=[f'(r)+WH(i,f'(r),RSD)] \quad (3)$$

wherein f'(r) is computed as $$f'(r')=f(r)+E(i,r) \quad (4)$$

wherein E(i,r) represents the extension amount needed for the explanations categorized as "extensions" as defined by the rules 302 of FIG. 3(b). In the process flow of FIG. 2(b), step 208 preferably operates to calculate both the TCD and CD values for the reservation, but step 210 preferably compares with CD value with the LAD to determine whether an extension is needed since the TCD, in this embodiment, will not necessarily be indicative of the full amount of time that the repair facility will actually need to repair the subject disabled vehicle.

It should also be noted that the CD value could alternatively be calculated according to the formula:

$$CD=[TCD+E(i,r)] \quad (5)$$

in which case the weekends and holidays adjustment will remain unaffected by the explanations categorized as "extensions".

FIG. 3(c) depicts another exemplary rule set $300_k$ for purchaser k. As can be seen, purchaser k may define different values than purchaser j for the different rules 302.

Also, it should be understood that the rules 302 within each rule set $300_i$ can be repair facility-specific, as shown in FIG. 3(d). In the example of FIG. 3(d), the rule set $300_x$ for purchaser x includes a plurality of different rules $302_2, 302_2, \ldots 302_z$, each applicable to a different repair facility. In this fashion, purchasers can tailor their computational rules to the business practices of the repair facilities at which disabled vehicles are sent for repairs. This can be particularly helpful in calibrating the rules 302 to account for the weekend and holidays policies of different repair facilities (e.g., some repair facilities may work 7 days per week, others only 6 days per week, while still others only 5 days per week; and different repair facilities will often close for different holidays). Thus, at step 206 in FIG. 2, the rental calculator can not only retrieve the rule set $300_i$ corresponding to the applicable purchaser i, but also retrieve the rules $302_j$ within rule set $300_i$ corresponding to the repair facility j from which the vehicle repair data was received.

Figure 3E:
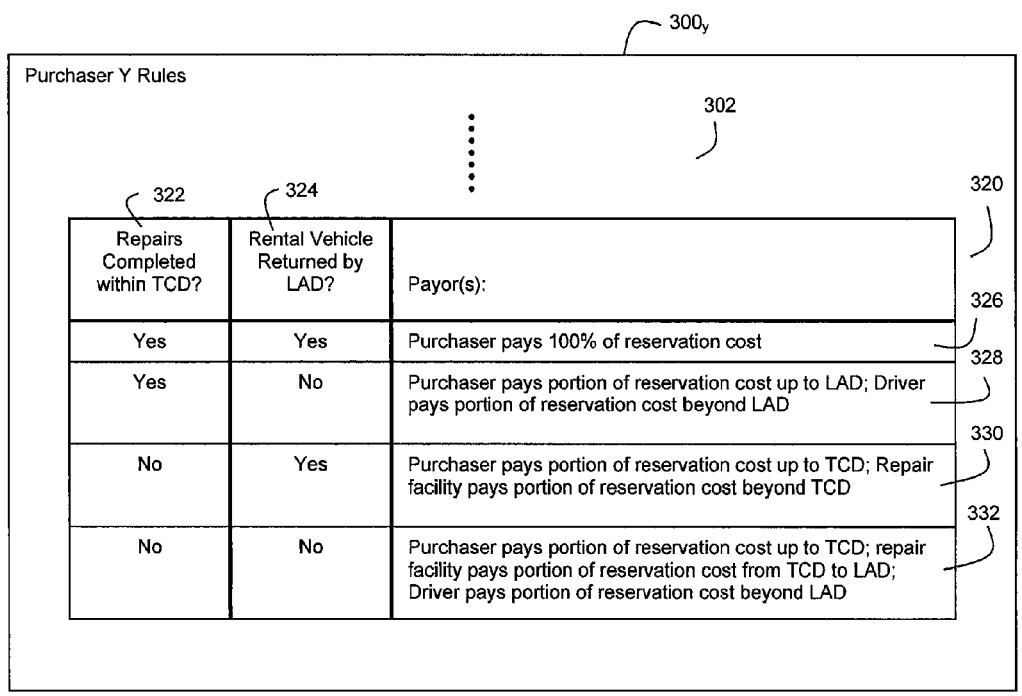

Optionally, the rule set $300_i$ can also include cost distribution rules 320 that define how the cost for a rental vehicle reservation is to be split among the different parties under various circumstances, as shown in the example of FIG. 3(e). The cost distribution rules 320 preferably define a plurality of payor rules for a plurality of different combinations of term-related parameter-derived conditions. Exemplary term-related parameter-derived conditions include condition 322 and condition 324 shown in FIG. 3(e). Condition 322 is defined by whether the repair facility in question completed its repairs within the TCD computed therefor. Condition 324 is defined by whether the driver returned the rental vehicle to the rental vehicle service provider by the LAD. Rules 320 of FIG. 320 illustrate a matrix of different permutations for these conditions coupled with their corresponding payor rules 326, 328, 330, and 332. Payor rule 326 states that the purchaser will pay 100% of the reservation cost if the repair facility completes its repairs within the TCD and if the driver returns the rental vehicle by the LAD. Payor rule 328 states that the purchaser will pay for the portion of the reservation cost that accrued up to the LAD and the driver will pay for the balance when the repair facility completes its repairs within the TCD but the driver does not return the rental vehicle until after the LAD. Payor rule 330 states that the purchaser will pay for the portion of the reservation cost that accrued up to the TCD and the repair facility will pay for the balance when the repair facility does not complete its repairs within the TCD and the driver returns the rental vehicle by the LAD. Finally, payor rule 332 states that the purchaser will pay for the portion of the reservation cost that accrued up to the TCD, the repair facility will pay for the portion of the reservation cost that accrued from the TCD to the LAD, and the driver will pay for the balance when the repair facility does not complete its repairs within the TCD and the driver does not return the rental vehicle until after the LAD.

It should be noted that the cost distribution rules 320 can also be defined on a repair facility-specific basis if desired. Furthermore, different conditions can be defined for different payor rules. For example, some repair facilities may have an arrangement with a purchaser where only delays of X number of days after the TCD will trigger reservation costs being distributed to the repair facility.

Figure 2A:
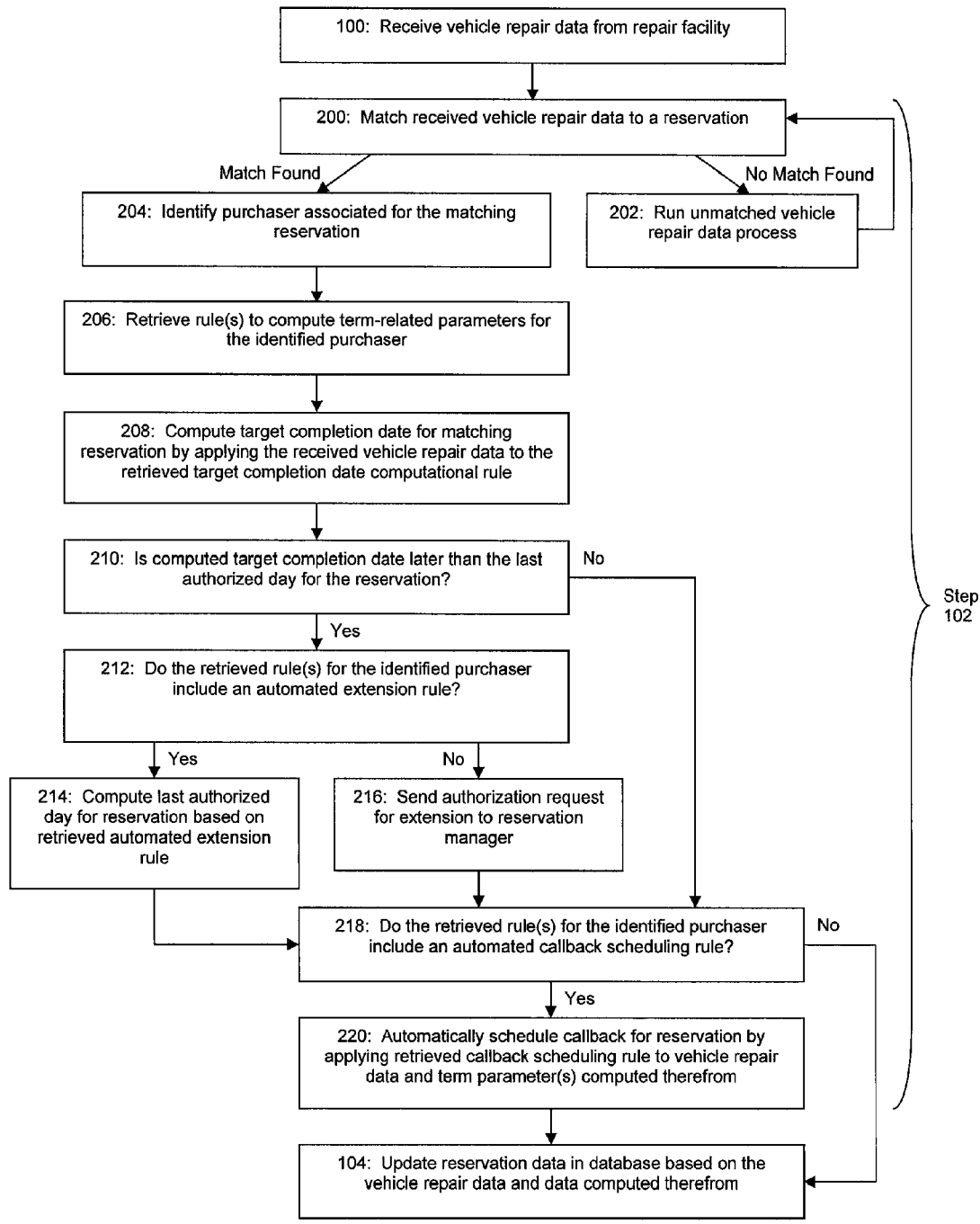
FIGS. 2(a) and (b) depicts preferred embodiments for the process flow of FIG. 1.
Figure 2B:
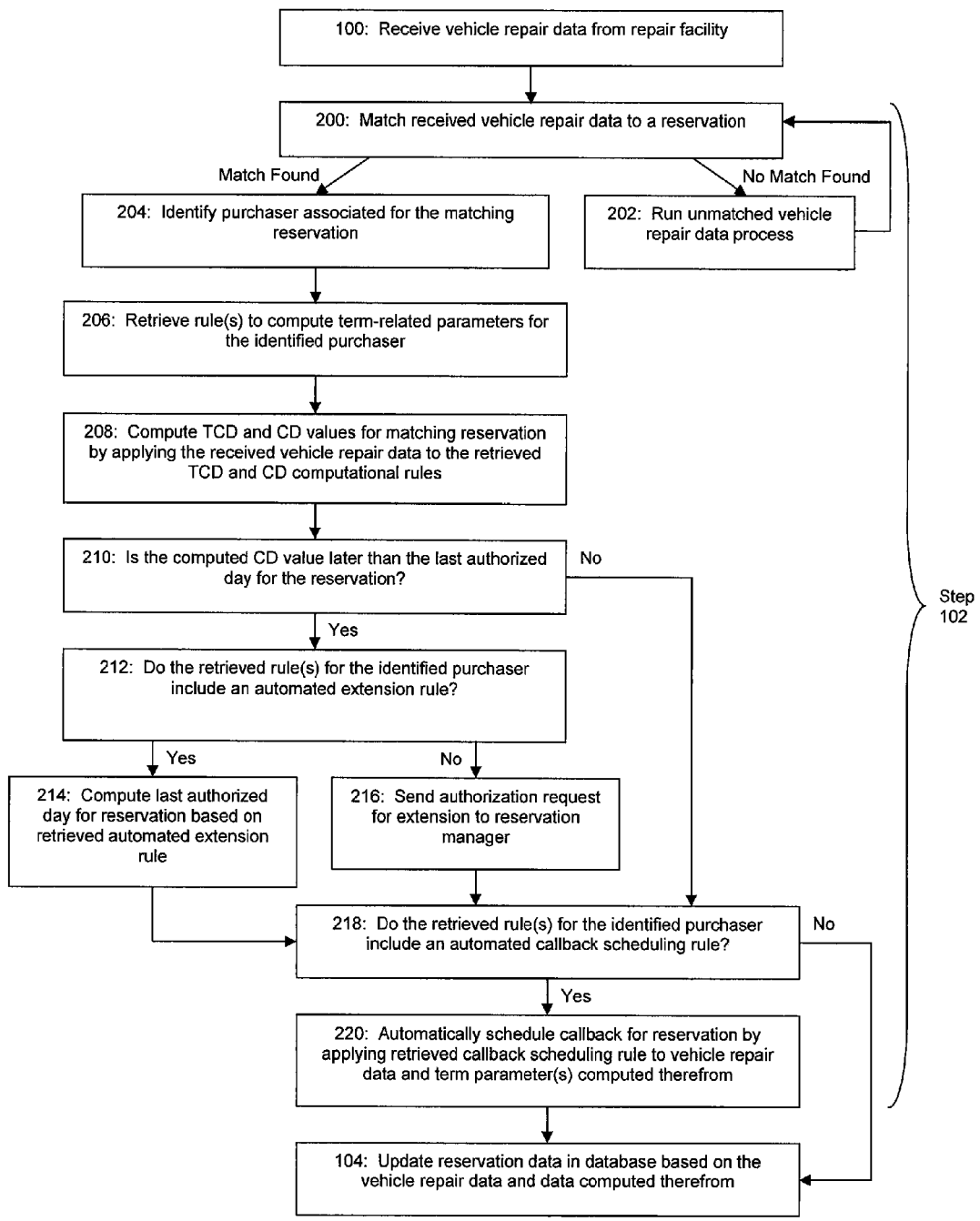

In operation, the flow of FIGS. 2(a) and 2(b) could accommodate the cost distribution rules 320 of FIG. 3(e) by applying these rules to the reservation data and vehicle repair data, wherein the reservation record in the database is automatically updated to reflect how costs for the reservation are to be distributed among the different parties.

As explained in parent application Ser. No. 11/609,844, another aspect of a preferred embodiment of the present invention is the ability to schedule callback reminders within the reservation files. The callback reminders may correspond to callbacks of any type. Exemplary types of callbacks can be defined based on the recipient of the callback, e.g., repair facility callbacks, renter (or driver) callbacks, and purchaser (or non-driver payor) callbacks. For instance, a repair facility callback may be to directed to a repair facility to check on the status of a repair. As another example, a purchaser (or non-driver payor) callback may be directed to the party that has purchased the rental vehicle services or assumed the payment obligation therefor (e.g., an insurance company, automobile dealership, vehicle fleet company, etc.) to inquire about extending an authorization for a rental vehicle reservation if the LAD for a reservation is near. As still another example, a renter (or driver) callback may be directed to a driver to check on the status of the rental or to inquire about a balance due on his/her account. Each type of callback is preferably system-defined, and the callback reminders are preferably automatically generated based upon a set of business rules algorithms. The callback reminders can be displayed to a user of a reservation management system as described hereinafter, or they can be communicated to an external computer system for access by a user thereof. A rules engine for automatically scheduling callback reminders, such as an automated callback scheduler, may be internal or external to the reservation management system so long as it is accessible thereto. Furthermore, it should be noted that the callback reminders need not be stored in the same physical database as the reservation data to which they correspond so long as the appropriate business systems can access the reservation data and scheduled callback reminders as needed.

One of the benefits of automatically scheduling callback reminders is that the automated callback scheduler can be triggered each time there is an update to the underlying rental record, as shown by way of example in the process flow of FIG. 2 wherein an update to the vehicle repair data for a reservation record can trigger the automated callback scheduler. As another example, upon detecting an update to a reservation file that indicates a renter's balance of payment is zero, an automated callback scheduler can be configured to delete any previously-scheduled renter callbacks for that reservation.

Thus, each type of callback can have a complex set of rules (or algorithm) that can be customized for a particular party (insurance company, repair facility, etc.). For example, one insurance company may want callbacks made 2 days before the end of an existing rental authorization, while another may desire 3 days advance notice. A repair facility could choose to have all repair facility callbacks be made on certain days of the week. The rules can be further customized based on a number of other variables. For instance, callbacks to check the status of repairs to a disabled vehicle could be made a specified number of days in advance of the end of an authorization depending upon whether the disabled vehicle was driveable, and further depending upon how many days exist between the last update to the callback record and the expected end of the rental. By way of another example, the rules can take into account the number of estimated repair hours the repair facility estimates will be needed.

Figures 4A, 4B:
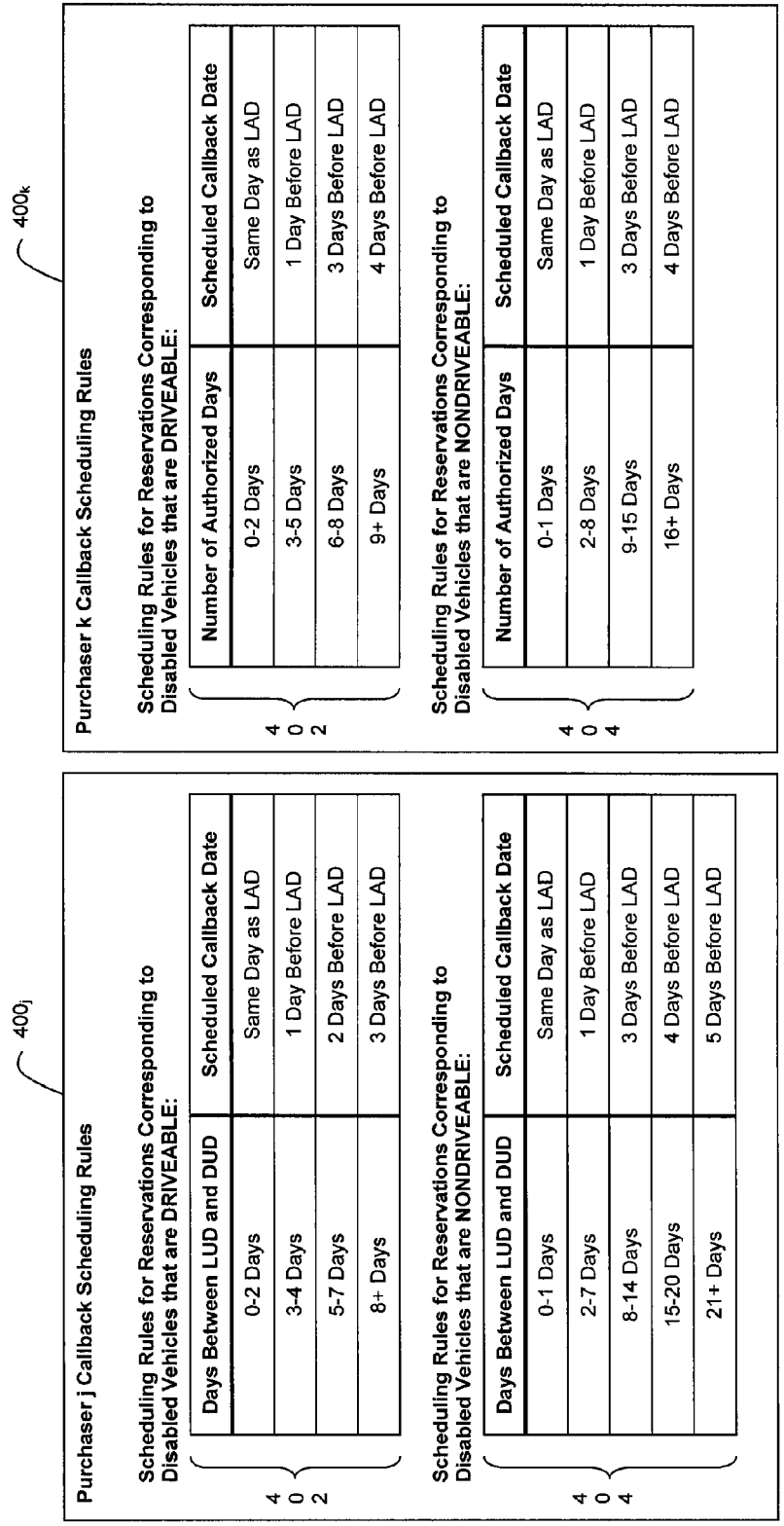

FIG. 4(a) illustrates an exemplary set of callback scheduling rules $400_j$ that can be defined for purchaser j. In this example, purchaser j applies one set of rules 402 to repair facility callbacks corresponding to driveable vehicles and another set of rules 404 to repair facility callbacks corresponding to nondriveable vehicles. Each rule set 402 and 404 preferably identifies a measurement trigger (the left column of the table) that defines a condition for setting a callback on a given scheduled callback date (as defined by the instruction in the right column of the table). Preferably, the scheduled callback dates are expressed relative to a callback reminder reference such as the LAD. Any of a number of different measurement triggers can be used. Moreover, it should also be noted that rules 402 may use a different measurement trigger than rules 404, if desired by a practitioner of this aspect of the invention. In the example of FIG. 4(a), the measurement trigger is defined as the number of days encompassed between the "last update date" (LUD) for the reservation file and the "DUD" for that reservation, wherein the DUD represents the most recently updated date of either the TCD or the current extension date authorized by the insurance company (the LAD). Depending on where this number falls within the breakdowns defined in the table, a different callback date will be scheduled.

FIG. 4(b) depicts another exemplary set of callback scheduling rules $400_k$ for purchaser k. In the example of FIG. 4(b), the measurement trigger is the number of authorized days for the reservation. As with the example of FIG. 4(a), different rules 402 and 404 are provided for disabled vehicles that are driveable and nondriveable.

FIG. 4(c) depicts another exemplary set of callback scheduling rules $400_q$ for purchaser q. In the example of FIG. 4(c), the measurement trigger is defined as the number of days encompassed between the LUD and the LAD for the reservation. Furthermore, the automated callback scheduling rules for purchaser q do not distinguish between driveable and nondriveable vehicles.

It should be appreciated that a limitless number of different algorithms can be created and entered into the automated callback scheduler, with a great deal of flexibility.

Figure 5:
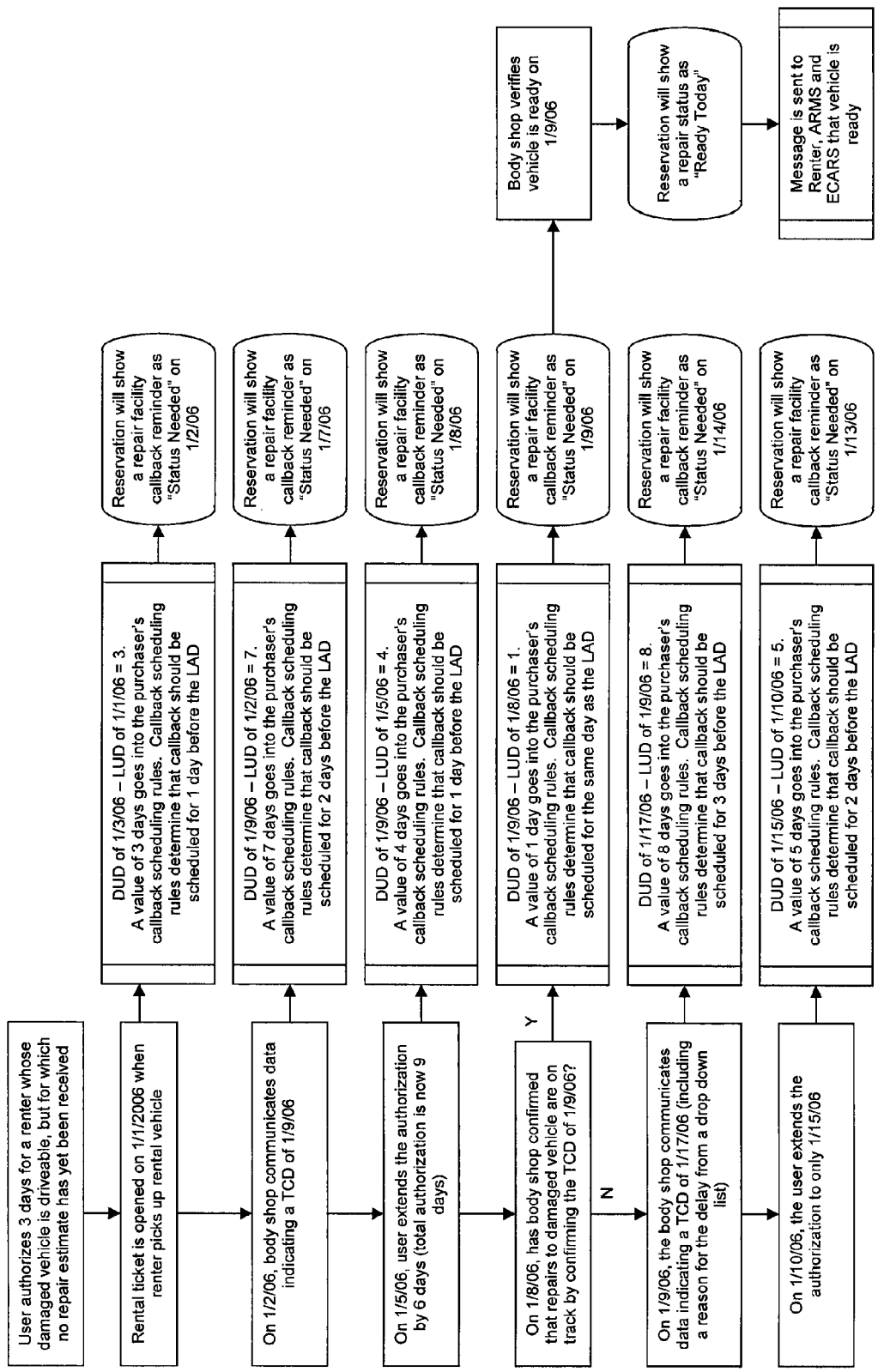
FIG. 5 depicts an exemplary process flow for automatically scheduling callback reminders on the basis of a set of callback scheduling rules.

FIG. 5 shows a sample algorithm flow for an automated callback scheduler showing both the flexibility of the automated scheduling and the ability to update the callback reminders each time a record is updated. In the process flow of FIG. 5, the automated callback scheduler will use the rule set $400_j$ of FIG. 4(a). For each scenario the number of days between the LUD for the reservation and the DUD is computed as the measurement trigger. In the flowchart example, a purchaser such as an insurance company authorizes a rental for 3 days on 1/1 so that a repair estimate can be obtained on repairs to the renter's driveable vehicle. As the reservation record is opened, the LUD is 1/1 and the DUD is 1/3 (as defined by the LAD because the TCD is yet undefined). The number of days, inclusive, between DUD and LUD is 3, and this value is used as the measurement trigger. Referring to the driveable rules 402 of the rule set $400_j$ of FIG. 4(a), a callback reminder is set for 1 day before the LAD, which would be 1/2. FIG. 23 illustrates an exemplary "callbacks" screen that can be displayed by a reservation management computer system to a reservation manager on 1/2, wherein the system automatically adds a repair facility callback reminder 2302 to the list of scheduled repair facility callback reminders 2302 for 1/2 as a result of the automated callback scheduling rules. Upon selection by the reservation manager of one of the repair facilities listed as a repair facility callback reminder, preferably a GUI screen is displayed that lists the reservations for which the repair facility callback is applicable. Upon selection by the reservation manager of one of these listed reservations, preferably a callback details screen is displayed. Preferably this screen includes fields such as those shown in FIG. 15(a) or 15(b) described hereinafter. Based on information learned from a repair facility as a result of the repair facility callback, the reservation manager can fill out the appropriate fields of the callback details screen, which in turn may trigger the process of FIG. 2(a) or 2(b) if the updated information contains new vehicle repair data.

Returning to the flow of FIG. 5, on 1/2 the repair facility indicates that TCD will be 1/9. If the callback for 1/2 has not yet been made, the reminder therefor would now be updated, or else a new callback reminder would be set. In either case, the updated/new callback reminder would be based on a new DUD of 1/9 (the TCD) and a new LUD of 1/2. With 7 days between the DUD and LUD, the callback reminder will be set for 2 days before the LAD, or 1/7 .

On 1/5 the insurance company extends the authorization by 6 days, thereby setting the LAD to 1/9. As can be seen, in this example, the insurance company has not employed an automated extension to match the LAD to the TCD as the TCD becomes available. The automated callback scheduler processes the reservation record again and updates the callback reminder based on a new LUD value of 1/5. With 4 days between the new LUD and the DUD, the callback reminder is reset for one day before the LAD, which is 1/8.

On 1/8 the insurance company takes action on the scheduled callback reminder and performs a repair facility callback to check on the status of the vehicle repair. If the repair facility confirms the vehicle will be ready on 1/9, the reservation record is updated (because a callback was made) and a new callback reminder is set for 1/9 (the same day as the LAD, because there is only 1 day between the DUD and the new LUD). On 1/9 another callback is made to the repair facility confirming that the renter's regular vehicle is ready, in which case a message is sent to the renter and the reservation management system is updated accordingly. In such an instance, as shown in FIG. 24, a GUI screen 2400 displayed to a reservation manager concerning the subject reservation preferably includes a message 2404 in a notebook section 2402 that informs the reservation manager that the repairs to the disabled vehicle are complete and it is ready for pickup by the customer. It should also be noted that optionally the "vehicle ready for pickup" message can be displayed to a reservation manager through an "action items" GUI screen of a reservation management system.

In the event the repair facility indicates a delay—in the example shown the repair facility indicates a delay until 1/17 and provides a reason for the delay—a new callback reminder is automatically generated. This time the DUD value is 1/17 and the LUD is 1/9. With 8 days between the two variables, the reminder is set for 3 days before the LAD, which is 1/14.

Then supposing on 1/10 the insurance company extends the authorization, but only until 1/15, the existing callback reminder is automatically updated using a DUD of 1/15 and an LUD of 1/10, thereby resulting in a callback reminder set for 1/13.

It should be noted that, optionally, the reservation management system can be configured to execute callbacks automatically on the scheduled callback reminder date. For example, if a repair facility callback is scheduled for July 1, then when July 1 is reached, the reservation management system can be configured to generate and send a message to the repair facility inquiring about the repair status for a disabled vehicle corresponding to the subject reservation.

Another aspect of the preferred embodiment of the present invention is the ability to generate audit reports that provide a wide range of metrics data about the reservations managed by purchasers and the repairs performed by repair facilities. Because the present invention allows purchasers to systematically define the rules by which the TCD values for repairs are computed and how the authorization period for the reservation will be controlled in response to the computed TCD values, purchasers can much more effectively capture, itemize and compare reservation data for the high volumes of reservations that they manage.

Figure 6A:
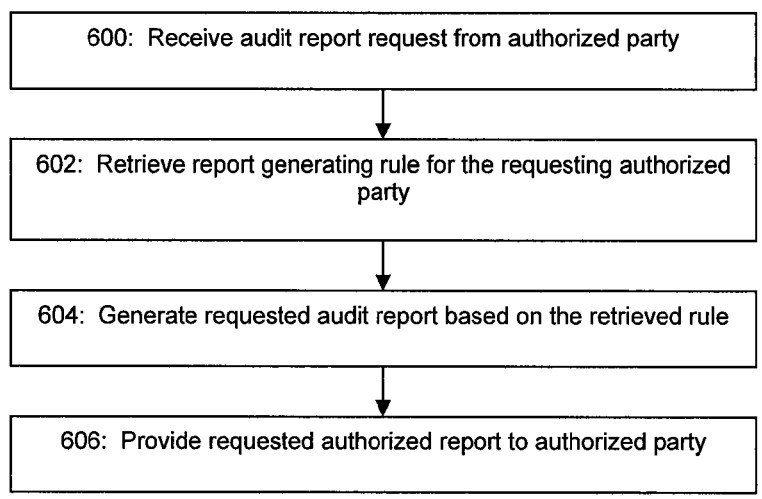
FIGS. 6(a) and 6(b) depict various exemplary process flows for generating audit reports in accordance with an aspect of the preferred embodiment of the present invention.

FIGS. 6(a) and (b) depict process flows for generating an audit report of reservation data for an authorized party. Preferably, the authorized parties include the purchasers, repair facilities and rental vehicle service providers that use the reservation management system to create and manage replacement rental vehicle reservations. As explained hereinafter, each authorized party is preferably limited to only an authorized portion of the data maintained by the reservation management system. That is, insurance company X is preferably not given access to data that would allow it to view reservation data for a specific different insurance company. Similarly, repair facilities and rental vehicle service providers are preferably not given access to specific reservation data of their competitors that may be present within the reservation management system.

With the flow of FIG. 6(a), at step 600, an audit report generator receives a request for an audit report from an authorized party. At step 602, the audit report generator retrieves a report generating rule applicable to that authorized party. At step 604, the audit report generator generates an audit report in accordance with the retrieved rule, which in turn is provided to the authorized party (step 606).

Figure 6B:
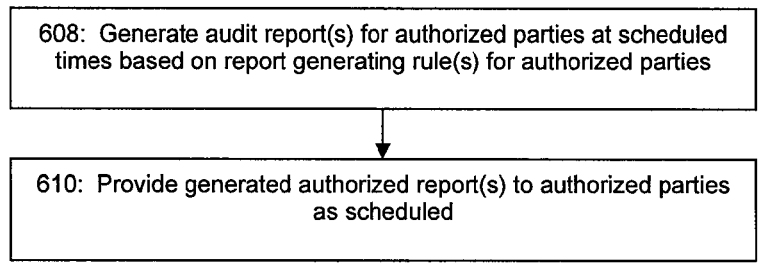

With the flow of FIG. 6(b), at step 608, the audit report generator operates to generate one or more predefined audit reports for one or more authorized parties at scheduled times based on audit report generating rules that are associated with each authorized party. Next, at step 610, the audit report generator provides the generated audit report(s) to each authorized party as scheduled.

FIGS. 7(*a*)-(*e*) illustrate an exemplary repair facility audit report 700 that could be generated by the audit report generator for an authorized party such as an insurance company. Report 700 can serve as a valuable aid to the insurance company in evaluating how well a given repair facility is performing (e.g., repair facility X). However, it should be noted that repair facility audit report 700 could also be provided to repair facility X so that it can self-evaluate its work. In such an instance, the data in the report can be broken down by the different insurance companies and other business sources for replacement reservation-related repair work. Preferably, report 700 covers some time period (in this example, year-to-date, although it should be understood that other time spans may be readily employed) and displays data applicable to reservation-related repairs performed by repair facility X on behalf of the insurance company in a number of different categories.

Furthermore, not only can report 700 include data for just repair facility X, but report 700 can also include comparison data that allows the insurance company to compare repair facility X with other repair facilities in the same local area (e.g., the St. Louis metropolitan area or the Chicago metropolitan area). To do so, report 700 can include a "local area average" column that displays an average data value for each category corresponding to the repairs performed by all of the repair facilities in repair facility X's local area on behalf of that insurance company. Such "local area" data will be available to the audit report generator 1114 if the reservation management system has access to the reservation data of a sufficiently large number of reservation for which a number of different repair facilities in the same local area have performed repairs. Optionally, this local area average data can include the repair data applicable to repair facility X to better highlight the distinctions between repair facility X and the other repair facilities in the area. Furthermore, the report 700 can include a "local area rank" column that identifies a ranking of how well a repair facility has performed in a given data category relative to the other repair facilities in the area that perform repair work for the insurance company. For example, if 5 repair facilities in the area perform work for the insurance company, the local area rank for a given data category may show "2 of 5", which informs the insurance company that repair facility X outperformed three of the other repair facilities in the area with respect to that data category.

Report 700 can also include an "industry average" column that displays average data values for each category corresponding to the repairs performed by all of the repair facilities in the industry on behalf of that insurance company. Such "industry area" data will be available to the audit report generator 1114 if the reservation management system has access to the reservation data of a sufficiently large number of reservations for which a number of different repair facilities in the industry have performed repairs. Optionally, this "industry average" data may also include repair data performed by repair facilities for insurance companies other than the recipient of report 700. Furthermore, the report 700 can include an "industry rank" column that identifies a ranking of how well a repair facility has performed in a given data category relative to all other repair facilities in the industry that perform repair work for the insurance company. For example, if 100 repair facilities in the applicable market (e.g., the United States) perform work for the insurance company, the industry rank for a given data category may show "5 of 100", which informs the insurance company that repair facility X outperformed all but 4 of the other repair facilities in the industry with respect to that data category.

Report 700 can include data for any of a number of different categories, as shown by the rows in the table of FIGS. 7(*a*)-(*e*). For example, report 700 can include data for at least any or all of the following data categories:

Average number of rental days for reservations corresponding to all, driveable, and nondriveable vehicles that are repaired;

Percentage of repairs to all, driveable, and nondriveable vehicles completed within initial TCD;

Percentage of repairs to all, driveable, and nondriveable vehicles completed without reservation extensions;

Average number of labor hours to repair disabled vehicle for all, driveable, and nondriveable vehicles;

Average length of extension period for repairs to all, driveable, and nondriveable vehicles wherein reservation extensions are needed;

Average adjustment amount needed for repairs to all, driveable, and nondriveable vehicles that are due to adjustment explanations/reasons 1, 2, . . . n;

Percentage of all adjustments for repairs to all, driveable, and nondriveable vehicles that are due to adjustment explanations/reasons 1, 2, . . . n;

Average extension amount needed for repairs to all, driveable, and nondriveable vehicles that are due to extension explanations/reasons 1, 2, . . . n; and Percentage of all extensions for repairs to all, driveable, and nondriveable vehicles that are due to extension explanations/reasons 1, 2, . . . n.

Furthermore, report 700 can also include data indicative of how quickly repair facilities communicate updated vehicle repair data to the purchaser and/or rental vehicle service provider, as measured by how well the different repair facilities respond to repair facility callbacks.

Because of the common rules that an insurance company can employ to define the authorization period for a reservation in close correspondence with the TCD for repair work, meaningful data with respect to categories such as "average number of rental days" for various reservation types can be displayed. Furthermore, repair facilities can be evaluated as to common reasons for adjustments and/or extensions being made to the TCD (see FIGS. 7(*b*)-(*e*)) as well as how accurately each repair facility initially estimates the TCD (see the data categories relating to the percentage of repairs completed within the initial TCD). Furthermore, because of the high volume of reservations managed by the reservation management system, data is available therein to produce meaningful comparison data with other repair facilities in the area and industry.

FIG. 8 illustrates an exemplary rental company audit report 800 that could be generated by the audit report generator for an authorized party such as an insurance company. Report 800 can serve as a valuable aid to the insurance company in evaluating how well a given rental company is performing (e.g., rental company 1). However, it should be noted that rental company audit report 800 could also be provided to rental company 1 so that it can self-evaluate its work. In such an instance, the data in the report can be broken down by the different insurance companies and other business sources for replacement reservations placed with that rental company. As with report 700, preferably, report 800 covers some time period (in this example, year-to-date, although it should be understood that other time spans may be readily employed)

and displays data applicable to reservations placed with rental company 1 by the insurance company in a number of different categories.

Furthermore, not only can report 800 include data for just rental company 1, but report 800 can also include comparison data in "industry average" and "industry rank" columns if the reservation management system has access to the reservation data of the insurance company that is applicable to other rental companies. Report 800 can include data for at least any or all of the following data categories:

- Average term length for replacement rental vehicle reservations;
- Average cost per day for all replacement rental vehicle reservations;
- Average cost per day for replacement rental vehicle reservations within vehicle classes 1, 2, . . . n;
- Percentage of callbacks performed as scheduled; and
- Percentage of rental vehicle reservations that go beyond their LAD.

Report 800 can also include other data indicative of how well the rental company's personnel have stayed "on top of" the reservations. For example, an additional data field in the report 800 can be data that identifies a percentage of extensions that were performed on time (that is, an extension that were made and/or requested prior to the reservation's LAD).

Furthermore, in instances where a rental vehicle reservation management system is configured to provide reservation management for reservations placed with a plurality of different rental vehicle service providers, an audit report 900 such as the one shown in FIG. 9 can be generated by the audit report generator. Report 900 can optionally include the data categories and data columns that are found in report 800, although report 900 lists the data within each of the data categories for a plurality of different rental companies with which the purchaser (e.g., insurance company Y) manages reservations.

Moreover, even in instances where the reservation management system is only used to manage reservations with a single rental vehicle service provider, an audit report such as report 900 can be generated if the rental vehicle service provider can classify its rental vehicle services into different groups, e.g. geographically divided groups such as "Northeast", "Midwest", "Southeast", etc. (or even more granularly-defined groups such as "St. Louis area", "Chicago area", "Southern California", etc.). In such instances, the report 900 would provide a plurality of different columns corresponding to the different groups of the rental vehicle service provider (rather than different rental companies) to thereby display each group's data for the different data categories. Not only could such a report be of interest to insurance companies when evaluating a rental company, but such a report can also be of interest to rental companies when evaluating how their different subgroups are operating.

FIGS. 10(*a*)-(*c*) illustrate an exemplary purchaser audit report 1000 that could be generated by the audit report generator for an authorized party such as the purchaser (e.g., insurance company Y). Report 1000 can serve as a valuable aid to the insurance company in evaluating how well its adjusters and/or adjuster groups are performing. However, it should be noted that insurance company audit report 1000 could also be provided to a rental vehicle service provider and/or a repair facility to allow the rental vehicle service provider and/or repair facility to evaluate the nature of reservations managed and/or repair work placed by the insurance company with the rental vehicle service provider and/or repair facility. In such an instance, the data in the report can be broken down by the different insurance companies and other business sources for replacement reservations/repairs for the rental vehicle service provider/repair facility. As with report 700, preferably, report 1000 covers some time period (in this example, year-to-date, although it should be understood that other time spans may be readily employed) and displays data applicable to how adjusters within the insurance company have managed replacement reservations.

By way of example shown in FIG. 10(*a*), the report 1000 can include data columns corresponding to aggregated data for all adjuster groups within the insurance company, data specific to a plurality of different adjuster groups 1, 2, . . . n within the insurance company, industry average data and industry rank data. Report 1000 can further include data for at least any or all of the following data categories:

- Average length of replacement rental vehicle reservations;
- Average number of replacement rental vehicle reservations managed each week;
- Average cost per replacement rental vehicle reservation;
- Average length of initial authorization period per replacement rental vehicle reservation;
- Average length of total authorization period per replacement rental vehicle reservation;
- Average extension length per replacement rental vehicle reservation;
- Average extension length per extension;
- Percentage of replacement rental vehicle reservations that go beyond the LAD (for all, driveable, and nondriveable vehicles);
- Percentage of replacement rental vehicle reservations that end 1, 2, . . . n days prior to the LAD (for all, driveable, and nondriveable vehicles);

Moreover, report 1000 can also include data on callback performance (e.g., percentage of callbacks performed as scheduled) and extension performance (e.g., percentage of extensions that were performed on time) for insurance company personnel, as described above in connection with the rental company reports 800 and 900.

Furthermore, as shown in FIGS. 10(*a*) and (*b*), report 1000 can also show data in these data categories that are broken down on a per adjuster basis for each of the different adjuster groups within the insurance company. Additional data columns could then display how well the adjuster group ranks within the insurance company for each of the data categories.

Therefore, it should be readily understood that an audit report generator can be configured to generate any of a number of different audit reports with varying levels of data relating to reservations managed through the reservation management system.

FIGS. 11(*a*) and (*b*) depict system architectures 1100 that illustrate how the different parties to the replacement rental process can exchange information with each other. In the example of FIG. 11(*a*), an automated reservation management computer system 1102 is in communication with a purchaser computer system 1104 and a repair facility computer system 1106 over a network 1108 such as the Internet. The automated reservation management computer system 1102 can take the form of the ARMS® system developed by the assignee of this invention and as described in the above-referenced and incorporated patent applications. While only one purchaser computer system 1104 and one repair facility computer system 1106 are shown in FIGS. 11(*a*) and (*b*) in communication with the automated reservation management computer system 1102 over network 1108, it should be readily understood that a plurality of purchaser computer systems 1104 and a plurality of repair facility computer systems 1106 can communicate with the automated reservation management computer system 1102 over network 1108.

Figure 11A:
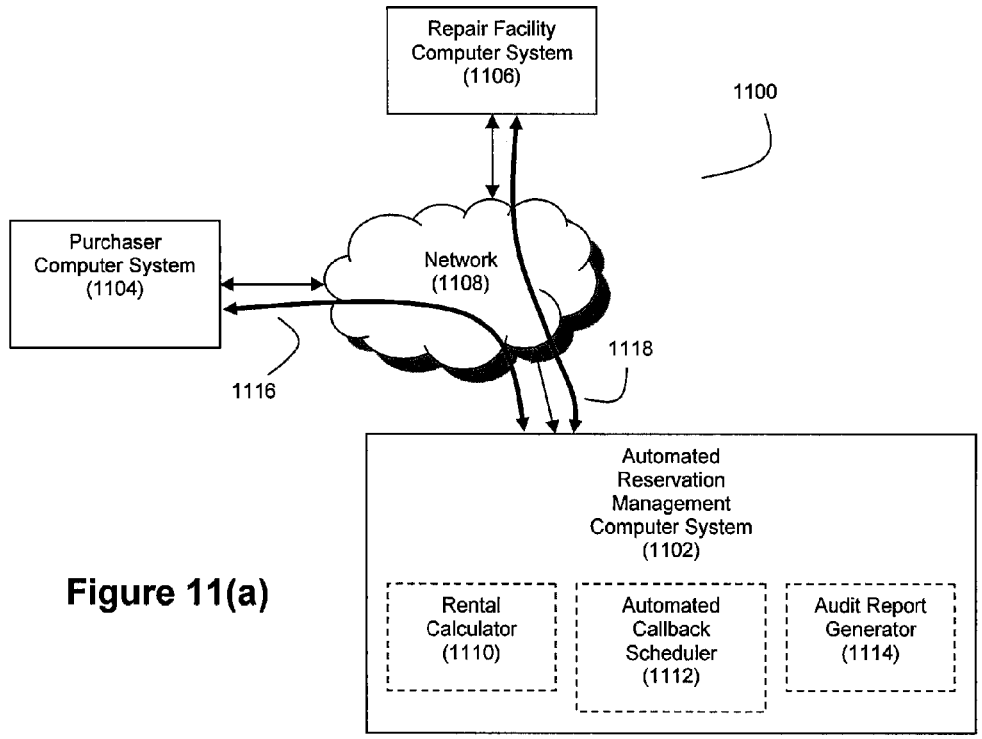
FIGS. 11(a) and (b) depict exemplary computer system architectures for sharing information among a plurality of parties involved with a replacement rental vehicle reservation in accordance with a preferred embodiment of the present invention.
Figure 11B:
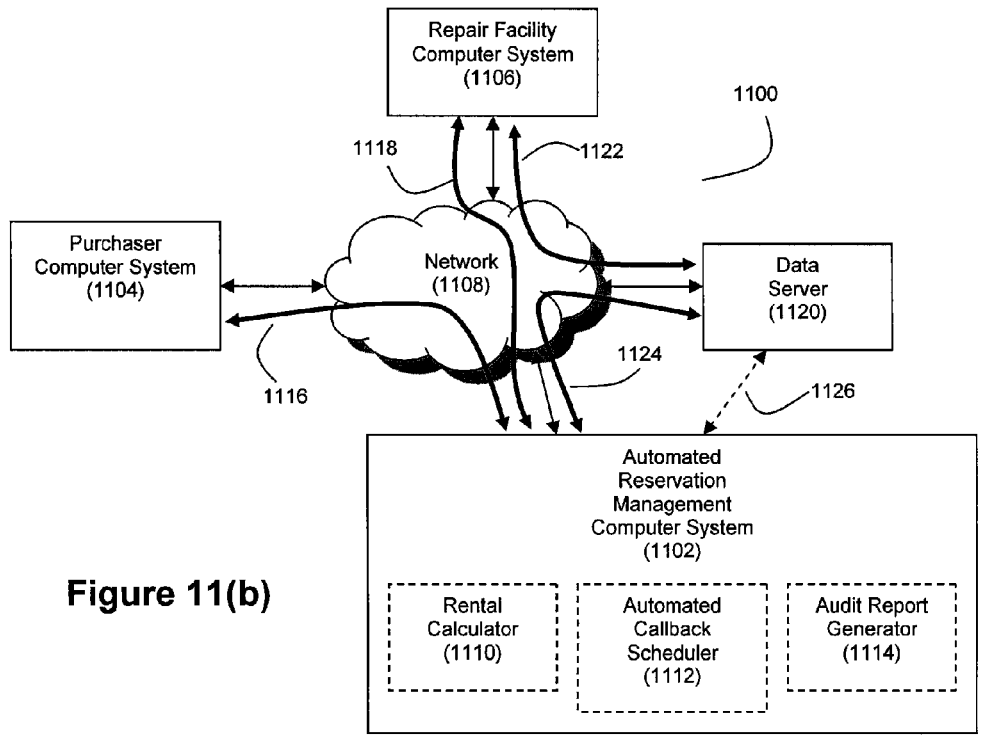

As shown in FIG. 11(a), preferably the rental calculator 1110, automated callback scheduler 1112, and audit report generator 1114 are resident within the automated reservation management computer system 1102 and executed thereby. However, it should be noted that any or all of the rental calculator 1110, the automated callback scheduler 1112, and the audit report generator 1114 can optionally be deployed on other computer systems within system 1100, including but not limited to the purchaser computer system 1104, the repair facility computer system 1106, and the data server 1120 (see FIG. 11(b)). Further still, it should be noted that the functionality of the rental calculator 1110, the automated callback scheduler 1112, and/or the audit report generator 1114 can be distributed across and shared by different computer systems within system 1100 if desired by a practitioner of the invention.

Figure 12:
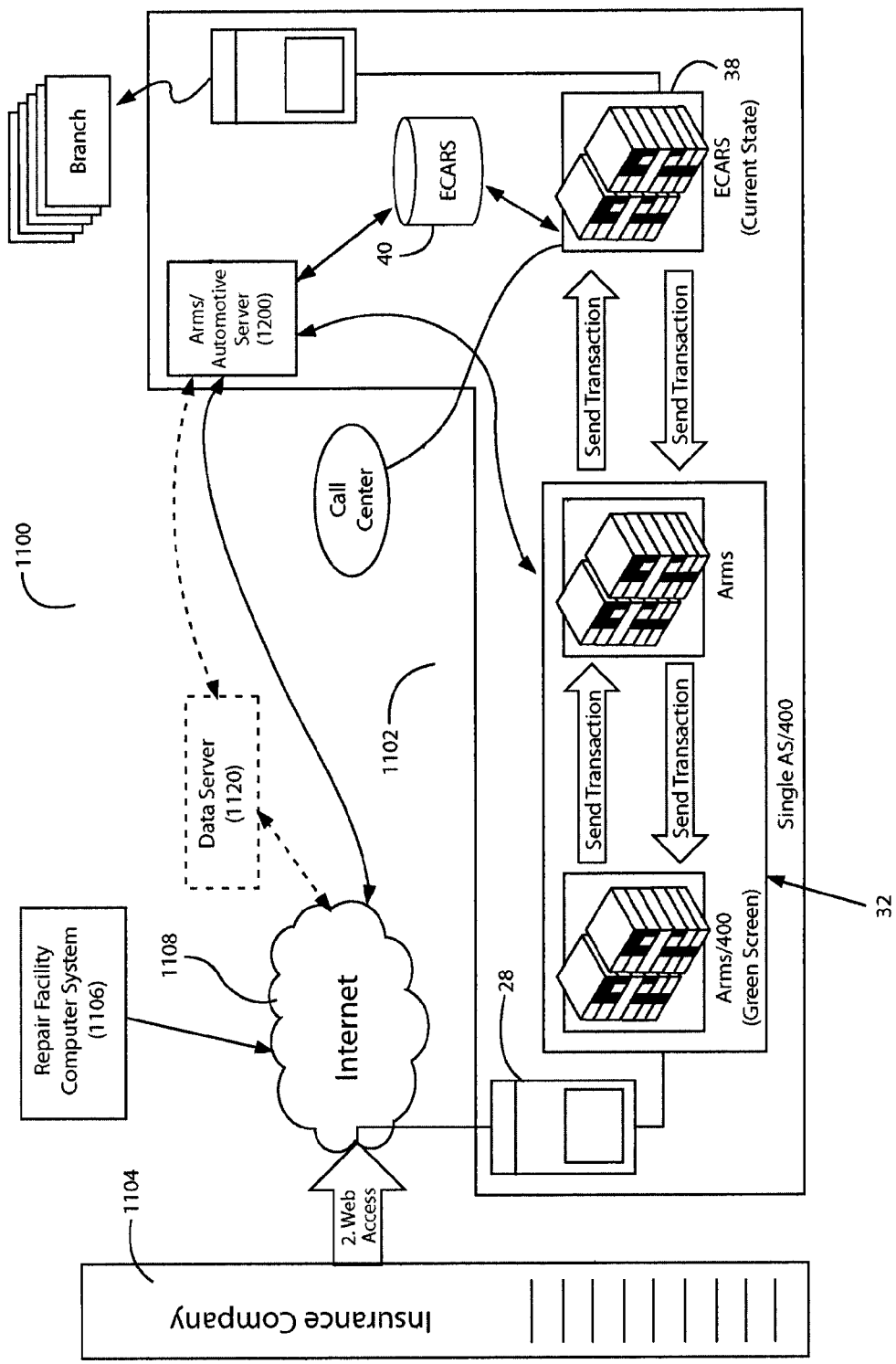
FIG. 12 depicts an exemplary embodiment for the automated reservation management computer system.

FIG. 12 illustrates an exemplary embodiment for the automated reservation management computer system 1102. Functionality for this embodiment of the automated reservation management computer system 1102 is described in greater detail in pending U.S. patent application Ser. No. 09/641,820, filed Aug. 18, 2000, the entire disclosure of which is incorporated herein by reference. As described therein, a user of the purchaser computer system 1104 can access a plurality of GUI screens through Internet web portal 28, wherein these GUI screens interface the purchaser with software executed on mainframe 32 that allows the purchaser to create and manage rental vehicle reservations with a rental vehicle service provider. A database 40 can store the reservation data where it is accessible to a fulfillment software program resident on mainframe 38. The fulfillment software program is preferably accessible to a plurality of branch office computers that are operated by employees of the rental vehicle service provider from branch offices where vehicles are available for rent. Thus, when a driver for a replacement rental vehicle reservation arrives at the branch location to pick up his/her replacement rental, the fulfillment software program is executed to update the reservation records in the database 40 to indicate the opening of a rental ticket for the reservation. Through the GUI screen interface provided via web portal 28, the purchaser can continue to manage the reservation as the reservation continues. It should be understood that the term "rental vehicle reservation" as used herein is not meant to be limited to only the creation of a reservation, but is meant to encompass all aspects of the reservation process, from the initial creation of the reservation, to the opening of a rental ticket when the driver picks up a rental vehicle in accordance with the reservation, to the period while the driver has control of the rental vehicle, and to the closing of the rental ticket when the driver returns the rental vehicle to the rental vehicle service provider (including the invoicing of the costs for the completed reservation).

The automated reservation management computer system 1102 can include a server 1200 that is in communication with the repair facility computer system 1106 (and/or data server 1120) via network 1108. Optionally, the rental calculator 1110 can be deployed on the server 1120 to act in response to any received vehicle repair data. However, it should be understood that the rental calculator 1110, automated callback scheduler 1112, and audit report generator 1114 can be deployed on any or all of the components of system 1102 (e.g., mainframe 32, mainframe 38, Internet web portal 28, etc.) if desired by a practitioner of the present invention.

Figure 13:
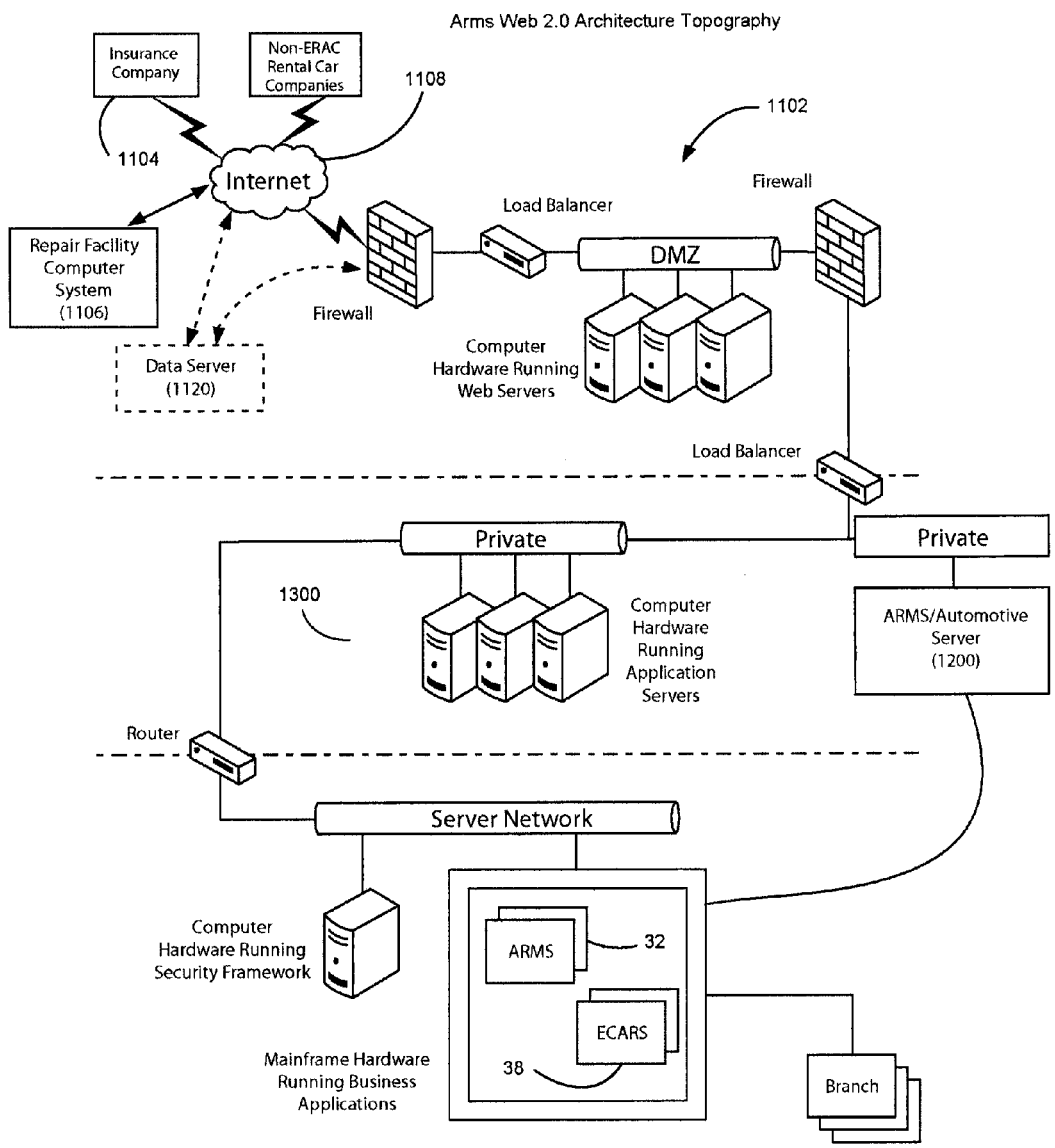
FIG. 13 depicts another exemplary embodiment for the automated reservation management computer system.

FIG. 13 illustrates another exemplary embodiment for the automated reservation management computer system 1102. Functionality for this embodiment of the automated reservation management computer system 1102 is described in greater detail in pending U.S. patent application Ser. No. 09/694,050, filed Oct. 20, 2000, the entire disclosure of which is incorporated herein by reference. As described therein, a plurality of servers 1300 in a middle architectural level of the automated reservation management computer system 1102 can be configured to provide the GUI screens to the purchaser computer system 1104 over network 1108 (albeit through a first architectural layer that connects to network 1108 through a firewall). It is also worth noting that with the embodiment of FIG. 13, a purchaser can book rental vehicle reservations not only with the rental vehicle service provider that operates computer system 1102 but also optionally with a plurality of competitive rental vehicle service providers, as described in the referenced and incorporated Ser. No. 09/694,050 application. The rental calculator 1110, automated callback scheduler 1112, and audit report generator 1114 can optionally be deployed on any of the components of computer system 1102 (e.g., servers 1300, mainframe 32, mainframe 38, server 1200, etc.).

Figure 14:
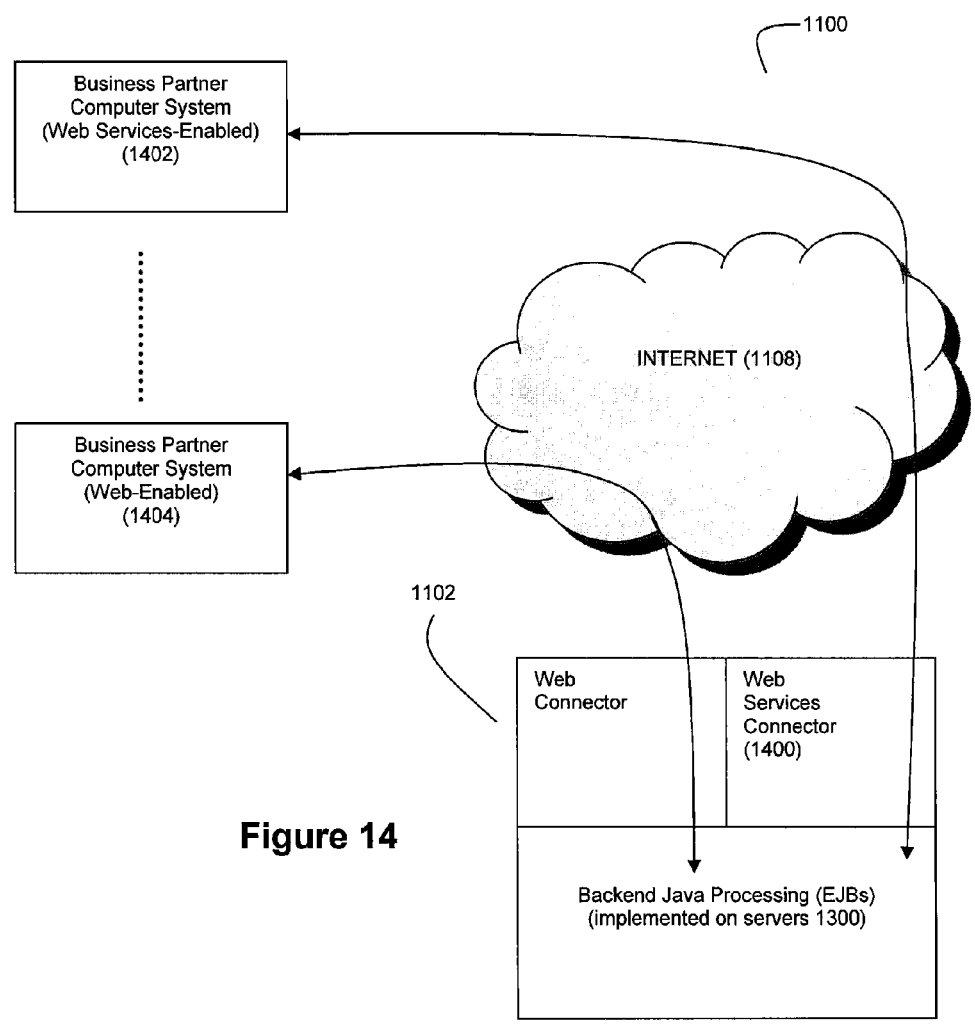
FIG. 14 depicts yet another exemplary embodiment for the automated reservation computer management system.

FIG. 14 illustrates yet another exemplary embodiment for the automated reservation management computer system 1102. Functionality for this embodiment of the automated reservation management computer system 1102 is described in greater detail in pending U.S. patent application Ser. No. 10/865,116, filed Jun. 10, 2004, the entire disclosure of which is incorporated herein by reference. As described therein, web services technology can be used as the mode of data exchange between a business partner computer system 1402 (e.g., purchaser computer system 1104 and/or repair facility computer system 1106) and the automated reservation management computer system 1102. To support this functionality, the automated reservation management computer system 1102 preferably employs a web services connector 1400 for connecting web services-enabled business partners 1402 with the back end processing provided by components such as servers 1300 of FIG. 13. Additional details about the web services connector 1400 are described in greater detail in the referenced and incorporated Ser. No. 10/865,116 application. To business partners who are only web-enabled, their computer systems 1404 can still communicate with the back end processing of the computer system 1102 via a web connector (such as the first architectural layer shown in FIG. 13). In the embodiment of FIG. 14, the rental calculator 1110, automated callback scheduler 1112, and audit report generator 1114 can optionally be deployed on any of the components of computer system 1102 (e.g., servers 1300, mainframe 32, mainframe 38, server 1200, the web connector, the web services connector 1400, etc.).

Returning to FIG. 11(a), through data path 1116, the automated reservation management computer system 1102 is preferably configured to provide a plurality of GUI screens for display within a web browser running on a computer within the purchaser computer system 1104. Through these GUI screens, a user of the purchaser computer system 1104 (such as an insurance adjuster if the purchaser is an insurance company) can preferably access software within the automated reservation management computer system 1102 to create and manage a plurality of replacement rental vehicle reservations for various insureds and/or claimants to insurance policies provided by the insurance company.

Through data path 1118, the automated reservation management computer system 1102 is preferably configured to receive vehicle repair data from the repair facility computer system 1106. Also, it should be noted that the automated reservation management computer system 1102 can be configured to communicate repair facility callbacks to the repair facility computer system 1106 over data path 1118. As previously explained in connection with FIGS. 1 and 2, upon receipt of vehicle repair data, the automated reservation management computer system 1102 can execute the rental calculator 1110 and the automated callback scheduler 1112 to automatically update the TCD (and the LAD, if the automated extensions feature of the preferred embodiment is employed by the purchaser) as well as callback reminder(s) for a reservation without requiring personnel of the purchaser or rental vehicle service provider to manually change the TCD (and the LAD, if the automated extensions feature of the preferred embodiment is employed by the purchaser) or the callback reminder schedule for the reservation. Moreover, even if the purchaser does not employ automated extensions, the rental calculator 1110 can automatically send an authorization request for an extension to the purchaser if a difference is detected between the computed TCD value and the reservation's current LAD, thereby allowing the purchaser to stay on top of reservation management tasks without burdening the purchaser with the task of manually interpreting the vehicle repair data provided by repair facilities.

Furthermore, through data path 1116, the purchaser can invoke the audit report generator 1114 via one or more GUI screens to thereby obtain audit reports such as those described in connection with FIGS. 6(*a*)-10(*c*). Similarly, repair facility personnel can also optionally obtain audit reports from the audit report generator 1114 through data path 1118 if desired.

FIG. 11(*b*) depicts an alternate architecture 1100, wherein a data server 1120 is also in communication with the network 1108. In the embodiment of FIG. 11(*b*), the repair facility computer system 1106 is configured to send its vehicle repair data to the automated rental vehicle reservation management computer system 1102 by way of data server 1120. Thus, over data path 1122, the repair facility computer system 1106 can communicate vehicle repair data to the data server 1120, and the data server 1120 can send the vehicle repair data (or data derived therefrom) to the automated reservation management computer system 1102 over data path 1124 (or optionally direct communication link 1126). Data path 1118 can still be used as the path over which callback data is exchanged. In such an embodiment, it may be desirable to deploy all or a portion of the functionality of the rental calculator 1110, the automated callback scheduler 1112, and/or the audit report generator 1114 on the data server 1120.

As previously indicated, vehicle repair data can be communicated from the repair facility to the automated reservation management computer system 1102 in any of a number of ways. For example, one manner by which repair facilities can communicate vehicle repair data to the automated reservation management computer system 1102 is via a data pump installed on the repair facility computer system 1106 to automatically "pump" new vehicle repair data to the automated reservation management computer system 1102, as disclosed in the above-referenced and incorporated patent application 60/828,540.

Another manner by which the automated reservation management computer system 1102 can receive vehicle repair data over data path 1118 is through a GUI screen interface wherein one or more GUI screens interface a user of the repair facility computer system with the rental calculator 1110, automated callback scheduler 1112, and/or audit report generator 1114. FIG. 15(*a*) depicts an exemplary GUI screen 1500 through which repair facility personnel can submit updated vehicle repair data to the rental calculator 1110 and/or automated callback scheduler 1112. Screen 1500 preferably includes a section 1502 that displays various information about the reservation corresponding to the vehicle being repaired. Through field 1504, the user can enter an explanation for changing the estimated time needed to complete repairs to the disabled vehicle. Preferably, a drop down menu mechanism is provided with field 1504 to display a list of predefined explanations for user selection. This list of predefined explanations can correspond to CIECA status update message codes or other reasons as defined by purchasers and/or repair facilities. Thus, the user can select one or more of the explanations from the list to trigger a change to the time estimate needed to complete repairs. Upon selection of the explanation via field 1504, fields 1508 and 1510 are preferably automatically populated to identify the hours and/or days of additional time that corresponds to the selected reason, based on the rules $300_i$ defined for the purchaser i associated with the reservation. Similarly, comments field 1512 is preferably automatically populated with text that describes the selected explanation, as defined by the purchaser rules 300. Furthermore, a user can optionally also enter values in fields 1508, 1510 and 1512 that are independent of the predefined explanations if a reason exists for the estimate change that does not correspond to any of the predefined explanations.

Once the user has selected an appropriate explanation, he/she can select the update button 1514 to submit the updated vehicle repair data to the rental calculator 1110. If the user wishes to add a plurality of explanations to the reservation record, he/she can select the add button 1516 to add another explanation to the reservation record. If a user wishes to remove a previously-selected explanation, he/she can do so upon selection of the remove button 1518.

Table 1520 lists each explanation 1522 for a change to the repair time estimate that has been applied to the subject reservation, including a corresponding amount of hours 1524 and/or days 1526 of adjustment needed due to each explanation. For purposes of illustration, a large number of entries and corresponding adjustment amounts are shown in table 1520. It should be noted that the data shown in table 1520 is illustrative only and does not necessarily bear on the summary information presented in table 1528 described hereinafter. However, it should be understood that in practice, table 1520 should provide a detailed "component" level view of the information summarized in table 1528.

Summary table 1528 lists a summary of the component values within the TD calculation according to formulas (1) and (2), as well as identifications of the TCD, LAD, number of authorized days, and any shortfall between the LAD and TCD for the reservation. In this example, it can be seen that the TCD falls 6 days after the LAD, in which case an extension (or a request for an extension) to the reservation is necessary as per steps 210-216 of FIG. 2(*a*). As the user enters explanations via field 1504 (or fields 1508, 1510, and/or 1512), preferably the rental calculator 1110 updates the summary table 1528 to reflect the changes.

History table 1530 lists a history of updates that have been made for the reservation with respect to the computations based on formulas (1) and (2). Each entry in table 1530 preferably comprises a previously-entered explanation 1534, the amount of hours 1536 and/or days 1538 corresponding thereto, any comments 1540 corresponding to the explanation in column 1534, the date and time 1542 at which the explanation in column 1534 was added to the reservation record, and an identification 1544 of the user who added the explanation in column 1534 to the reservation record. Link 1532 is preferably user-selectable to display the history information of table 1530 in a pop-up window.

FIG. 15(*b*) depicts another embodiment for GUI screen 1500, wherein table 1520 lists the different explanations 1522, wherein those explanations are categorized as either "adjustments" or "extensions" as per FIG. 2(b) and FIGS. 3(b)-(c) as explained above. Thus, with screen 1500 of FIG. 15(b), the CD value computed via formulas (3) and (4) will also be computed to take any "extension"-categorized explanations into consideration. As reflected in summary table 1528 of FIG. 15(b), rows can be added to the table to identify the extensions amount E from formula (4) (3 days in this example), which count toward to CD value (identified as "Total Days Needed for Repairs" in table 1528) but not toward the TCD value.

It should be noted that the user who accesses screen 1500 of FIGS. 15(a) or (b) need not necessarily be a repair facility employee. For example, the user of screen 1500 may optionally be an employee of the rental vehicle service provider or the purchaser who keys in the updated vehicle repair information provided to him/her via email, fax, or a telephone call.

Figure 26:
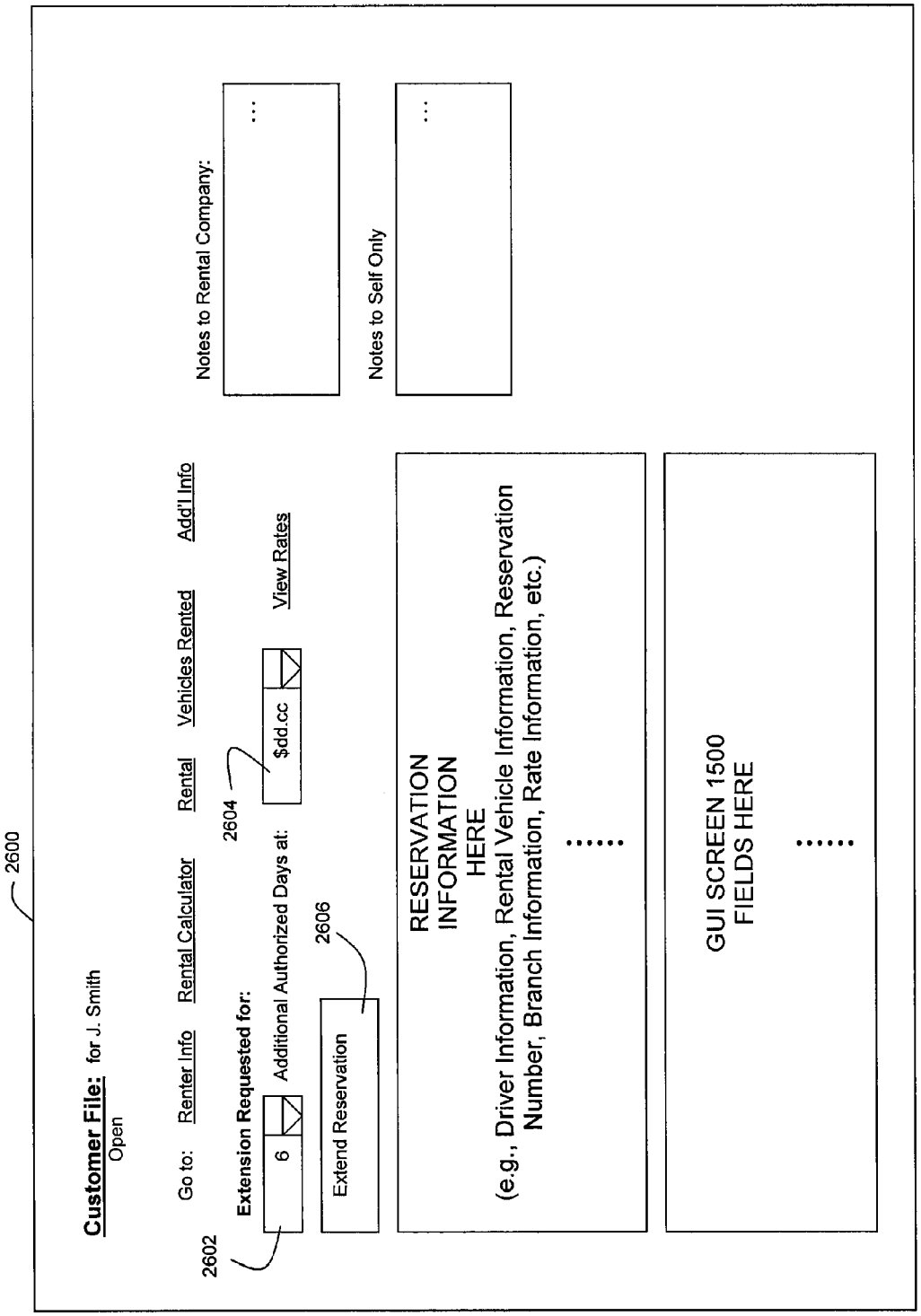
FIG. 26 depicts an exemplary GUI screen through which a reservation manager can extend a reservation.

With reference to the flows of FIGS. 2(a) and (b), it can be seen that screen 1500 identifies a reservation where there is a 6 day shortfall between the LAD and the amount of time needed by the repair facility to complete repairs. In the event that an extension authorization request is generated at step 216, the automated reservation management computer system preferably lists this request in an action items GUI screen 2500 as shown in FIG. 25 so that a reservation manager (a rental vehicle service provider employee in this example, although the reservation manager can also be an employee of the purchaser) can be informed of the need for the extension. Upon selection by the reservation manager of the "extension" action item from screen 2500, an extension authorization GUI screen 2600 such as the one shown in FIG. 26 is preferably displayed. Preferably, field 2602 of screen 2600 is automatically populated with the shortfall between the LAD and the computed time needed by the repair facility to complete repairs to the disabled vehicle (which in this example is 6 days). However, the reservation manager can optionally adjust this amount if desired. Furthermore, through field 2604, the reservation manager can define the rate to apply to the extension period. This field 2604 is preferably populated with the existing rate applicable to the reservation, however other rate values can be optionally selected. Thereafter, via selection of the "extend reservation" button 2606, the reservation manager can re-set the reservation's LAD in accordance with the extension amount in field 2602.

According to another aspect of the preferred embodiment, authorized personnel are preferably given the ability to define the rules used by the rental calculator 1110, automated callback scheduler 1112, and/or audit report generator 1114 through one or more GUI screens. Preferably, appropriately authorized employees of the purchaser are given access to these GUI screens through data path 1116. Similarly, for any such GUI screens to which repair facility personnel are allowed access, such access is preferably provided via data path 1118 (or paths 1122 and/or 1124).

Figure 16:
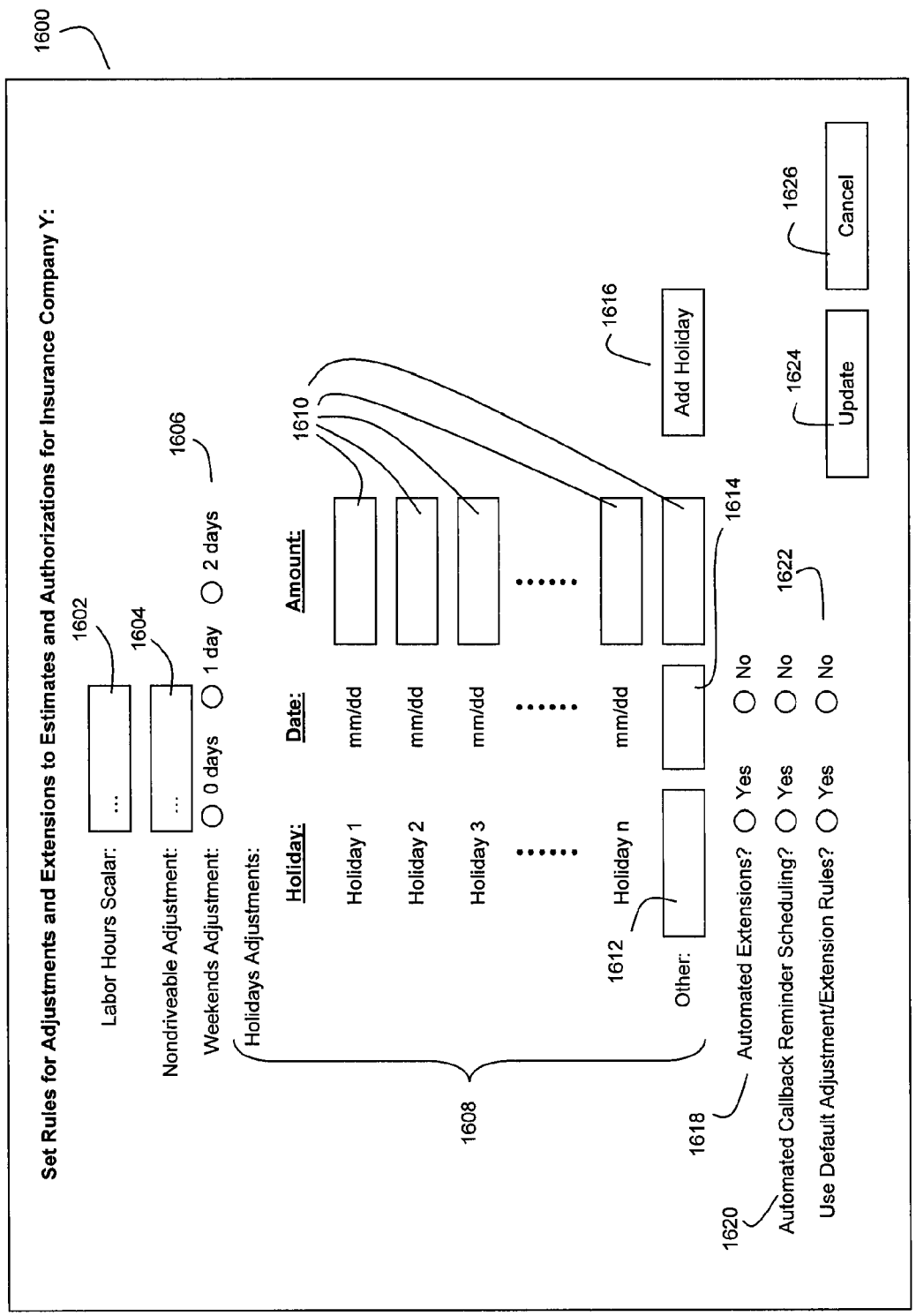
FIG. 16 depicts an exemplary GUI screen through which a user can define rules for computing term-related parameters for a reservation.

FIG. 16 depicts an exemplary GUI screen through which an authorized user can define the rules used by the rental calculator 1110 to compute adjustments and extensions for reservation. Preferably, the user is an authorized employee of the purchaser (e.g., insurance company Y) for which the rules apply. However, it should be noted that the user could be an employee of the rental vehicle service provide or some other authorized person.

Via field 1602, the user can define the labor hours scalar (LHS) used by the rental calculator 1110 for formula (2).

Via field 1604, the user can define the nondriveable adjustment used by rental calculator 1110 for formula (2). This amount is preferably expressed in units of days or hours.

Via fields 1606, the user can define the amount of adjustment to be applied for the weekends portion of the weekends/holidays adjustment of formula (1). This amount is preferably expressed in units of days or hours.

Via section 1608, the user can define the amount of adjustments for various holidays as part of the holidays portion of the weekends/holidays adjustment of formula (2). Preferably, section 1608 lists a plurality of predefined holidays (e.g., Christmas, New Years, $4^{th}$ of July, etc.), identifies the date therefor, and includes a field 1610 in which the user can enter the adjustment amount therefor. These amounts are preferably expressed in units of days or hours. Should the purchaser want the rental calculator 1110 to observe any holidays not included on the predefined list, the user is preferably given the ability to add a holiday to the list by entering a descriptor for the new holiday in field 1612 and the date for the new holiday in field 1614. Field 1610 can accept input from the user regarding the adjustment amount applicable to the new holiday. Should the user need to add more new holidays, he/she can select the "add holiday" button 1616 to add a new set of fields 1612, 1614 and 1610 to section 1608.

It should be noted that screen 1600 or subportions thereof (such as field 1602, fields 1606, and/or section 1608) can be made available to the repair facilities of the purchaser on a repair facility-specific basis such that the different rules defined via user input in screen 1600 can be repair facility-specific.

Via fields 1618, the user can define whether the purchaser is to employ automated extensions in the event of detected differences between the TCD and LAD. If the user selects "yes" in fields 1618, then the user is preferably also directed to the GUI screen 2200 of FIG. 22 described hereinafter.

Via fields 1620, the user can define whether automated callback reminder scheduling is to be employed for the purchaser. If the user selects "yes" in fields 1620, then the user is preferably also directed to one or more GUI screens for defining the rules used by the automated callback scheduler 1112, as described hereinafter.

Also, preferably the user is given the option via fields 1622 to use a set of pre-defined default rules for the rental calculator 1110. If the user chooses to user the default rules, the user's need to enter adjustment amounts via the GUI screens 1600 and 1700 can be alleviated.

Once the user has entered the appropriate values in the fields of GUI screen 1600, the user can select the update button 1624 to store the rules for use by the rental calculator 1110. These rules can be stored in the available memory resources of any of the components of the automated reservation management computer system 1102 illustrated in FIGS. 12-14 or in a separate database accessible to the automated reservation management computer system 1102. To cancel any entries in screen 1600, the user can select the cancel button 1626. If, upon selection of the update button 1624, the user has chosen to not use default rules via fields 1622, the GUI screen 1700 of FIG. 17 is preferably displayed.

Figure 17:
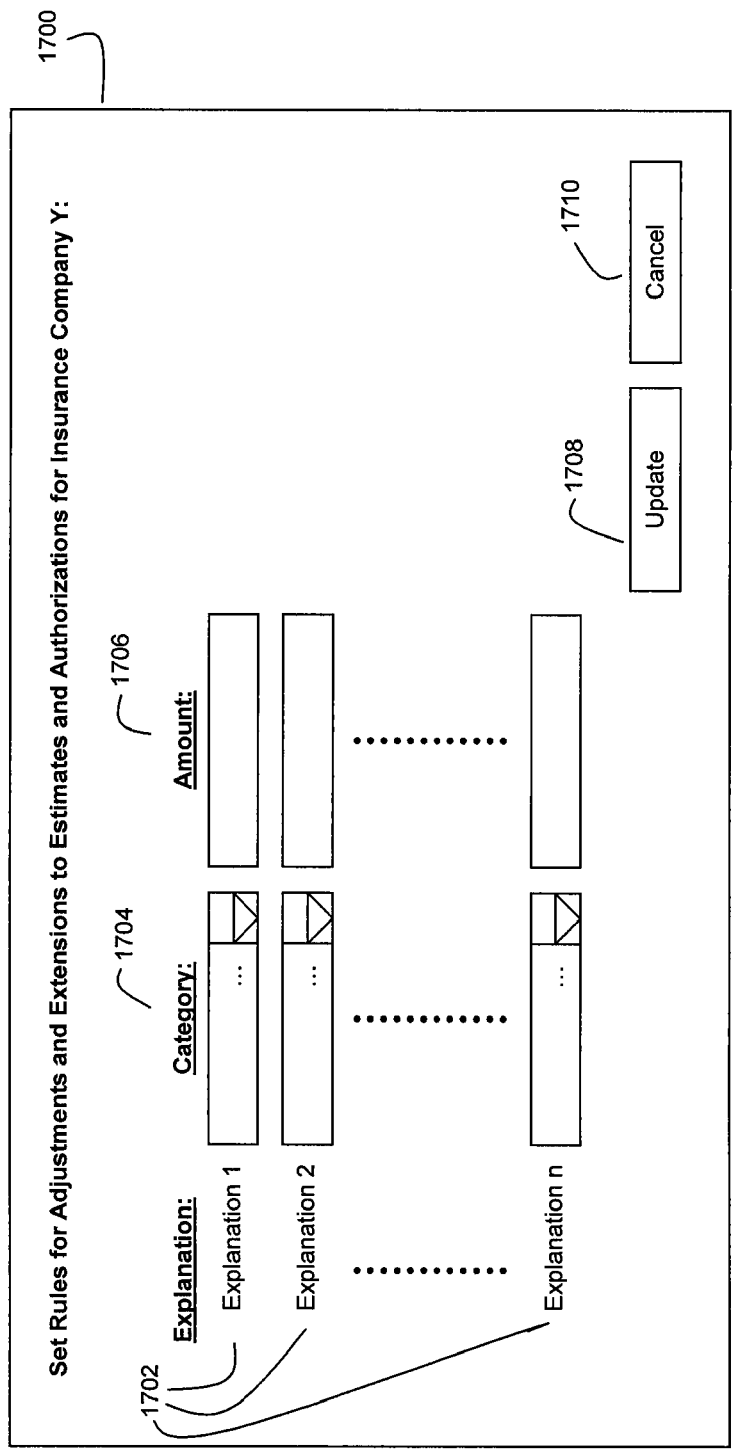
FIG. 17 depicts another exemplary GUI screen through which a user can define rules for computing term-related parameters for a reservation.

FIG. 17 depicts a GUI screen 1700 through which the user can define the change amounts corresponding to each explanation. Preferably, screen 1700 lists a plurality of predefined explanations 1702. As previously explained, these explanations preferably correspond to the CIECA status update messages and other purchaser-defined or repair facility-defined explanations. Through fields 1706, the user can define the amount of change to the TD computation applicable to each explanation. These amounts are preferably expressed in units of days or hours. Optionally, if the purchaser has chosen to categorize explanations as either "adjustments" or "extensions", preferably the user can apply one of these predefined categories to each explanation 1702 via fields 1704. Also, screen 1700 may optionally provide the user with the ability to add new explanations observed by the purchaser that are not among the plurality of predefined explanations in a manner similar to the "add a holiday" feature of screen 1600. Once the user has entered appropriate values in the fields of screen 1700, he/she can select the update button 1708 to save them for use by the rental calculator 1110. Otherwise, the user can select the cancel button 1710.

Figure 18:
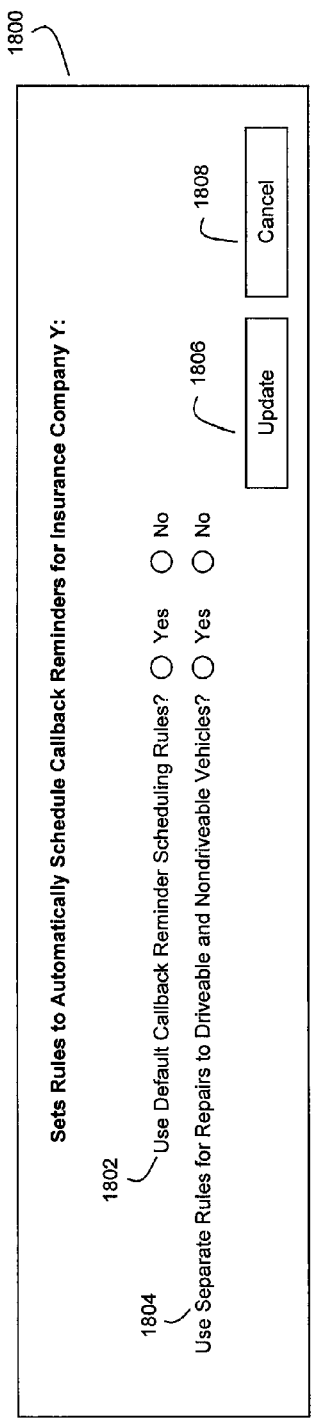
FIG. 18 depicts an exemplary GUI screen through which a user can define automated callback scheduling rules.

The GUI screen 1800 of FIG. 18 is preferably displayed if the user has selected the "yes" option in fields 1618 of screen 1600. Screen 1800 can be displayed after user selection of update button 1624 (if the user has chosen to use default rules for the rental calculator 1110) or after user selection of update button 1708 (if the user has chosen to use non-default rules for the rental calculator 1110). Through GUI screen 1800, the user can define at least a portion of the rules used by the automated callback scheduler 1112 for the purchaser. Via fields 1802, the user can specify whether a predefined default set of automated callback scheduling rules are to be used for the purchaser. Through fields 1804, the user can choose whether different callback scheduling rules are to be applied for driveable and nondriveable vehicles. To continue this process, the user can select the update button 1806. Otherwise, the user can select the cancel button 1808.

Figure 19:
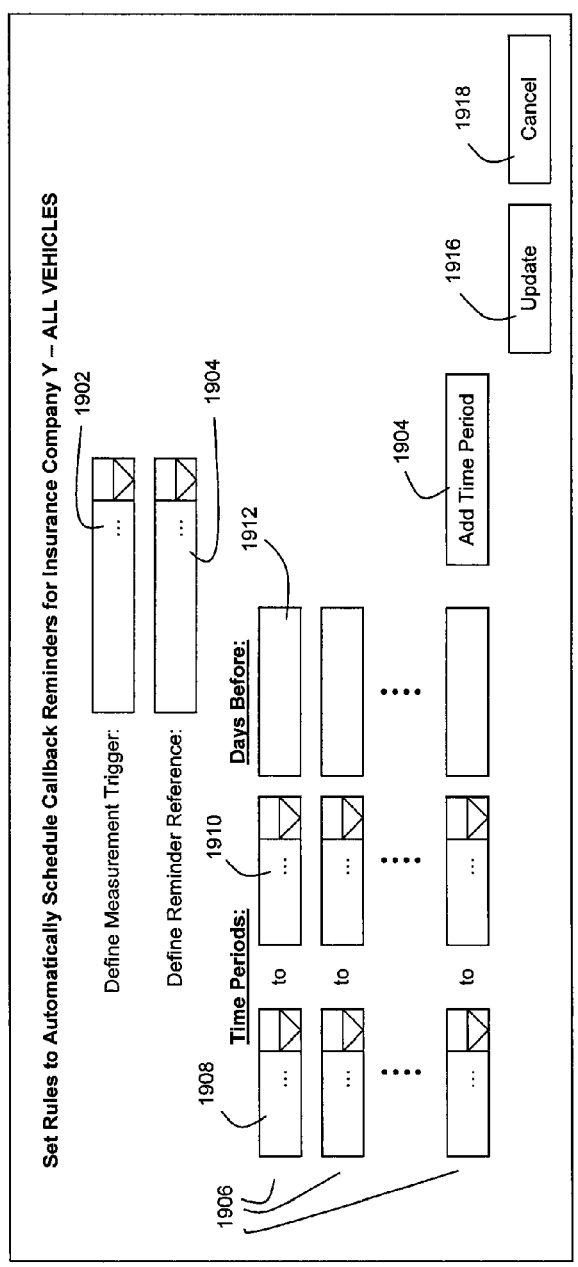
FIG. 19 depicts an exemplary GUI screen through which a user can define automated callback scheduling rules corresponding to all vehicles, both driveable and nondriveable.

If the user selected the option "no" in fields 1804, then upon selection of the update button 1806, the GUI screen 1900 of FIG. 19 is displayed. Through GUI screen 1900, the user can define the callback scheduling rules for all vehicles.

Via field 1902, the user can define the measurement trigger (see the left column in the tables of FIGS. 4(*a*)-(*c*)) for the automated scheduling rules. Preferably, the user can select one of a plurality of predefined measurement triggers via a dropdown menu associated with field 1902. Examples of such measurement triggers include "days encompassed by the LUD and the DUD", "number of authorized days", and "days encompassed by the LUD and the LAD".

Via field 1904, the user can define the reminder reference that serves as the frame of reference for computing the scheduled callback date (see the right column in the tables of FIGS. 4(*a*)-(*c*)). Preferably, the user can select one of a plurality of predefined reminder references via a dropdown menu associated with field 1904. An example of another reminder reference that can be used includes "days before LAD".

GUI screen 1900 also preferably provides the user with the ability to define the time periods used by the automated callback scheduler rules (see the rows in the tables of FIGS. 4(*a*)-(*c*)). Through fields 1908 and 1910, the user can define the start and end points for each time period. Further, through fields 1912, the user can enter the amount to be applied against the reference reminder for each time period when determining when the callback reminder should be scheduled. These amounts are preferably expressed in units of days or hours. Should the user need to add additional time period rules, he/she can do so by selecting the "add time period" button 1904.

Once the user has defined the callback scheduling rules via screen 1900, he/she preferably selects the update button 1916 to save them for use by the automated callback scheduler 1112. These rules can be stored in the available memory resources of any of the components of the automated reservation management computer system 1102 illustrated in FIGS. 12-14 or in a separate database accessible to the automated reservation management computer system 1102. Otherwise, the user can select the cancel button 1918.

Figure 20:
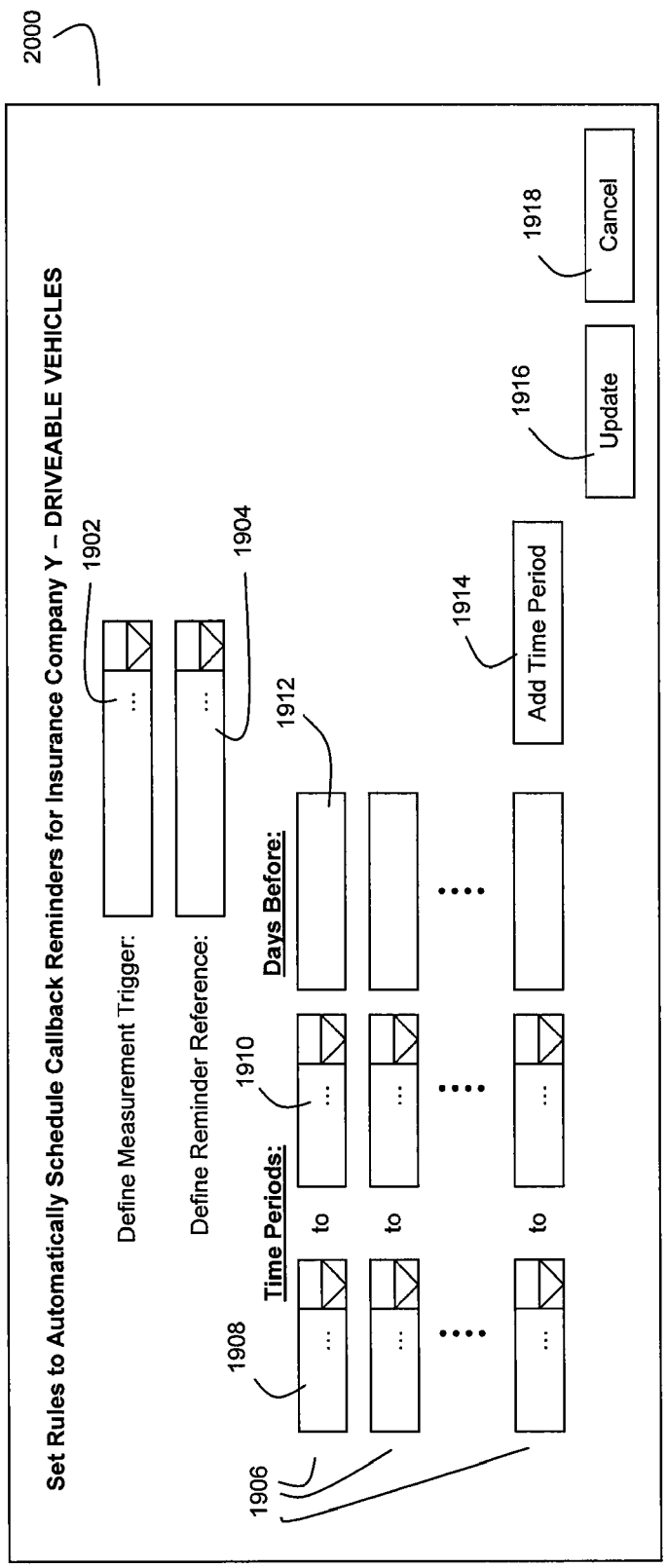
FIG. 20 depicts an exemplary GUI screen through which a user can define automated callback scheduling rules corresponding to driveable vehicles.
Figure 21:
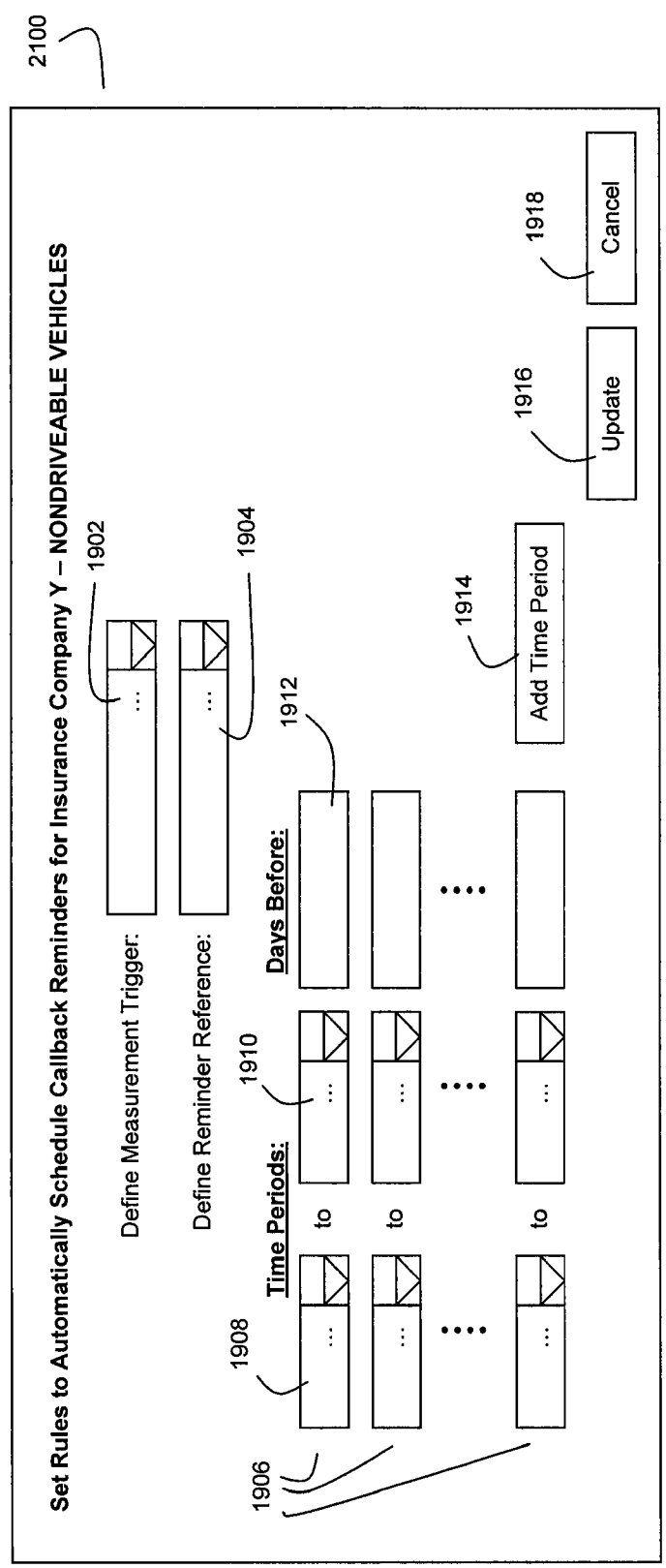
FIG. 21 depicts an exemplary GUI screen through which a user can define automated callback scheduling rules corresponding to nondriveable vehicles.

If the user selected the option "yes" in fields 1804 of GUI screen 1800, then upon selection of the update button 1806, the GUI screens 2000 and 2100 of FIGS. 20 and 21 are preferably successively displayed for user entry therein (in any order). GUI screens 2000 and 2100 preferably correspond to GUI screen 1900, albeit being applicable to scheduling rules for driveable and nondriveable vehicles respectively.

Figure 22:
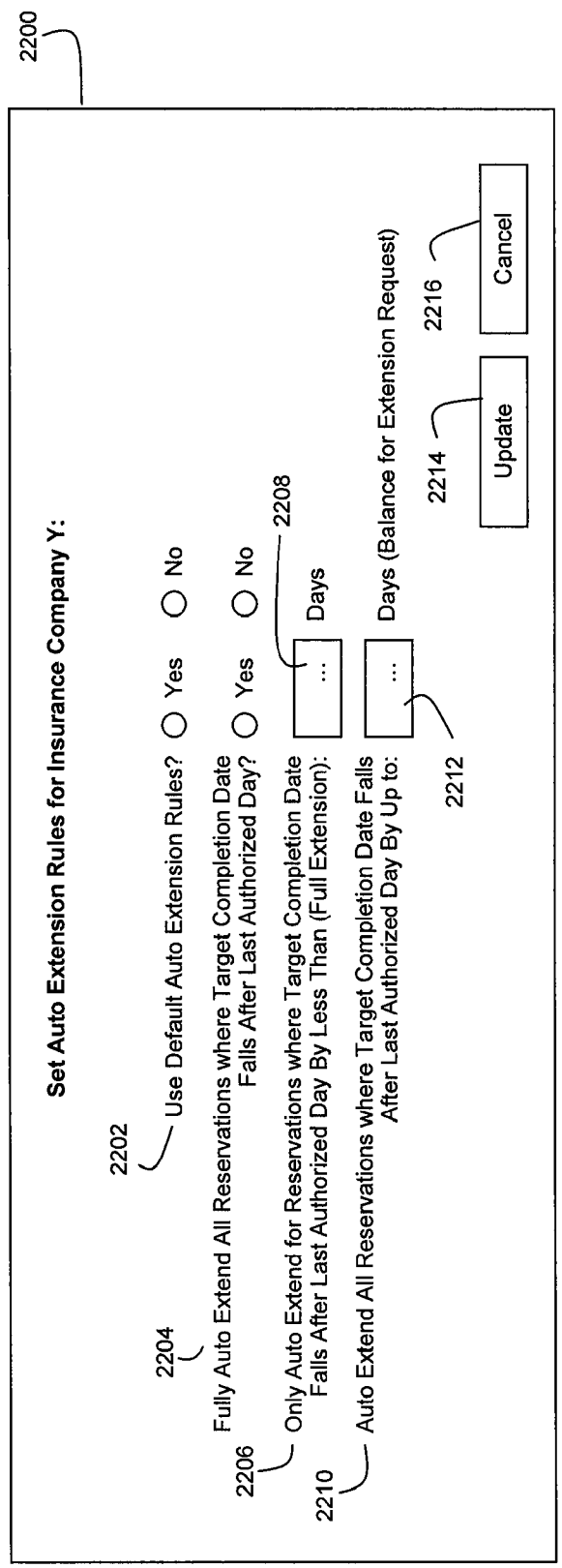
FIG. 22 depicts an exemplary GUI screen through which a user can define automated extension rules for rental vehicle reservations.

FIG. 22 depicts an exemplary GUI screen 2200 for defining the auto extension rules for a purchaser to be used by the rental calculator 1110 at step 214 of FIG. 2. As indicated, GUI screen 2200 is preferably displayed if the user has chosen to use auto extension rules for reservations via fields 1618 of FIG. 16. GUI screen 2200 preferably lists a plurality of auto extension rules options for selection by the user.

Via fields 2202, the user can select whether default auto extension rules are to be applied to the reservations of the purchaser.

Via fields 2204, the user can select the rule "fully extend all reservations where the TCD falls after the LAD" if desired. It should be noted that a rule such as this could also be used as the default auto extension rule.

Via fields 2206, the user can select the rule "only auto extend for reservations where the TCD falls after the LAD by less the X number of days", wherein the user can define the value for X via field 2208. With this rule, it is preferred that a full extension be given to reset the LAD to the TCD in such circumstances.

Via fields 2210, the user can select the rule "auto extend all reservations where the TCD falls after the LAD by up to a maximum of X days", wherein the user can define the value for X via field 2212. With this rule, any remaining difference between the TCD and LAD following the auto extension should be the subject of an authorization request for an extension to be sent to the purchaser.

These and other auto extension rules can preferably be selected by the user through GUI screen 2200. Once the user has selected the appropriate auto extension rule, he/she can save that auto extension rule for use by the rental calculator 1110 by selecting the update button 2214. Otherwise, the user can select the cancel button 2216.

One or more GUI screens can also be provided for authorized users to define how the audit report generator will generate audit reports for a purchaser, repair facility, or rental vehicle service provider. Such GUIs preferably are configured to accept user input that defines which data categories and data columns will be included on the different types of audit reports described herein.

While the present invention has been described above in relation to its preferred embodiment, such description is intended to be merely illustrative of the invention and various modifications may be made thereto that still fall within the invention's scope, as would be recognized by those of ordinary skill in the art upon review of the teachings herein.

For example, it should be noted that a practitioner of the invention can optionally choose to configure the rental calculator software 1110 to automatically adjust a reservation's LAD to match the TCD computed therefor at step 208 of FIG. 2 even if a reservation's previous LAD falls after the newly-computed TCD.

Figure 27:
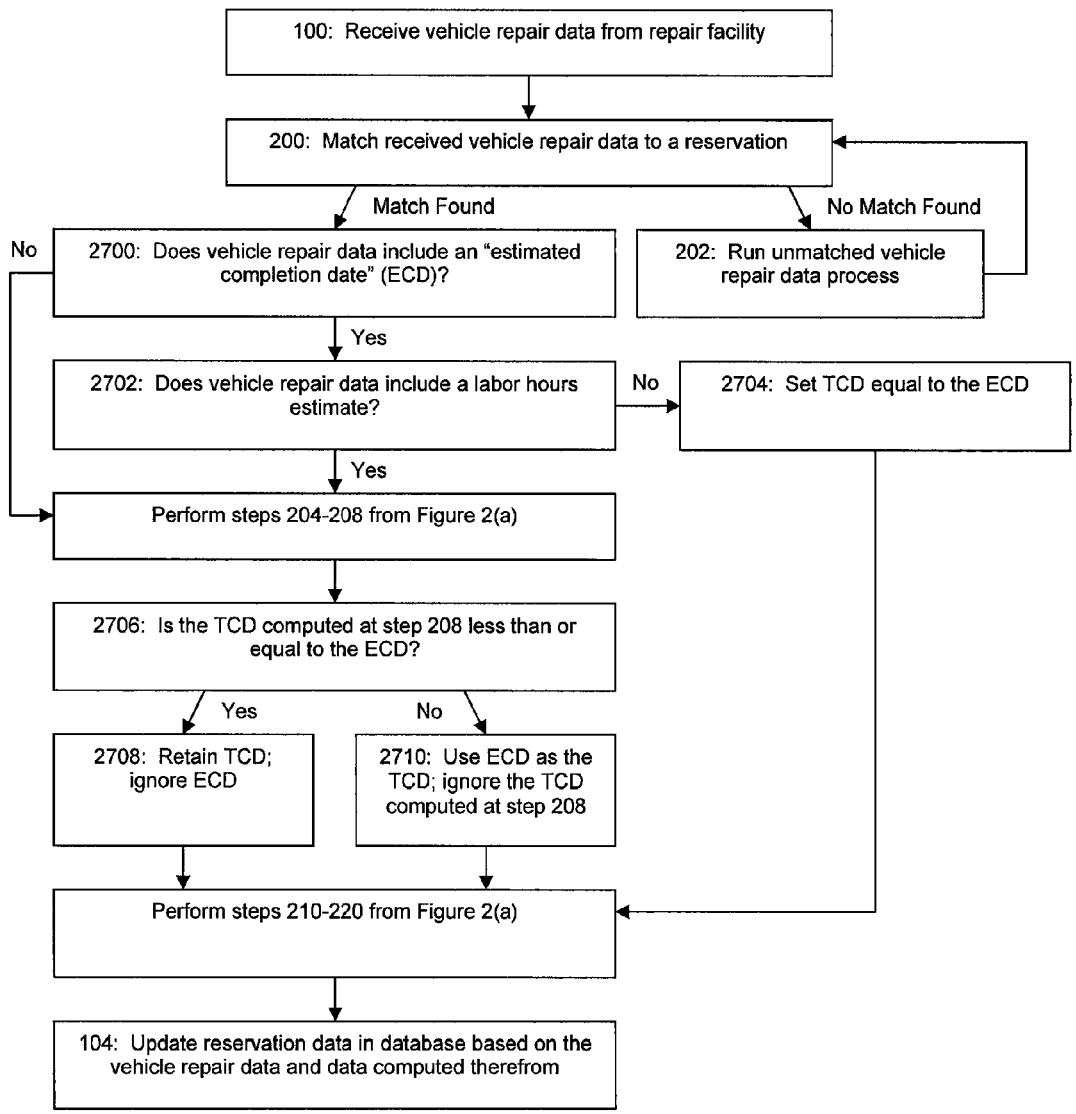
FIG. 27 depicts another preferred embodiment for the process flow of FIG. 1, wherein the vehicle repair data may include both labor hours data and an estimated completion date.

Furthermore, for repair facilities that may provide the automated reservation management computer system 1102 with an "estimated completion date" (ECD) in addition to other vehicle repair data such as labor hours, etc., a process flow such as the one shown in FIG. 27 can be employed. The ECD represents an estimate by the repair facility as to how long the repair facility needs to complete repairs to the subject disabled vehicle. Repair facilities may provide this ECD information independently of and in addition to labor hours estimates. In such a case, the process flow of FIG. 27 operates to decide whether the ECD or the TCD (computed from the labor hours data via formulas (1) and (2)) should be used to control the extension decision making process. Each purchaser can define the situations in which the ECD will control and the situations in which the labor hours-derived TCD will control. In the example of FIG. 27, the controlling value will be the smaller of the ECD and TCD values. However, it should be noted that a purchaser or other party may choose to use the larger of the two values to control the extension process. Further still, rather than comparing the ECD and the TCD to determine which is smaller or larger, it should be noted that the comparison can be made to determine which was most recently updated (e.g., where an initial repair estimate provides labor hours from which the TCD is computed, but a few days later the repair facility provides an updated repair estimate for that disabled vehicle with the same labor hours but now including an ECD, or where an initial repair estimate provides an ECD but no labor hours and a subsequent repair estimate for the same disabled vehicle includes labor hours). In such an embodiment, the flow of FIG. 27 can be modified to use the most recently updated value as between TCD and ECD as the controlling value. The flow of FIG. 27 modifies the flow of FIG. 2(a) as follows. Steps 2700 and 2702 are introduced to determine whether either or both of an ECD value and a labor hours value are included in the vehicle repair data for the reservation (in this example, it will be assumed that at least one of these values is present in the vehicle repair data applicable to the reservation). If no labor hours are present, then at step 2704, the TCD is set equal to the ECD value, and the process jumps to step 210 of FIG. 2(a). If both an ECD and an estimate of labor hours are present in the vehicle repair data, then the process computes the TCD value from the labor hours as previously described in connection with steps 204-208 of FIG. 2(a). Thereafter, at step 2706, the computed TCD value is compared with the ECD value to determine which is smaller. If the TCD value is less than or equal to the ECD value, then the process flow of steps 210-220 of FIG. 2(a) are driven by the TCD value (step 2708). If the ECD value is less than the TCD value, then the process flow of steps 210-220 of FIG. 2(a) are driven by the ECD value (step 2710). In this manner, the rental calculator 1110 can accommodate repair facilities which may provide ECD data in addition to or instead of labor hours data. It should also be noted that the process flow of FIG. 27 can also be incorporated into the process flow of FIG. 2(b).

Further still, when the vehicle repair data includes both an ECD and labor hours, a practitioner of the invention can also choose to follow the flow of FIG. 2(a) or 2(b), in which case the ECD value will be effectively ignored.

As such, the full scope of the present invention is to be defined solely by the appended claims and their legal equivalents.

What is claimed is:

1. A computer-implemented method for managing a rental vehicle reservation for a replacement vehicle corresponding to a disabled vehicle, wherein the replacement rental vehicle reservation is associated with data indicative of an authorization duration for that replacement rental vehicle reservation, the method comprising:
   receiving data representative of an estimation of a number of labor hours to repair the disabled vehicle;
   storing a plurality of labor hours scalars in a memory, the labor hours scalars being associated with a plurality of parties such that each labor hours scalar is associated with at least one party;
   determining a party associated with the received labor hours estimation data;
   selecting the stored labor hours scalar that is associated with the determined party;
   automatically computing data indicative of an estimated duration for the repair to the disabled vehicle based on an application of the selected labor hours scalar to the received labor hours estimation data; and
   determining whether the authorization duration for the replacement rental vehicle reservation that corresponds to the disabled vehicle would end prior to repairs being completed for the disabled vehicle based on the computed repair duration data and the authorization duration data; and
   in response to a determination that the authorization duration for the replacement rental vehicle reservation would end prior to repairs being completed for the disabled vehicle, automatically extending the replacement rental vehicle reservation to thereby associate the replacement rental vehicle reservation with a new authorization duration, wherein the automatically extending step comprises:
      determining whether a difference between an end of the authorization duration and an end of the repair duration corresponding to the computed repair duration data is less than a threshold; and
      in response to a determination that the difference is less than the threshold, automatically storing data in the memory that is indicative of the new authorization duration for the replacement rental vehicle reservation such that an expiration of the new authorization duration coincides in time with the end of the repair duration corresponding to the computed repair duration data; and
   wherein the method steps are performed by a processor in cooperation with the memory.

2. A computer-implemented method for managing a rental vehicle reservation for a replacement vehicle corresponding to a disabled vehicle, wherein the replacement rental vehicle reservation is associated with data indicative of an authorization duration for that replacement rental vehicle reservation, the method comprising:
   receiving data representative of an estimation of a number of labor hours to repair the disabled vehicle;
   storing a plurality of labor hours scalars and a plurality of business rules in a memory, the labor hours scalars being associated with a plurality of parties such that each labor hours scalar is associated with at least one party, the business rules being associated with a plurality of parties such that each business rule is associated with at least one party, wherein the business rules comprise a plurality of automated extensions rules such that a plurality of different parties employ different business rules for automatically extending replacement rental vehicle reservations;
   determining a party associated with the received labor hours estimation data;
   selecting the stored labor hours scalar that is associated with the determined party;
   selecting the stored automated extension rule that is associated with the determined party;
   automatically computing data indicative of an estimated duration for the repair to the disabled vehicle based on an application of the selected labor hours scalar to the received labor hours estimation data; and
   determining whether the authorization duration for the replacement rental vehicle reservation that corresponds to the disabled vehicle would end prior to repairs being completed for the disabled vehicle based on the computed repair duration data and the authorization duration data; and in response to a determination that the authorization duration for the replacement rental vehicle reservation would end prior to repairs being completed for the disabled vehicle, automatically extending the replacement rental vehicle reservation in accordance with the selected automated extension rule to thereby associate the replacement rental vehicle reservation with a new authorization duration.

3. An apparatus for managing a rental vehicle reservation for a replacement vehicle corresponding to a disabled vehicle, the apparatus comprising:

a processor; and a memory, the memory configured to (1) store a plurality of labor hours scalars, the labor hours scalars being associated with a plurality of parties such that each labor hours scalar is associated with at least one party, and (2) store data indicative of an authorization duration for the replacement rental vehicle reservation in association with that replacement rental vehicle reservation; and wherein the processor is configured to (1) receive data representative of an estimation of a number of labor hours to repair the disabled vehicle, (2) determine a party associated with the received labor hours estimation data, (3) select the stored labor hours scalar that is associated with the determined party, (4) automatically compute data indicative of an estimated duration for the repair to the disabled vehicle based on an application of the selected labor hours scalar to the received labor hours estimation data, and (5) perform a management operation on the replacement rental vehicle reservation that corresponds to the disabled vehicle by (i) determining whether the authorization duration for the replacement rental vehicle reservation would end prior to repairs being completed for the disabled vehicle based on the computed repair duration data and the authorization duration data, and (ii) in response to a determination by the processor that the authorization duration for the replacement rental vehicle reservation would end prior to repairs being completed for the disabled vehicle, automatically extending the replacement rental vehicle reservation to thereby associate the replacement rental vehicle reservation with a new authorization duration; and wherein the processor is further configured to automatically extend the replacement rental vehicle reservation by (1) determining whether a difference between an end of the authorization duration and an end of the repair duration corresponding to the computed repair duration data is less than a threshold, and (2) in response to a determination by the processor that the difference is less than the threshold, automatically storing data in the memory that is indicative of the new authorization duration for the replacement rental vehicle reservation such that an expiration of the new authorization duration coincides in time with the end of the repair duration corresponding to the computed repair duration data.

4. An apparatus for managing a rental vehicle reservation for a replacement vehicle corresponding to a disabled vehicle, the apparatus comprising:

a processor; and a memory, the memory configured to (1) store a plurality of labor hours scalars, the labor hours scalars being associated with a plurality of parties such that each labor hours scalar is associated with at least one party, (2) store a plurality of business rules, the business rules being associated with a plurality of parties such that each business rule is associated with at least one party, wherein the business rules comprise a plurality of automated extensions rules such that a plurality of different parties employ different business rules for automatically extending replacement rental vehicle reservations, and (3) store data indicative of an authorization duration for the replacement rental vehicle reservation in association with that replacement rental vehicle reservation; and wherein the processor is configured to (1) receive data representative of an estimation of a number of labor hours to repair the disabled vehicle, (2) determine a party associated with the received labor hours estimation data, (3) select the stored labor hours scalar that is associated with the determined party, (4) select the stored automated extension rule that is associated with the determined party, (5) automatically compute data indicative of an estimated duration for the repair to the disabled vehicle based on an application of the selected labor hours scalar to the received labor hours estimation data, and (5) perform a management operation on the replacement rental vehicle reservation that corresponds to the disabled vehicle by (i) determining whether the authorization duration for the replacement rental vehicle reservation would end prior to repairs being completed for the disabled vehicle based on the computed repair duration data and the authorization duration data, and (ii) in response to a determination by the processor that the authorization duration for the replacement rental vehicle reservation would end prior to repairs being completed for the disabled vehicle, automatically extending the replacement rental vehicle reservation in accordance with the selected automated extension rule to thereby associate the replacement rental vehicle reservation with a new authorization duration.

5. A computer-implemented method for managing a rental vehicle reservation for a replacement vehicle corresponding to a disabled vehicle, the method comprising:

receiving data representative of an estimation of a number of labor hours to repair the disabled vehicle;

receiving data corresponding to an explanation for a repair delay to the disabled vehicle;

storing a plurality of labor hours scalars in a memory, the labor hours scalars being associated with a plurality of parties such that each labor hours scalar is associated with at least one party;

determining a party associated with the received labor hours estimation data;

selecting the stored labor hours scalar that is associated with the determined party;

automatically computing data indicative of an estimated duration for the repair to the disabled vehicle, wherein the automatically computing step comprises (1) applying the selected labor hours scalar to the received labor hours estimation data to translate the labor hours estimation data into a number of business days needed by the repair facility to perform those labor hours and (2) automatically computing the estimated repair duration data based at least in part on an adjustment amount corresponding to whether the time needed to complete repairs to the disabled vehicle will include any holiday days and an adjustment amount corresponding to the explanation data; and performing a management operation on the replacement rental vehicle reservation that corresponds to the disabled vehicle based on the computed data indicative of the estimated repair duration; and wherein the method steps are performed by a processor in cooperation with the memory.

6. An apparatus for managing a rental vehicle reservation for a replacement vehicle corresponding to a disabled vehicle, the apparatus comprising:

a processor; and a memory, the memory configured to store a plurality of labor hours scalars, the labor hours scalars being associated with a plurality of parties such that each labor hours scalar is associated with at least one party; and wherein the processor is configured to (1) receive data representative of an estimation of a number of labor hours to repair the disabled vehicle, (2) receive data corresponding to an explanation for a repair delay to the disabled vehicle, (3) determine a party associated with the received labor hours estimation data, (4) select the stored labor hours scalar that is associated with the determined party, (5) apply the selected labor hours scalar to the received labor hours estimation data to translate the labor hours estimation data into a number of business days needed by the repair facility to perform those labor hours, (6) automatically compute data indicative of an estimated duration for the repair to the disabled vehicle based at least in part on (i) the translated number of business days, (ii) an adjustment amount corresponding to whether the time needed to complete repairs to the disabled vehicle will include any holiday days, and (iii) an adjustment amount corresponding to the explanation data, and (7) perform a management operation on the replacement rental vehicle reservation that corresponds to the disabled vehicle based on the computed data indicative of the estimated repair duration.

7. The method of claim 1 wherein the party comprises a repair facility.

8. The method of claim 1 wherein the party comprises an insurance company-repair facility pair.

9. The method of claim 1 wherein the receiving step comprises the processor receiving the labor hours estimation data from a repair facility computer.

10. The apparatus of claim 4 wherein the memory is further configured to store data representative of a repair facility, the repair facility being the party associated with the received labor hours estimation data.

11. The apparatus of claim 4 wherein the memory is further configured to store data representative of an insurance company and a repair facility, a pair of the insurance company and the repair facility being the party associated with the received labor hours estimation data.

12. The apparatus of claim 4 wherein the processor is further configured to receive the labor hours estimation data from a repair facility computer.

13. The method of claim 5 wherein the replacement rental vehicle reservation is associated with data indicative of an authorization duration for that replacement rental vehicle reservation, and wherein the management operation performing step comprises:

the processor determining whether the authorization duration for the replacement rental vehicle reservation would end prior to repairs being completed for the disabled vehicle based on the computed repair duration data and the authorization duration data; and in response to a determination by the processor that the authorization duration for the replacement rental vehicle reservation would end prior to repairs being completed for the disabled vehicle, the processor automatically extending the replacement rental vehicle reservation to thereby associate the replacement rental vehicle reservation with a new authorization duration.

14. The method of claim 13 wherein the automatically extending step comprises the processor automatically storing data in the memory that is indicative of the new authorization duration for the replacement rental vehicle reservation such that an expiration of the new authorization duration coincides in time with an end of the repair duration corresponding to the computed repair duration data.

15. The method of claim 1 wherein the party comprises an insurance company.

16. The method of claim 1 wherein the processor and memory are resident within a rental vehicle reservation management computer system.

17. The apparatus of claim 6 wherein the memory is further configured to store data indicative of an authorization duration for the replacement rental vehicle reservation in association with that replacement rental vehicle reservation, and wherein the processor is further configured to perform the management operation by (1) determining whether the authorization duration for the replacement rental vehicle reservation would end prior to repairs being completed for the disabled vehicle based on the computed repair duration data and the authorization duration data, and (2) in response to a determination by the processor that the authorization duration for the replacement rental vehicle reservation would end prior to repairs being completed for the disabled vehicle, automatically extending the replacement rental vehicle reservation to thereby associate the replacement rental vehicle reservation with a new authorization duration.

18. The apparatus of claim 17 wherein the processor is further configured to automatically extend the replacement rental vehicle reservation by automatically storing data in the memory that is indicative of the new authorization duration for the replacement rental vehicle reservation such that an expiration of the new authorization duration coincides in time with an end of the repair duration corresponding to the computed repair duration data.

19. The apparatus of claim 4 wherein the memory is further configured to store data representative of an insurance company, the insurance being the party associated with the received labor hours estimation data.

20. The apparatus of claim 4 further comprising a rental vehicle reservation management computer system, the processor and memory being resident within the rental vehicle reservation management computer system.

21. The apparatus of claim 4 wherein the processor is further configured to automatically schedule a callback reminder for the replacement rental vehicle reservation in response to the received labor hours estimation data.

22. The method of claim 1 wherein the automatically computing step comprises applying the selected labor hours scalar to the received labor hours estimation data to translate the labor hours estimation data into a number of business days needed by the repair facility to perform those labor hours.

23. The method of claim 22 further comprising the processor receiving a status identifier as to whether the disabled vehicle is nondriveable, and wherein the automatically computing step further comprises the processor automatically computing the estimated repair duration data based at least in part on an adjustment amount corresponding to the received status identifier.

24. The method of claim 23 further comprising the processor defining the nondriveable adjustment amount on a party-specific basis.

25. The method of claim 22 wherein the automatically computing step further comprises the processor automatically computing the estimated repair duration data based at least in part on an adjustment amount corresponding to whether the time needed to complete repairs to the disabled vehicle will include any weekend days.

26. The method of claim 25 further comprising the processor defining the weekend adjustment amount on a party-specific basis.

27. The method of claim 22 wherein the automatically computing step further comprises the processor automatically computing the estimated repair duration data based at least in part on an adjustment amount corresponding to whether the time needed to complete repairs to the disabled vehicle will include any holiday days.

28. The method of claim 27 further comprising the processor defining the holiday adjustment amount on a party-specific basis.

29. The method of claim 5 further comprising the processor defining the explanation data adjustment amount on a party-specific basis.

30. The method of claim 5 further comprising:
the processor determining whether the explanation data corresponds to an explanation categorized as an adjustment explanation or an extension explanation; and
wherein the automatically computing step comprises the processor automatically computing the estimated repair duration data based at least in part on an adjustment amount corresponding to the explanation data that has been determined to be categorized as an adjustment explanation but not on an adjustment amount corresponding to the explanation data that has been determined to be categorized as an extension explanation.

31. The method of claim 1 further comprising:
the processor performing the method steps for a plurality of rental vehicle reservations; and
the processor generating an audit report for the plurality of rental vehicle reservations based at least in part on the received labor hours estimation data and the computed estimated repair duration data.

32. The apparatus of claim 4 wherein the processor is further configured to apply the selected labor hours scalar to the received labor hours estimation data to translate the labor hours estimation data into a number of business days needed by the repair facility to perform those labor hours.

33. The apparatus of claim 32 wherein the processor is further configured to (1) receive a status identifier as to whether the disabled vehicle is nondriveable, and (2) automatically compute the estimated repair duration data based at least in part on an adjustment amount corresponding to the received status identifier.

34. The apparatus of claim 33 wherein the processor is further configured to define the nondriveable adjustment amount on a party-specific basis.

35. The apparatus of claim 32 wherein the processor is further configured to automatically compute the estimated repair duration data based at least in part on an adjustment amount corresponding to whether the time needed to complete repairs to the disabled vehicle will include any weekend days.

36. The apparatus of claim 35 wherein the processor is further configured to define the weekend adjustment amount on a party-specific basis.

37. The apparatus of claim 32 wherein the processor is further configured to automatically compute the estimated repair duration data based at least in part on an adjustment amount corresponding to whether the time needed to complete repairs to the disabled vehicle will include any holiday days.

38. The apparatus of claim 37 wherein the processor is further configured to define the holiday adjustment amount on a party-specific basis.

39. The apparatus of claim 6 wherein the processor is further configured to define the explanation data adjustment amount on a party-specific basis.

40. The apparatus of claim 6 wherein the processor is further configured to (1) determine whether the explanation data corresponds to an explanation categorized as an adjustment explanation or an extension explanation, and (2) automatically compute the estimated repair duration data based at least in part on an adjustment amount corresponding to the explanation data that has been determined to be categorized as an adjustment explanation but not on an adjustment amount corresponding to the explanation data that has been determined to be categorized as an extension explanation.

41. The apparatus of claim 4 wherein the processor is further configured to (1) receive labor hours estimation data and automatically compute the estimated repair duration data for a plurality of rental vehicle reservations, and (2) generate an audit report for the plurality of rental vehicle reservations based at least in part on the received labor hours estimation data and the computed estimated repair duration data.

42. The apparatus of claim 4 wherein the party comprises a repair facility.

43. The apparatus of claim 4 wherein the party comprises an insurance company-repair facility pair.

* * * * *